United States Patent
Farrell

(10) Patent No.: US 7,730,768 B2
(45) Date of Patent: Jun. 8, 2010

(54) SYSTEM AND METHOD FOR CONTROLLING EMISSION OF ACOUSTIC ENERGY FOR DETECTING LEAKS IN VEHICLES

(75) Inventor: Scott Farrell, Brentwood, TN (US)

(73) Assignee: QST Holdings, LLC, Brentwood, TN (US)

( * ) Notice: Subject to any disclaimer, the term of this patent is extended or adjusted under 35 U.S.C. 154(b) by 455 days.

(21) Appl. No.: 11/586,418

(22) Filed: Oct. 25, 2006

(65) Prior Publication Data

US 2007/0107497 A1 May 17, 2007

Related U.S. Application Data

(60) Provisional application No. 60/834,019, filed on Jul. 28, 2006, provisional application No. 60/730,227, filed on Oct. 25, 2005.

(51) Int. Cl.
*G01N 3/24* (2006.01)
*G01M 29/00* (2006.01)

(52) U.S. Cl. .................... 73/40.5 A; 73/592; 73/628

(58) Field of Classification Search ........... 73/40.5 A, 73/49.2, 592, 624, 625, 628, 632, 641, 642, 73/643; 257/642, 643
See application file for complete search history.

(56) References Cited

U.S. PATENT DOCUMENTS

| | | | |
|---|---|---|---|
| 4,719,801 A * | 1/1988 | Blaser et al. | 73/592 |
| 4,901,576 A | 2/1990 | Rademacher | |
| 5,726,705 A | 3/1998 | Imanishi et al. | |
| 5,964,812 A | 10/1999 | Schumacher et al. | |
| 6,430,988 B1 * | 8/2002 | Watanabe | 73/40.5 A |
| 6,983,642 B2 * | 1/2006 | Stumpf | 73/40.5 A |
| 7,387,026 B1 * | 6/2008 | Gayle | 73/592 |
| 2003/0164044 A1 | 9/2003 | Gayle | |
| 2004/0019577 A1 * | 1/2004 | Abdel-Malek et al. | 707/1 |

(Continued)

FOREIGN PATENT DOCUMENTS

DE 4237527 A1 * 5/1994

OTHER PUBLICATIONS

Farrell, et al., U.S. Appl. No. 12/129,412, entitled, "System and Method for Detecting Leaks in Sealed Compartments," filed May 29, 2008.

*Primary Examiner*—J M Saint Surin
(74) *Attorney, Agent, or Firm*—Ann I. Dennen; Lanier Ford Shaver & Payne P.C.

(57) ABSTRACT

A system for detecting leaks in vehicles comprises memory, a plurality of transducers, at least one sensor, an input device, and logic. The memory stores a plurality of transmit profiles. The transducers are disposed in a vehicle and configured to emit acoustic energy. The sensor is disposed outside of a vehicle and configured to sense the acoustic energy emitted by the transducers, and the input device is configured to receive a vehicle identifier identifying the vehicle. The logic is configured to select one of the transmit profiles for the transducers based on the vehicle identifier and to cause the transducers to emit the acoustic energy according to the selected transmit profile. The logic is further configured to detect at least one leak in the vehicle based on sample values indicative of the acoustic energy sensed by the at least one sensor and to provide an indication of the detected leak.

14 Claims, 45 Drawing Sheets

U.S. PATENT DOCUMENTS

2004/0091076 A1    5/2004  Kerr et al.
2007/0109138 A1    5/2007  Farrell
2007/0112528 A1*   5/2007  Farrell .......................... 702/51
2007/0136088 A1*   6/2007  Farrel ............................ 705/1
2009/0025454 A1*   1/2009  Farrell et al. ............. 73/40.5 A

* cited by examiner

| Sensor | 1<br>0 ft. | 2<br>1 ft. | 3<br>2 ft. | 4<br>3 ft. | 5<br>4 ft. | 6<br>5 ft. | 7<br>6 ft. | 8<br>7 ft. | 9<br>8 ft. | 10<br>9 ft. | 11<br>10 ft. | 12<br>11 ft. | 13<br>12 ft. | 14<br>13 ft. | 15<br>14 ft. | 16<br>15 ft. |
|---|---|---|---|---|---|---|---|---|---|---|---|---|---|---|---|---|
| 45a | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 45b | 10.0 | 10.0 | 10.0 | 10.0 | 14.0 | 10.0 | 14.0 | 10.0 | 10.0 | 10.0 | 10.0 | 10.0 | 14.0 | 10.0 | 10.0 | 10.0 |
| 45c | 10.0 | 10.0 | 10.0 | 10.0 | 12.0 | 10.0 | 10.0 | 10.0 | 12.0 | 14.0 | 10.0 | 12.0 | 12.0 | 12.0 | 10.0 | 10.0 |
| 45d | 10.0 | 10.0 | 10.0 | 10.0 | 15.0 | 10.0 | 12.0 | 12.0 | 15.0 | 10.0 | 10.0 | 10.0 | 10.0 | 13.0 | 10.0 | 10.0 |
| 45e | 10.0 | 10.0 | 10.0 | 10.0 | 13.0 | 12.0 | 15.0 | 10.0 | 10.0 | 10.0 | 10.0 | 10.0 | 12.0 | 10.0 | 12.0 | 10.0 |
| 45f | 10.0 | 10.0 | 10.0 | 10.0 | 10.0 | 10.0 | 13.0 | 12.0 | 13.0 | 14.0 | 12.0 | 10.0 | 10.0 | 12.0 | 10.0 | 10.0 |
| 45g | 10.0 | 10.0 | 10.0 | 10.0 | 10.0 | 10.0 | 10.0 | 10.0 | 12.0 | 10.0 | 13.0 | 12.0 | 12.0 | 10.0 | 14.0 | 10.0 |
| 45h | 10.0 | 10.0 | 10.0 | 10.0 | 10.0 | 10.0 | 12.0 | 10.0 | 14.0 | 10.0 | 12.0 | 10.0 | 10.0 | 10.0 | 10.0 | 10.0 |
| 45i | 10.0 | 10.0 | 10.0 | 10.0 | 10.0 | 10.0 | 10.0 | 12.0 | 12.0 | 12.0 | 12.0 | 10.0 | 12.0 | 12.0 | 12.0 | 10.0 |
| 45j | 10.0 | 10.0 | 10.0 | 10.0 | 10.0 | 10.0 | 15.0 | 10.0 | 12.0 | 10.0 | 10.0 | 10.0 | 10.0 | 10.0 | 10.0 | 10.0 |
| 45k | 10.0 | 10.0 | 10.0 | 10.0 | 12.0 | 10.0 | 12.0 | 12.0 | 10.0 | 12.0 | 10.0 | 10.0 | 12.0 | 12.0 | 10.0 | 10.0 |
| 45l | 10.0 | 10.0 | 10.0 | 10.0 | 13.0 | 12.0 | 10.0 | 10.0 | 12.0 | 10.0 | 10.0 | 10.0 | 12.0 | 10.0 | 12.0 | 10.0 |
| 45m | 10.0 | 10.0 | 10.0 | 10.0 | 12.0 | 10.0 | 12.0 | 10.0 | 12.0 | 12.0 | 10.0 | 13.0 | 12.0 | 10.0 | 10.0 | 10.0 |
| 45n | 10.0 | 10.0 | 10.0 | 10.0 | 14.0 | 10.0 | 14.0 | 12.0 | 10.0 | 14.0 | 10.0 | 10.0 | 10.0 | 12.0 | 12.0 | 10.0 |
| 45o | 10.0 | 10.0 | 10.0 | 10.0 | 10.0 | 10.0 | 10.0 | 10.0 | 12.0 | 10.0 | 10.0 | 10.0 | 12.0 | 10.0 | 10.0 | 10.0 |
| 45p | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |

FIG. 16

| Sensor | 1<br>0 ft | 2<br>1 ft | 3<br>2 ft | 4<br>3 ft | 5<br>4 ft | 6<br>5 ft | 7<br>6 ft | 8<br>7 ft | 9<br>8 ft | 10<br>9 ft | 11<br>10 ft | 12<br>11 ft | 13<br>12 ft | 14<br>13 ft | 15<br>14 ft | 16<br>15 ft |
|---|---|---|---|---|---|---|---|---|---|---|---|---|---|---|---|---|
| 45a | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 45b | 10.0 | 10.0 | 10.0 | 10.0 | 11.0 | 10.0 | 14.0 | 10.0 | 10.0 | 10.0 | 10.0 | 10.0 | 10.0 | 10.0 | 10.0 | 10.0 |
| 45c | 10.0 | 10.0 | 10.0 | 10.0 | 12.0 | 10.0 | 14.0 | 10.0 | 11.0 | 13.0 | 10.0 | 12.0 | 11.0 | 13.0 | 10.0 | 10.0 |
| 45d | 10.0 | 10.0 | 10.0 | 10.0 | 11.0 | 10.0 | 10.0 | 11.0 | 13.0 | 11.0 | 10.0 | 10.0 | 12.0 | 12.0 | 10.0 | 10.0 |
| 45e | 10.0 | 10.0 | 10.0 | 10.0 | 13.0 | 11.0 | 13.0 | 10.0 | 10.0 | 10.0 | 10.0 | 10.0 | 11.0 | 10.0 | 12.0 | 10.0 |
| 45f | 10.0 | 10.0 | 10.0 | 10.0 | 10.0 | 10.0 | 17.0 | 11.0 | 11.0 | 10.0 | 10.0 | 11.0 | 10.0 | 11.0 | 10.0 | 10.0 |
| 45g | 10.0 | 10.0 | 10.0 | 10.0 | 12.0 | 12.0 | 14.0 | 10.0 | 13.0 | 12.0 | 13.0 | 13.0 | 14.0 | 11.0 | 14.0 | 10.0 |
| 45h | 10.0 | 10.0 | 10.0 | 10.0 | 10.0 | 10.0 | 10.0 | 11.0 | 12.0 | 11.0 | 12.0 | 11.0 | 14.0 | 11.0 | 10.0 | 10.0 |
| 45i | 10.0 | 10.0 | 10.0 | 10.0 | 10.0 | 10.0 | 10.0 | 10.0 | 14.0 | 14.0 | 14.0 | 10.0 | 10.0 | 10.0 | 10.0 | 10.0 |
| 45j | 10.0 | 10.0 | 10.0 | 10.0 | 11.0 | 14.0 | 11.0 | 10.0 | 11.0 | 10.0 | 11.0 | 10.0 | 11.0 | 11.0 | 12.0 | 10.0 |
| 45k | 10.0 | 10.0 | 10.0 | 10.0 | 10.0 | 10.0 | 14.0 | 13.0 | 10.0 | 11.0 | 10.0 | 10.0 | 13.0 | 10.0 | 10.0 | 10.0 |
| 45l | 10.0 | 10.0 | 10.0 | 10.0 | 12.0 | 10.0 | 13.0 | 10.0 | 14.0 | 10.0 | 10.0 | 10.0 | 10.0 | 10.0 | 10.0 | 10.0 |
| 45m | 10.0 | 10.0 | 10.0 | 10.0 | 11.0 | 13.0 | 10.0 | 10.0 | 12.0 | 11.0 | 10.0 | 11.0 | 11.0 | 10.0 | 12.0 | 10.0 |
| 45n | 10.0 | 10.0 | 10.0 | 10.0 | 12.0 | 10.0 | 11.0 | 10.0 | 10.0 | 12.0 | 10.0 | 12.0 | 12.0 | 10.0 | 10.0 | 10.0 |
| 45o | 10.0 | 10.0 | 10.0 | 10.0 | 11.0 | 10.0 | 12.0 | 11.0 | 14.0 | 10.0 | 10.0 | 10.0 | 10.0 | 12.0 | 12.0 | 10.0 |
| 45p | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |

FIG. 18

SYSTEM AND METHOD FOR CONTROLLING EMISSION OF ACOUSTIC ENERGY FOR DETECTING LEAKS IN VEHICLES

CROSS REFERENCE TO RELATED APPLICATIONS

This application claims priority to U.S. Provisional Application No. 60/834,019, entitled "System and Method for Detecting Leaks in Sealed Compartments," and filed on Jul. 28, 2006, which is incorporated herein by reference. This application also claims priority to U.S. Provisional Application No. 60/730,227, entitled "System and Method for Detecting Leaks in Sealed Compartments," and filed on Oct. 25, 2005, which is incorporated herein by reference.

RELATED ART

In the manufacture or repair of products that include a sealed compartment, various methods have been used to determine how well the compartment is sealed, and where water or air intrusion (or extrusion) might occur. In the case of vehicles, for example, it is important to verify that water will not leak into the passenger compartment. Since visual inspection can be highly unreliable, certain vehicle manufacturers utilize spray booths for subjecting fully assembled vehicles to an intense water spray to ensure that vehicles shipped from the factory will not leak due to faulty or damaged seals. While this type of testing can be fairly reliable, it requires a worker to check for the presence of water in the cabin, and it is destructive in the sense that it can cause significant water intrusion in poorly sealed vehicles, or in vehicles where a window or door has been inadvertently left partially open, requiring significant expenditure of time and material for repairs due to water damage. Additionally, the spray booths are expensive to install and maintain, and cannot be easily duplicated at vehicle service and repair facilities.

In attempts to alleviate some of the problems associated with spray booths, some leak detection systems employ ultrasonic sensors to non-destructively detect leaks within vehicles. U.S. Pat. No. 6,983,642 entitled "System and Method for Automatically Judging the Sealing Effectiveness of a Sealed Compartment," which is incorporated herein by reference, describes one such leak detection system. In this regard, at least one ultrasonic transmitter is placed within the passenger compartment of a vehicle and emits ultrasonic energy. Ultrasonic sensors on the outside of the vehicle are used to determine the levels of ultrasonic energy within a close proximity of the vehicle. Ultrasonic energy may escape from the vehicle through a leak causing an increased amount of ultrasonic energy external to the vehicle at or close to the location of the leak. Thus, by detecting the increased ultrasonic energy, a sensor can detect the presence of the leak.

Unfortunately, manufacturing an efficient and reliable leak detection system that utilizes non-destructive ultrasonic sensing capabilities can be difficult and expensive. Further, it is contemplated that a convenient location for a leak detection system is on or close to an assembly line of a vehicle manufacturer. Such an environment can be extremely noisy and, therefore, adversely affect the performance of the leak detection system. Moreover, better and less expensive leak detection systems and methods capable of non-destructively detecting leaks of sealed compartments, such as passenger compartments of vehicles, are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 16 is a table illustrating an exemplary threshold profile for the vehicle of FIG. 15.

FIG. 18 is a table illustrating an exemplary threshold profile for the vehicle of FIG. 17.

DETAILED DESCRIPTION

The present disclosure generally pertains to systems and methods for reliably detecting leaks in sealed compartments, such as compartments within vehicles. In several embodiments of the present disclosure, an apparatus having a sealed compartment, such as a vehicle (e.g., automobile, airplane, etc.), is moved past an array of ultrasonic sensors. An ultrasonic transmitter is placed in the sealed compartment and emits ultrasonic energy as the apparatus is moved past the ultrasonic sensors. A leak can be automatically and non-destructively detected by analyzing data from the ultrasonic sensors.

For purposes of illustration, the systems and methods of the present disclosure will be described hereafter as detecting leaks within sealed compartments, such as passenger compartments or trunks, of vehicles (e.g., automobiles, aircraft, boats, etc.). It is to be understood, however, that the systems and methods of the present disclosure may be similarly used to detect leaks in other types of sealed compartments.

Note that the systems and methods of the present disclosure may be used to test compartments having either hermetic or non-hermetic seals. For example, a passenger compartment of an automobile is typically non-hermetic in that there typically exists at least some normal leakage in the passenger compartment even if the compartment and, in particular, the seals of the compartment are non-defective. In such embodiments, systems in accordance with the present disclosure can be configured to detect only leaks that are abnormal in the sense that they allow an excessive or greater than an expected or desired amount of leakage thereby making the compartment seal defective. For example, a leak in a vehicle that allows an unacceptable amount of water or air intrusion is abnormal, whereas any leak in a compartment designed in another example to be hermetically sealed is abnormal.

Figure 1:
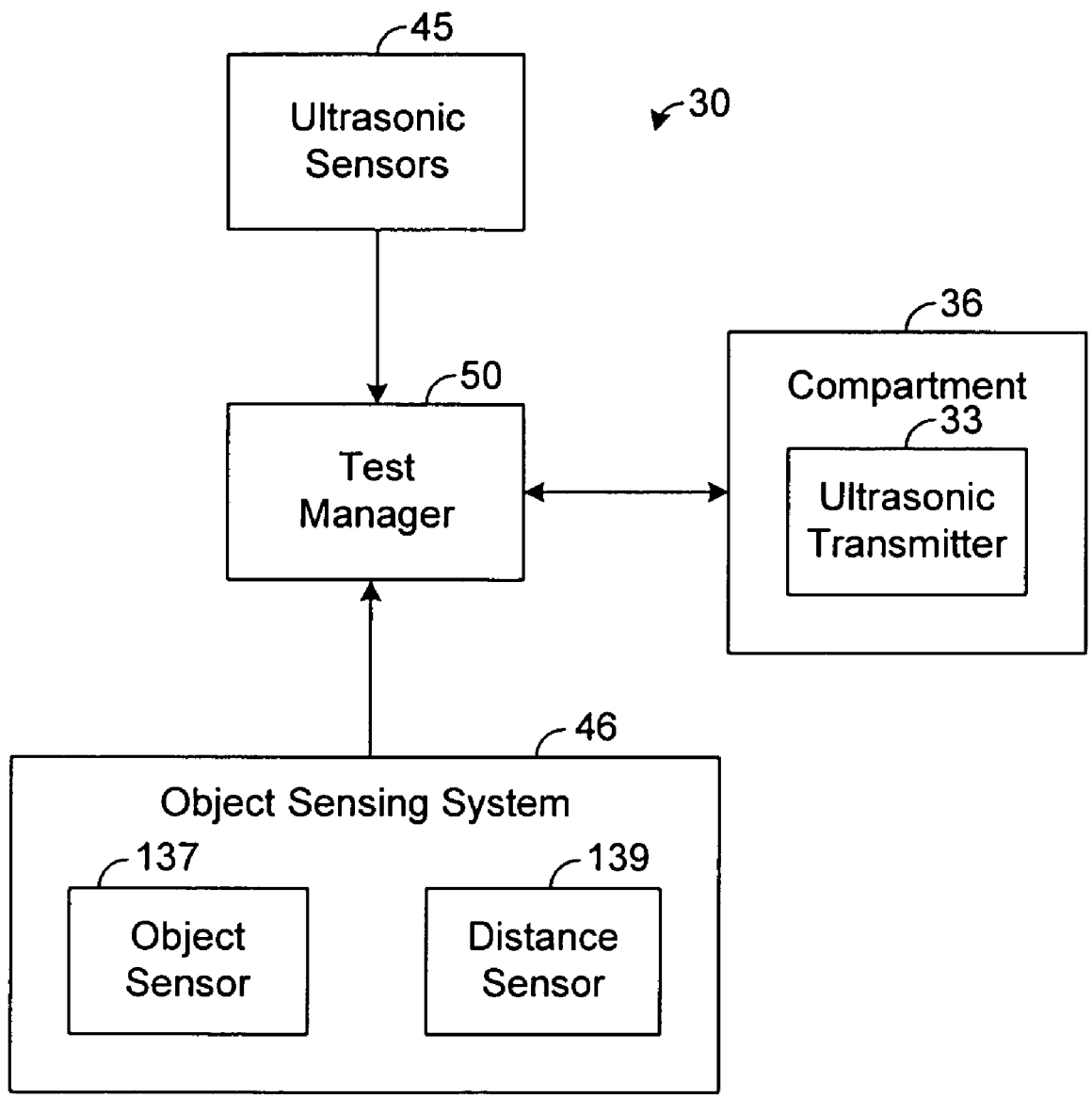
FIG. 1 is a block diagram illustrating an exemplary leak detection system in accordance with the present disclosure.

FIG. 1 depicts a leak detection system 30 that tests for abnormal compartment leaks in accordance with an exemplary embodiment of the present disclosure. The system 30 comprises an ultrasonic transmitter 33 that is placed within a compartment 36, such as a passenger compartment of a vehicle (not specifically shown in FIG. 1). The compartment 36 is moved past ultrasonic sensors 45 tuned to the frequency of the transmitter 33. In one exemplary embodiment, the transmitter 33 emits ultrasonic energy at approximately 40 kilo-Hertz (kHz). An object sensing system 46 detects a location of the vehicle during the test, and ultrasonic sensors 45 detect ultrasonic energy that escapes from the compartment 36 as it is moved past the sensors 45. Based on the ultrasonic energy detected by the sensors 45, a test manager 50 determines whether the compartment 36 has any abnormal leaks. Further, by analyzing the data from the sensors 45 relative to the position of the vehicle compartment 36 during the test (as determined from data provided by the object sensing system 44), the test manager 50 identifies a location of each abnormal leak detected by the system 30.

Figure 2:
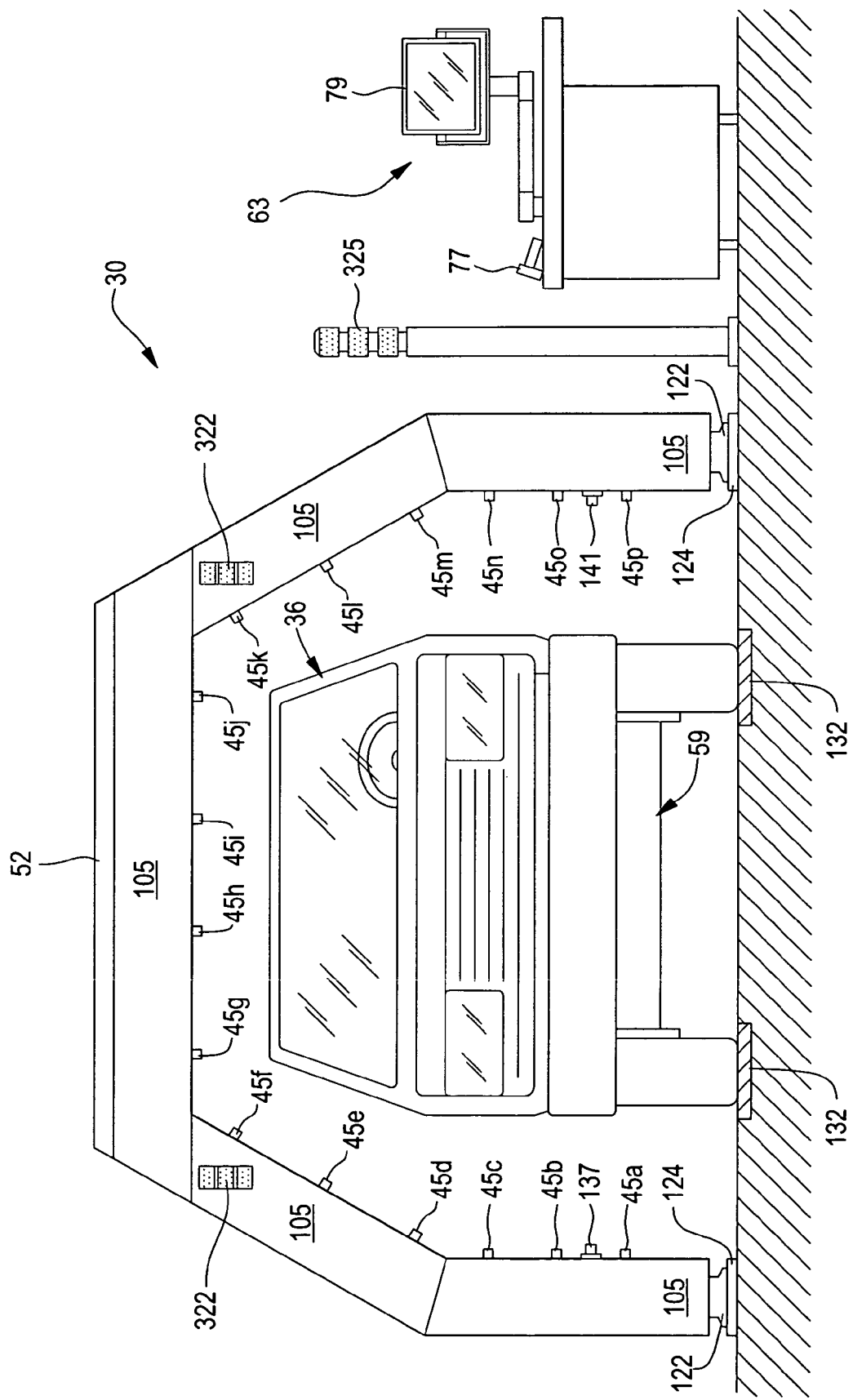
FIG. 2 depicts a front view of an exemplary leak detection system, such as is depicted in FIG. 1.
Figure 3:
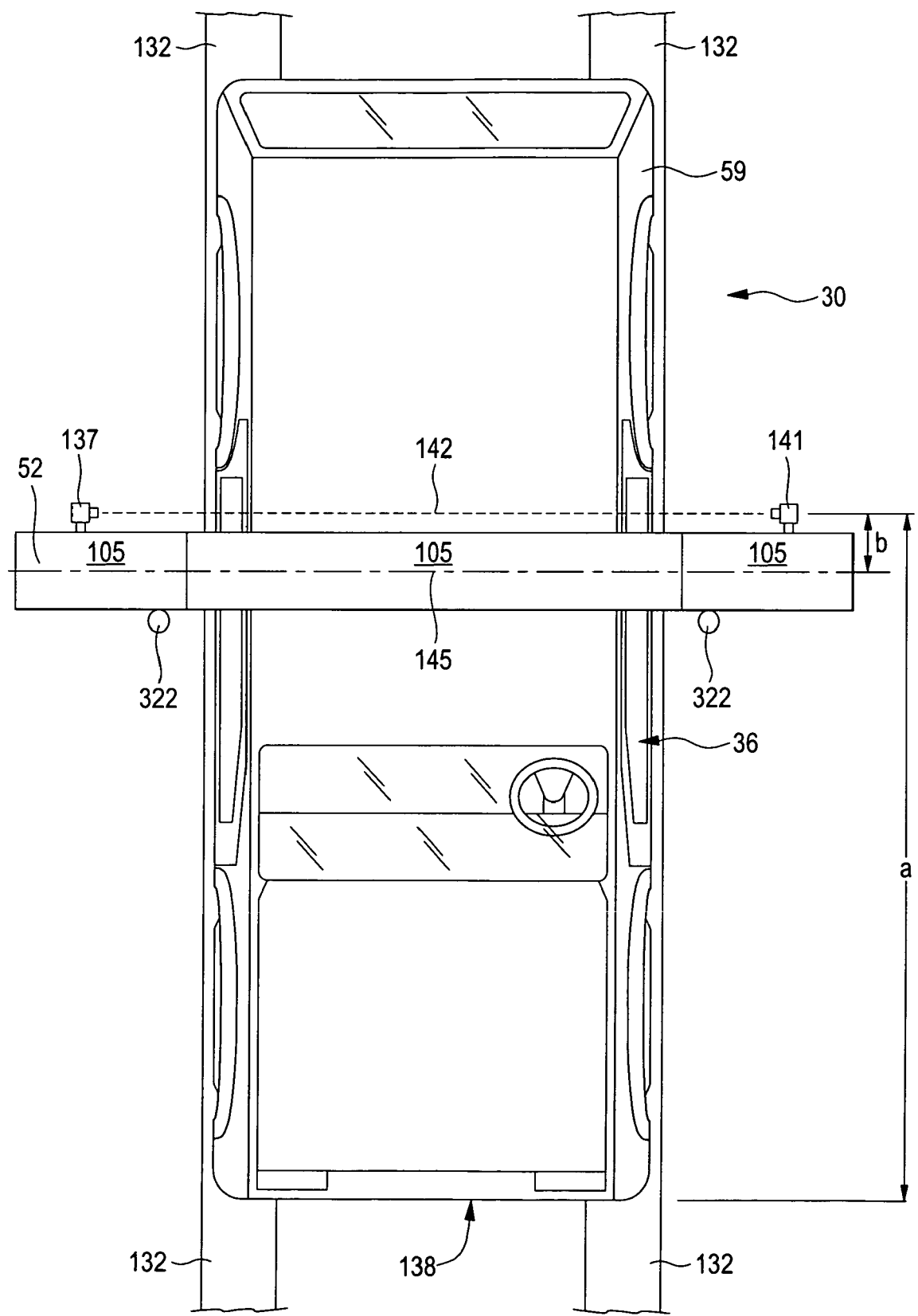
FIG. 3 depicts a top view of the leak detection system depicted in FIG. 2.
Figure 4:
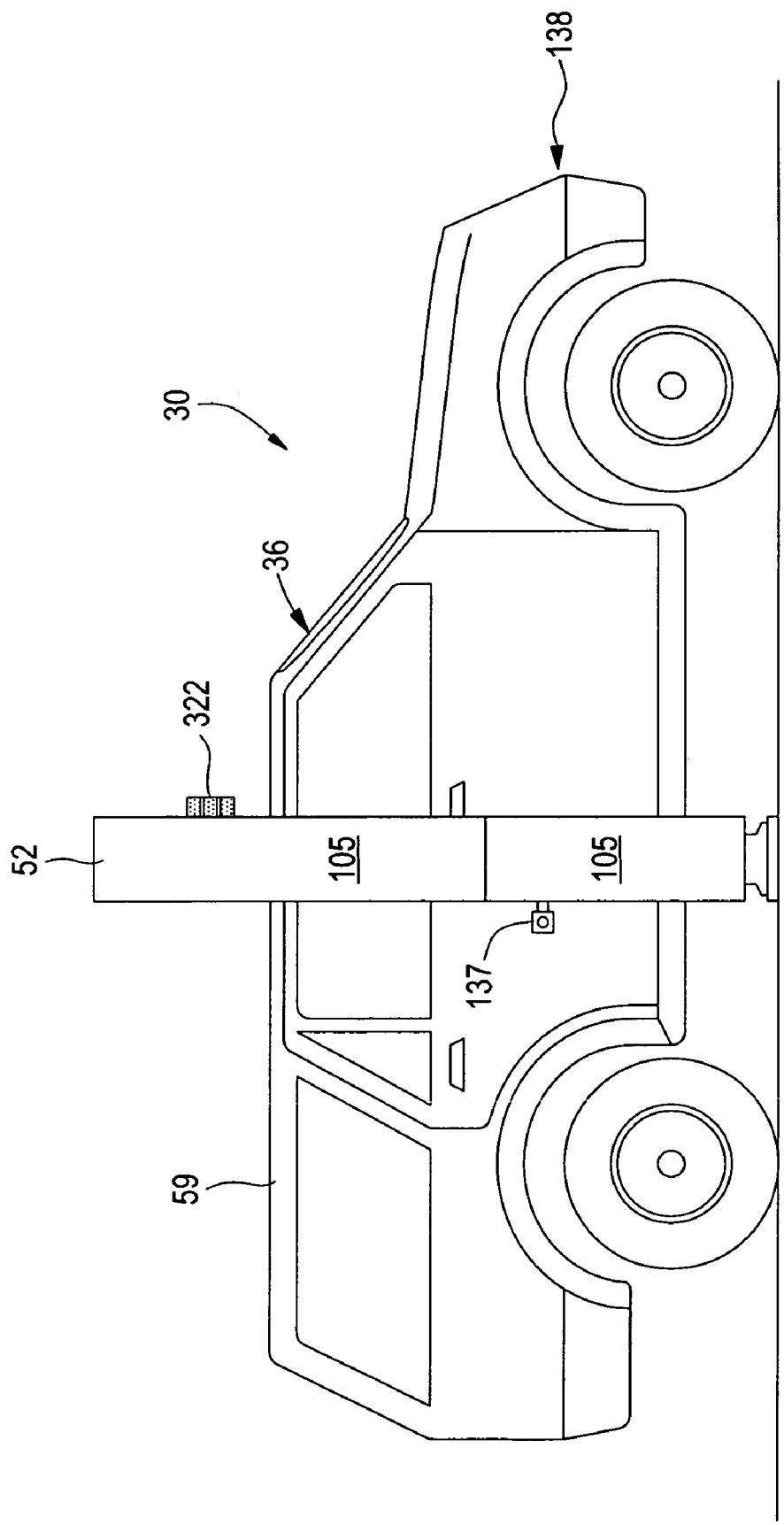
FIG. 4 depicts a side view of the leak detection system depicted in FIG. 2.
Figure 5:
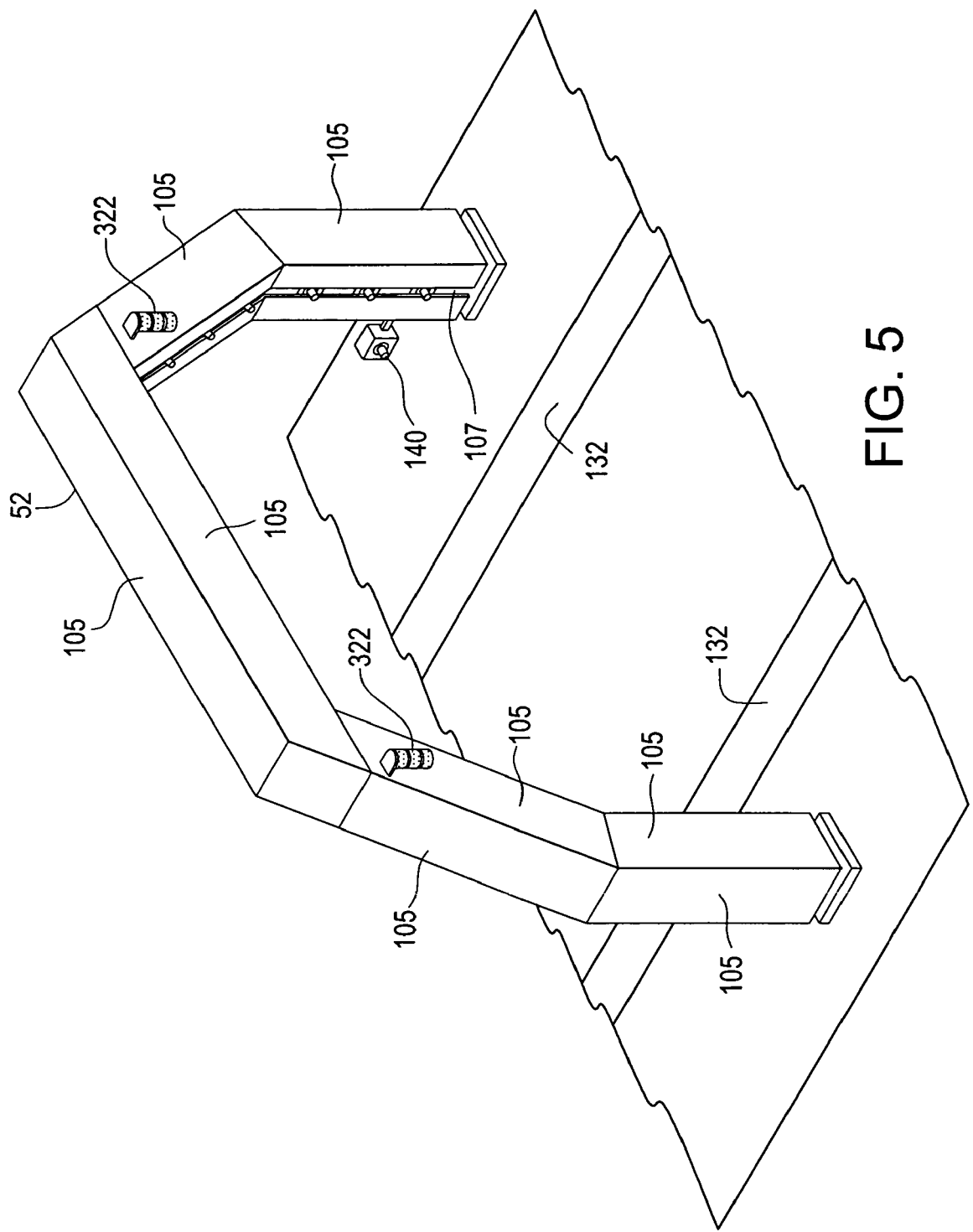
FIG. 5 depicts a three-dimensional view of an exemplary support structure for the leak detection system depicted in FIG. 2.

FIGS. 2-4 depict an exemplary embodiment of the leak detection system 30 in accordance with an exemplary embodiment of the present disclosure. The system 30 comprises a support structure 52 for supporting an array of ultrasonic sensors 45a-p mounted thereon. A three-dimensional view of the support structure 52 coupled to the sensors 45a-p is depicted in FIG. 5. In the embodiment depicted by FIG. 2, the support structure 52 is in the shape of an arch, and sixteen ultrasonic sensors 45a-p are coupled to the structure 52. However, other shapes of the structure 52 and other numbers of ultrasonic sensors 45a-p are possible in other embodiments.

To test a passenger compartment 36 of a vehicle 59 for leaks, an ultrasonic transmitter 33 is placed within the passenger compartment 36. Further, the vehicle 59 is positioned within close proximity of the ultrasonic sensors 45a-p (e.g., under the arch formed by the structure 52) such that, if the passenger compartment 36 has an abnormal leak, at least one ultrasonic sensor 45a-p can detect ultrasonic energy that exits through the leak. For example, the vehicle 59 may be passed through the arch formed by the structure 52 while the ultrasonic transmitter 33 in the passenger compartment 36 is emitting ultrasonic energy and while the sensors 45a-p are actively detecting ultrasonic energy. If the passenger compartment 36 of the vehicle 59 has an abnormal leak, then the sensor 45a-p closest to the leak will likely detect at least some of the ultrasonic energy that excessively escapes from the vehicle 59 through the leak. Thus, it is possible to detect the abnormal leak based on such sensor 45a-p.

In this regard, the test manager 50 (FIG. 1) is preferably in communication with each of the sensors 45a-p and determines whether the vehicle 59 has any abnormal leaks in its various compartments (e.g., passenger compartment, trunk, etc.) based on data from the sensors 45a-p. The test manager 50 can be implemented in software, hardware, or a combination thereof. In one exemplary embodiment, as depicted in FIG. 6, the test manager 50, along with its associated methodology, is implemented is software and stored within memory 61 of a computer system 63.

Note that the test manager 50, when implemented in software, can be stored and transported on any computer-readable medium for use by or in connection with an instruction execution apparatus, such as a microprocessor, that can fetch and execute instructions. In the context of this document, a "computer-readable medium" can be any means that can contain, store, communicate, propagate, or transport a program for use by or in connection with an instruction execution apparatus. The computer readable-medium can be, for example but not limited to, an electronic, magnetic, optical, electromagnetic, infrared, or semiconductor apparatus or propagation medium.

Figure 6:
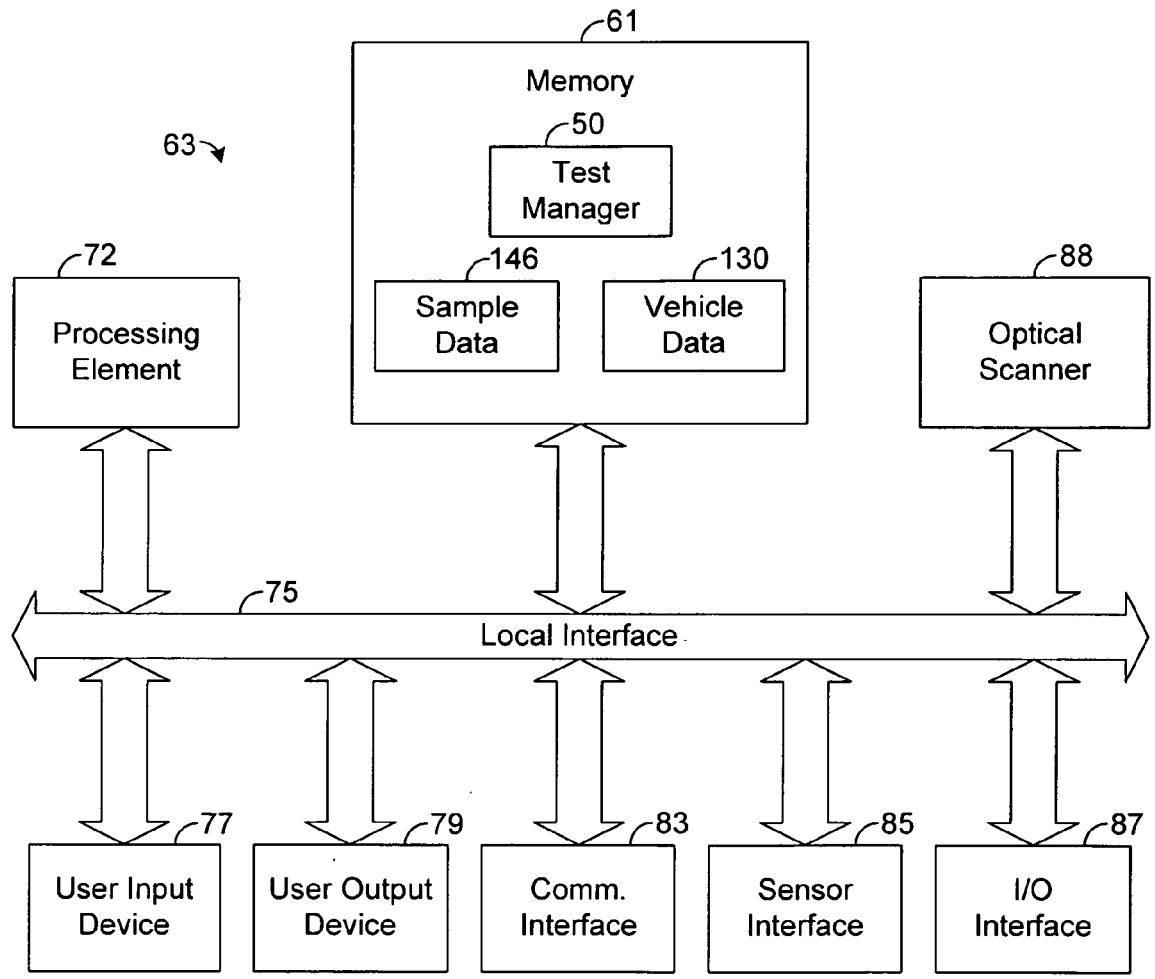
FIG. 6 is a block diagram illustrating an exemplary computer system used in the leak detection system of FIG. 2.

The exemplary embodiment of the system 63 depicted by FIG. 6 comprises at least one conventional processing element 72, such as a digital signal processor (DSP) or a central processing unit (CPU), that communicates to and drives the other elements within the system 63 via a local interface 75, which can include one or more buses. Furthermore, a user input device 77, for example, a keyboard or a mouse, can be used to input data from a user of the system 63, and a user output device 79, for example, a printer or monitor, can be used to output data to the user.

The system 63 also comprises a communication interface 83 that enables the system 63 and, in particular, the test manager 50 to communicate with the transmitter 33 that is placed in the vehicle 59. In one embodiment, the communication interface 83 is able to communicate wireless signals, such as wireless radio frequency (RF) signals, with the transmitter 33, although non-wireless signals are also possible.

A sensor interface 85 is communicatively coupled to each of the ultrasonic sensors 45a-p. For example, one or more conductive connections (not specifically shown) may extend from the sensor interface 85 to the sensors 45a-p to enable digital or analog communication between the interface 85 and the sensors 45a-p. In an another embodiment, wireless signals may be communicated between the interface 85 and the sensors 45a-p. The test manager 50 utilizes the interface 85 to receive data from the sensors 45a-p, as will be described in more detail hereafter.

The system 63 further comprises an input/output (I/O) interface 87 that enables the system 63 to communicate with various external devices. For example, the I/O interface 87 may be communicatively coupled to components of the object sensing system 46 (FIG. 1), as will be described in more detail hereafter. An optical scanner 88 may be used to input certain information, such as vehicle identification information, to the system 63.

Figure 7:
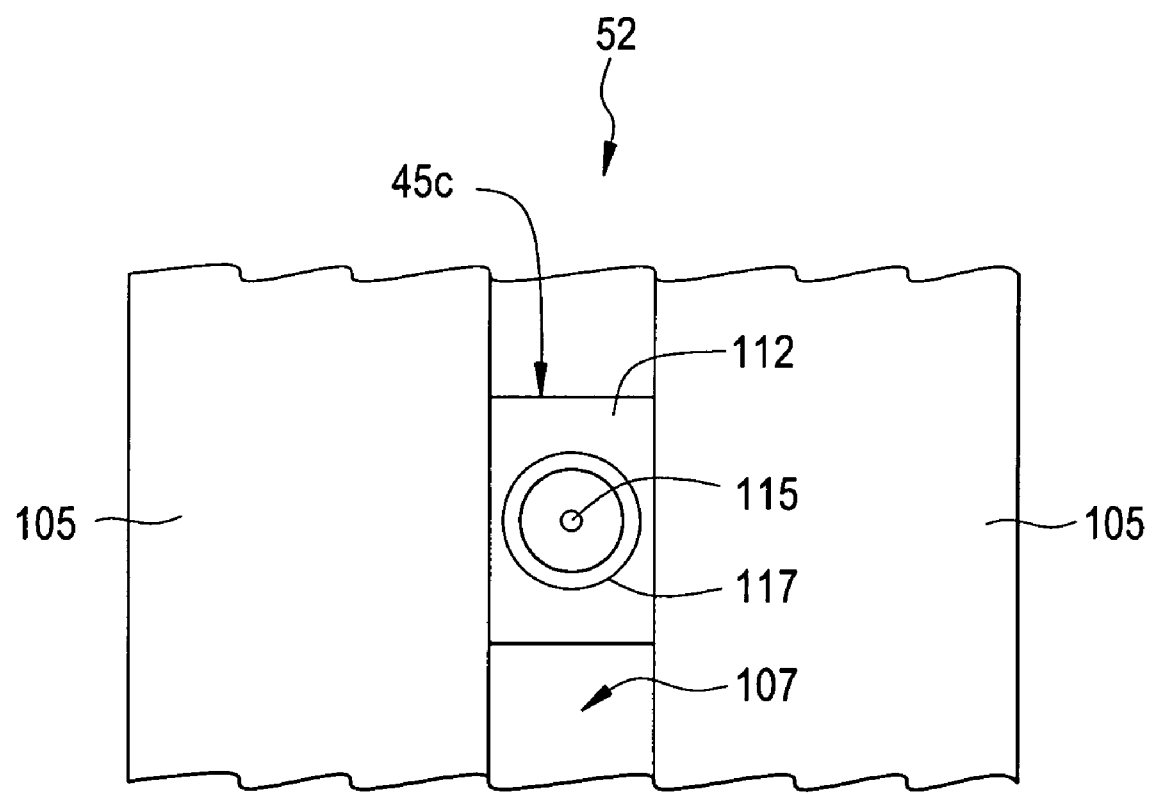
FIG. 7 depicts a portion of the exemplary support structure depicted in FIG. 5.

As shown by FIGS. 2-5, the support structure 52 has a plurality of interconnected panels 105 that are arranged to form a channel 107 extending underneath the structure 52 on a side facing the vehicle 59. In the embodiment shown by FIGS. 2-5, a portion of each sensor 45a-45p is positioned within this channel 107. For example, FIG. 7 depicts an exemplary ultrasonic sensor 45c. The sensor 45c has a housing 112 in which circuitry for sensing ultrasonic energy resides. In this regard, ultrasonic energy is received by a transducer 115 that converts the energy into electrical signals. The transducer 115 may be mounted on the housing 112 via a shock mount 117. The transducer 115 is mounted such that it is positioned just outside of the periphery of the panels 105. Circuitry within the housing 112 filters and processes the electrical signals from the transducer 115 to provide a measured value of the ultrasonic energy detected by the sensor 45c at the frequency emitted by the transmitter 33. For each measured sample, the circuitry transmits data indicative of the measured ultrasonic energy to the test manager 50.

Note that the panels 105 shield the transducer 115 from at least some ambient ultrasonic energy helping to acoustically isolate the sensor 45c from the environment in which the system 30 is placed. Acoustically isolating the sensor 45c from ambient noise helps to improve the sensor's performance and, in particular, the sensor's sensitivity to the ultrasonic energy emitted from the transmitter 33 located within the vehicle 59. In general, to help prevent reverberations of ultrasonic energy within the channel 107 from affecting the performance of the sensors 45c, it is generally desirable to mount the transducer 115 so that it is located just outside of the channel 107 and, therefore, the interior regions of the panels 105. However, in various embodiments, it is possible for the transducer 115 to be positioned within the channel 107, if desired. Each of the transducers 45a-p may be similarly or identically configured as sensor 45c, and, as with sensor 45c, the panels 105 may help to acoustically isolate each of the sensors 45a-p.

Figure 8:
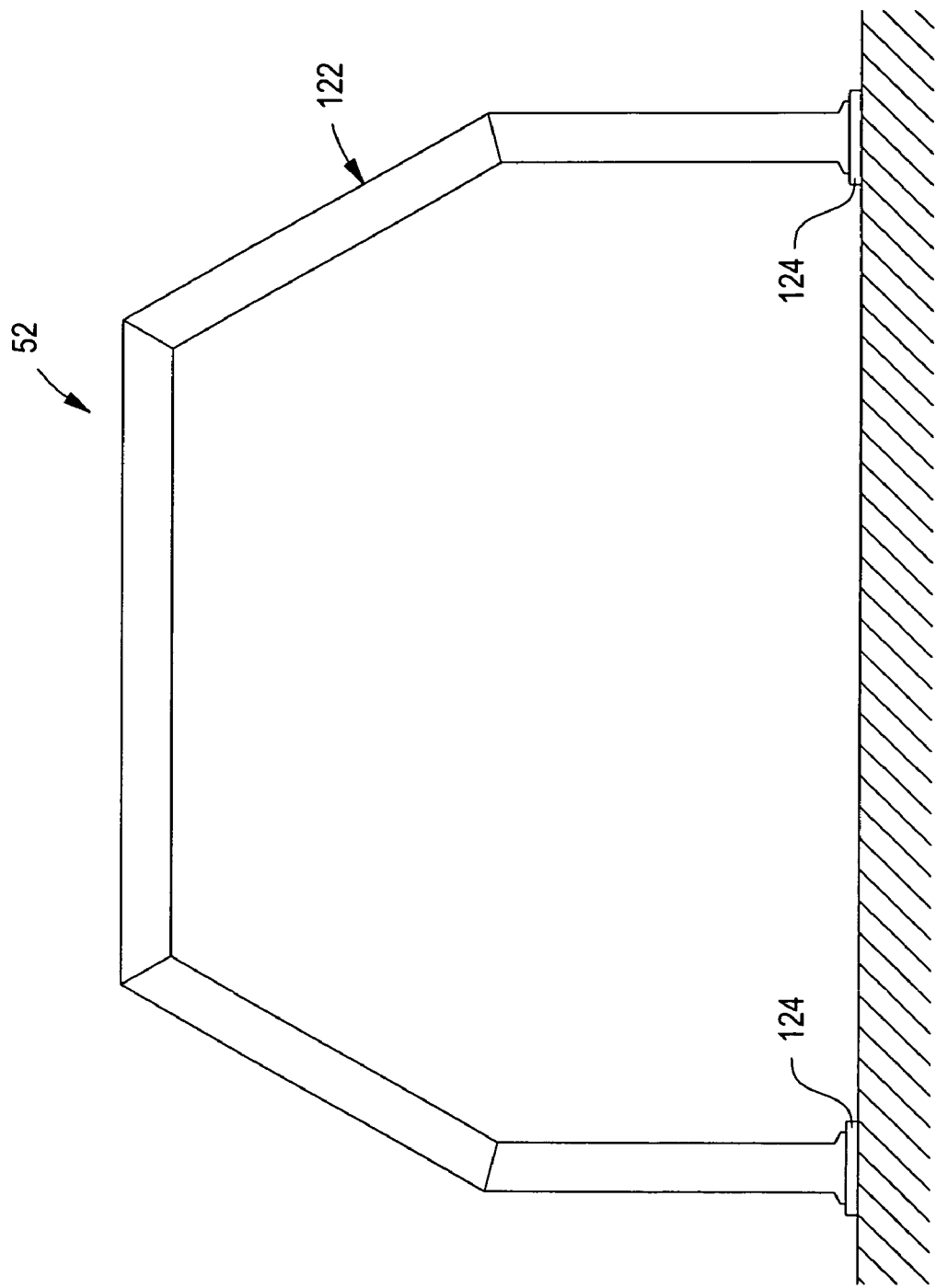
FIG. 8 depicts the support structure of FIG. 7 with panels removed to better illustrate an exemplary frame within the support structure.
Figure 9:
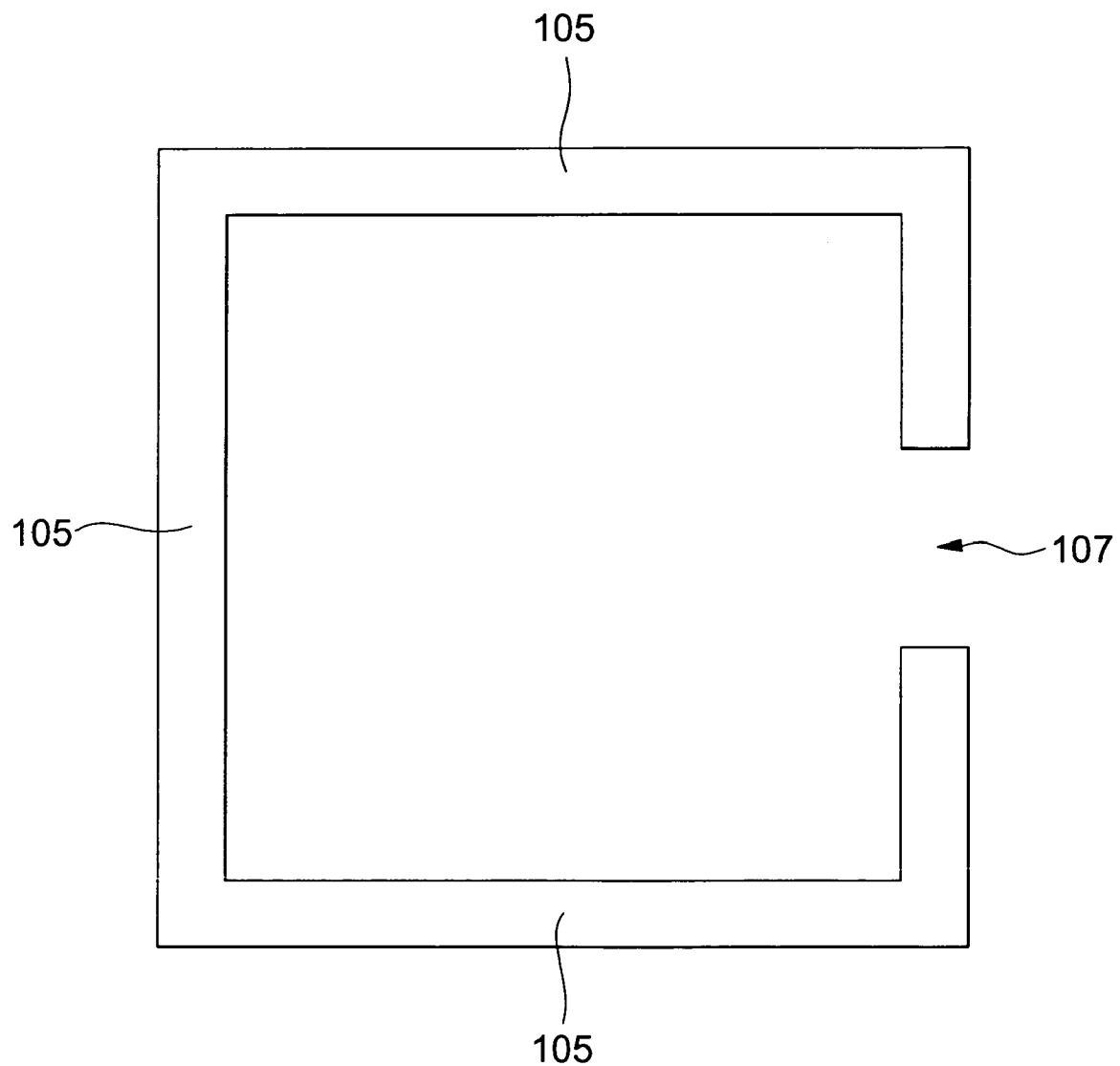
FIG. 9 is a top view of an exemplary panel that may be attached to the frame of FIG. 8 as depicted in FIG. 7.

FIG. 8 depicts the support structure 52 with the panels 105 removed for illustrating the exemplary configuration of the structure 52. As shown by FIG. 8, the structure 52 comprises an inner frame 122 on which the sensors 45a-p and the panels 105 are mounted. Each end of the frame 122 is attached to a foot 124 having a flat bottom surface resting on a surface of the ground or floor. To help acoustically isolate the structure 52 and, in particular, sensors 45a-p from the surrounding environment, the material of the foot 124 on its bottom surface (i.e., contacting the surface of the ground or floor) is composed of an acoustic insulating material, such as rubber, that resists the transfer of energy or sound vibrations from the surface of the floor or ground to the frame 122. By not bolting or otherwise affixing the feet 124 or other components of the structure 52 to the surface of the ground or floor on which the structure 52 is resting, acoustic isolation of the structure 52 can be improved by eliminating the introduction of acoustic vibration that might travel over couplers used to affix the structure 52 to the ground or floor surface. Note that conductive wires or cables enabling communication between the sensors 45a-p and the test manager 50 may be attached to and run along either the frame 122 or the panels 105.

To test the vehicle 59 for leaks, the vehicle 59 is preferably passed through the arch defined by the structure 52 while the transmitter 33 in the vehicle 59 is emitting ultrasonic energy. In this regard, the vehicle 59 may be driven through the structure 52, or a conveyor system, such as any of conventional conveyor systems of assembly lines found in vehicle manufacturing facilities may be used to pull the vehicle 59 through the structure 52. For example, FIG. 2 depicts movable tracks 132 on which the vehicle 59 is positioned. The tracks 132 may be moved by a motor (not shown) of a conveyor system to move the vehicle 59 through the arch defined by the structure 52. Indeed, the structure 52 may be added to an existing assembly line at a vehicle manufacturing facility by placing the structure 52 at some point (e.g., the end) along an assembly line. The exemplary embodiment shown by FIG. 2 depicts two tracks 132, but other numbers of tracks may be used in other embodiments. For example, it is possible for the system 30 to use a single track wide enough so that each tire of the vehicle 59 can be positioned on the track.

Moreover, as the vehicle 59 passes through the structure 52, the ultrasonic sensors 45a-p measure ultrasonic energy at the transmission frequency of the transmitter 33. In this regard, each ultrasonic sensor 45a-p is tuned to the frequency of the transmitter 33 such that frequencies outside of the transmitted frequency range are filtered.

Figure 10:
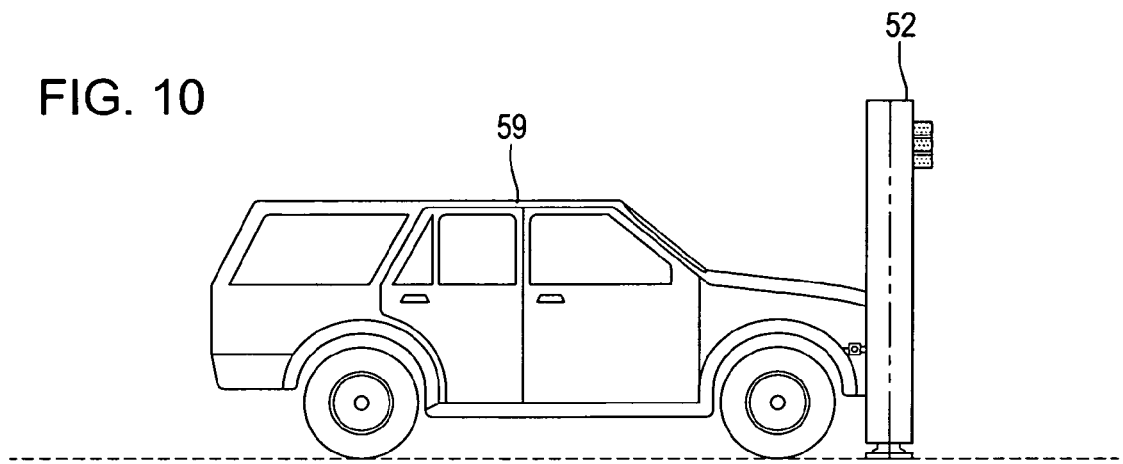
FIG. 10 depicts an exemplary side view of the leak detection system of FIG. 2 for one exemplary sample.
Figure 11:
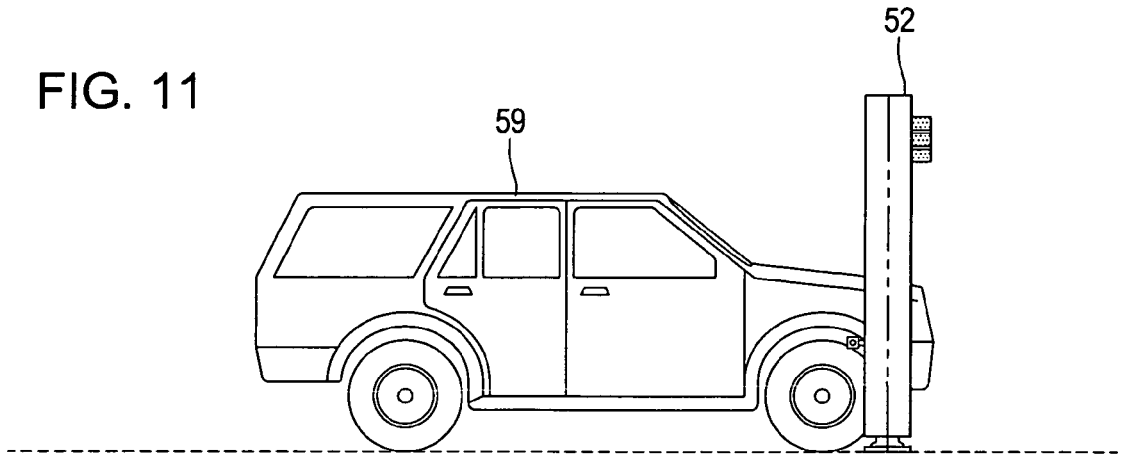
FIG. 11 depicts an exemplary side view of the leak detection system of FIG. 2 for another sample.
Figure 12:
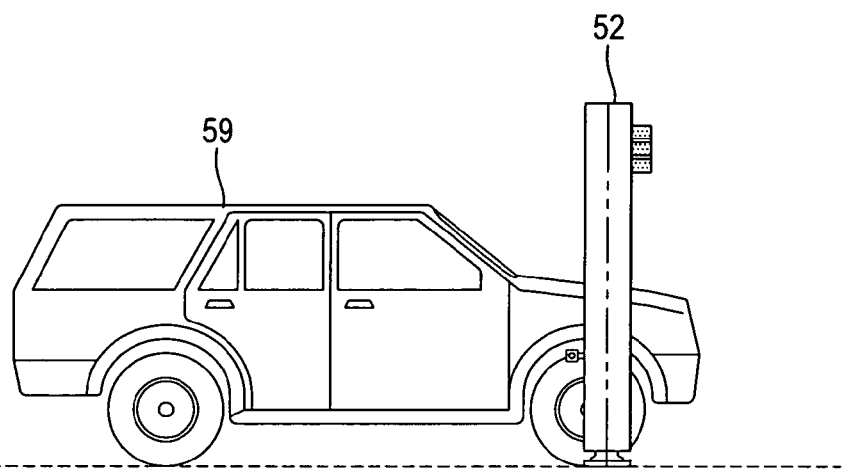
FIG. 12 depicts an exemplary side view of the leak detection system of FIG. 2 for yet another sample.
Figure 13:
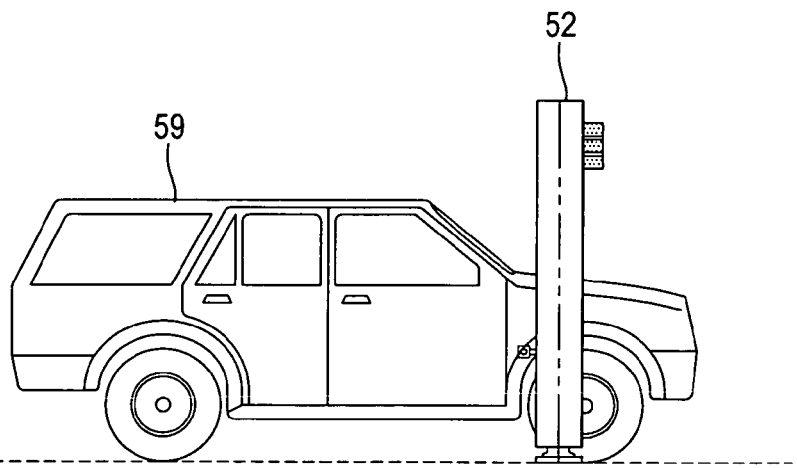
FIG. 13 depicts an exemplary side view of the leak detection system of FIG. 2 for yet another sample.

As an example, FIG. 10 depicts an exemplary position of the vehicle 59 relative to the structure 52 when the first sample is taken. After this first sample, the vehicle 59 is moved such that it is further passed through the structure 52, as depicted by FIG. 11, when the second sample is taken. Moreover, the vehicle 59 continues to move through the structure 52 as additional samples are taken. For example, FIG. 12 depicts an exemplary position of the vehicle 59 relative to the structure 52 when the third sample is taken, and FIG. 13 depicts an exemplary position of the vehicle 59 relative to the structure 52 when the fourth sample is taken. Further, additional samples are taken as the vehicle 59 moves through the structure 52 such that an abnormal leak at any point along the length of the vehicle compartment 36 can be successfully detected, as described herein.

By tracking the position of the vehicle 59 and, therefore, the compartment 36 relative to the sensors 45a-p, the locations of abnormal leaks can be identified. In one exemplary embodiment, the object sensing system 46 (FIG. 1) detects the location of the vehicle 59 and provides the test manager 50 with data indicative of such location. Thus, for each sample, the test manager 50 is aware of the sensors' positions relative to the vehicle 59. In fact, as will be described in more detail hereafter, the position of the vehicle 59 relative to the sensors 45a-p may be used by the test manager 50 to control when samples are to be taken. Moreover, if any sensor 45a-p has detected an abnormally high level of ultrasonic energy for any sample, then the test manager 50 determines that an abnormal leak exists in the vehicle 59 at an approximate location in close proximity to the sensor 45a-p that detects the abnormally high level of ultrasonic energy.

There are various techniques that may be used to track the vehicle's position relative to the sensors 45a-p. In one exemplary embodiment, the object sensing system 46 comprises an object sensor 137 (FIG. 3) and a distance sensor 139 (FIG. 1). The object sensor 137 senses when the leading edge 138 (e.g., the front edge of the front bumper if the vehicle 59 is passing through the structure 52 in the orientation depicted by FIGS. 2-4) of the vehicle 59 arrives at or in close proximity to the sensor 137. For example, the object sensor 137 may be implemented as an optical sensor, such as an infrared sensor, that optically senses the presence of the vehicle 59. In the embodiment depicted by FIG. 3, the object sensor 137 is an optical receiver that receives an optical signal continuously transmitted from an optical transmitter 141. Thus, the object sensor 137 detects that the leading edge 138 of the vehicle 59 has reached reference line 142 when reception of the optical signal is interrupted (i.e., when the sensor 137 stops receiving the optical signal transmitted from transmitter 141). Other types of sensors for detecting the location of the vehicle 59 may be employed in other embodiments.

In addition, a distance sensor 139 detects movements of one of the tracks 132, which preferably move in unison. As an example, the distance sensor 139 may comprise a shaft angle encoder or other known device commonly used for detecting movements of objects. Moreover, based on the data from the sensors 137 and 139, the test manager 50 may determine the position of the vehicle 59 relative to the sensors 45a-p. For example, once the vehicle 59 has been detected by the object sensor 137, the test manager 59 can determine how far the leading edge 138 of the vehicle 59 has progressed by determining how far the a track 132 and, therefore, the vehicle 59 have moved since the detection of the leading edge 138 by the sensor 137. Note that other techniques may be used to detect the position of the vehicle 59 relative to the sensors 45a-p. As an example, an array of optical sensors, such as infrared sensors, may be positioned along the direction of movement of the vehicle 59. Thus, as the vehicle 59 is moved through the structure 52, the test manager 50 may determine the position of the vehicle 59 based on which of the optical sensors are detecting the presence of the vehicle 59. Other types of sensors and techniques may be used to determine the movement of the vehicle 59.

In one exemplary embodiment, the sensors 45a-p continuously measure ultrasonic energy during the test and transmit each measured value to the test manager 50. Based on these values, the test manager 50 takes a sample of measured ultrasonic energy from the sensors 45a-p depending on the location of the vehicle 59 relative to the sensors 45a-p. In this regard, to facilitate the testing process, the sensors 45a-p are arranged in a line, represented as reference line 145 (FIG. 3), orthogonal to the direction of motion of vehicle 59. Thus, it is assumed that each sensor 45a-p takes its measurements along the line 145. However, for other embodiments, the sensors 45a-p can be arranged differently.

The test manager 50 is configured to take samples at specified distances along the length of the vehicle 59. For example, for illustrative purposes, assume that the test manager 50 is configured to take a sample every 12 inches (1 foot) along the length of the vehicle 59. In such an embodiment, the test manager 50 may take the first sample once the vehicle 59 has reached the reference line 145. Referring to FIG. 3, the test manager 50 may determine when this has occurred by subtracting the distance (a) that the vehicle 59 has moved from line 142 (i.e., since detection of the vehicle 59 by sensor 137) from the distance (b) of the sensor 137 from the sensors 45a-p (i.e., from line 145). Indeed, the test manager 50 can determine when to take samples according to the following formula:

$$a-b=12(c-1),$$

where a and b are expressed in inches and where c is the sample number (i.e., 1 for the first sample, 2 for the second sample, 3 for the third sample, etc.). Moreover, when the vehicle 59 has reached line 145, the above equation is true for the first sample (i.e., c=1). At this time, the test manager 50 takes the first sample by receiving and storing each measured value from each sensor 45a-p. Note that a "sample" as used herein is defined by a measured value of ultrasonic energy from each sensor 45a-p such that the data defining each sample may be analyzed to determine the amount of ultrasonic energy detected by any of the sensors 45a-p at the time of the sample. Note that the sample data 146 in memory 61 of FIG. 6 represents the sample values stored by the test manager 50 during the testing process.

After taking the first sample, c is incremented by one, and the test manager 59 takes the next sample (i.e., sample 2) when the above equation is again true. Thus, the test manager 59 takes the second sample when the leading edge 138 of vehicle 59 has moved 12 inches past line 145, and the test manager 59 takes the third sample when the leading edge 138 of vehicle 59 has moved 24 inches past line 145. By continuing to take samples in this manner, a sample is taken every 12 inches along the length of the vehicle 59. It should be noted that the foregoing example has been provided for illustrative purposes, and there are an infinite number of ways that samples of the vehicle 59 may be taken in other embodiments.

As an example, the value b may be eliminated from the algorithm such that a sample is taken according to the formula:

$$a=12(c-1),$$

Using this methodology may change the relative position of the vehicle 59 for each sample. In addition, it is unnecessary for the entire length of the vehicle 59 or compartment 39 to be tested, and it is possible for the distance between samples to be varied. For example, it is unnecessary for each sample to occur the same distance after the last sample. In addition, other distances are possible in other embodiments. For example, to provide more precise leak location information, the vehicle 59 may be sampled (e.g., about every 1 inch) such that the distance between samples is less.

In one exemplary embodiment, vehicle data 130 (FIG. 6) stored in the memory 61 of the test manager 50 associates each sensor 45a-p with a respective threshold for each sample. The threshold associated with a sensor 45a-p is set such that, if the ultrasonic energy measured by the sensor 45a-p for the sample exceeds the associated threshold, then an abnormal leak is present in the vehicle 59. Moreover, as described above, for each sample, the test manager 50 stores a measured value from each sensor 45a-p at the time of the sample. For each such value received from a sensor 45a-p, the test manager 50 compares the value to the sensor's associated threshold. If the value exceeds the threshold, then the test manager 50 determines that an abnormal leak is present in the vehicle 59. Exemplary techniques for locating the detected leak within the vehicle 59 will be described in more detail hereinbelow.

In this regard, for each sample taken by the sensors 45a-p, each sensor 45a-p corresponds to a different area around the perimeter of the vehicle 59. If a vehicle compartment leak is within or close to this corresponding area, then the sensor 45a-p likely detects an amount of ultrasonic energy that exceeds the sensor's associated threshold defined by the data 130.

As an example, assume that the vehicle 59 is positioned relative to the structure 52 as depicted by FIG. 4. In such an example, regions 141a-f (FIG. 14) respectively correspond to sensors 45a-f. In particular, region 141a (FIG. 14) corresponds to sensor 45a, and region 141b corresponds to sensor 45b. In addition, region 141c corresponds to sensor 45c, and region 141d corresponds to sensor 45d. Further, region 141e corresponds to sensor 45e, and region 141f corresponds to sensor 45f. In general, a region "corresponds" to a sensor if the sensor is positioned such that its measurement is affected the most (relative to the measurements of other sensors) by ultrasonic energy emitted from such region. Thus, if an abnormal leak exists in a particular region, then the sensor affected the most by the ultrasonic energy escaping through the abnormal leak "corresponds" to the particular region.

There are various factors that affect how much ultrasonic energy from a source, such as an abnormal leak, is received by an ultrasonic sensor. One well-known factor is the distance of the sensor from the source since ultrasonic energy can be attenuated as it travels, particularly in noisy environments where ambient noise may cancel or interfere with portions of the ultrasonic energy to be detected. In general, each sensor 45a-45p is located closer to its corresponding region as compared to the other sensors of the system 30. For example, region 141b is located closest to sensor 45b as compared to the other sensors 45a and 45c-p, and region 141c is located closest to sensor 45c as compared to other sensors 45a-b and 45d-p. However, as between any of the sensors 45a-p and its corresponding region, it is possible for another sensor to be located closer to such region.

For at least some ultrasonic sensors, another well-known factor affecting how much ultrasonic energy from a source is received by the sensor is the orientation of the sensor relative to the source or, in other words, the sensor's directivity. In this regard, it is well-known that an ultrasonic sensor can be directional in that it receives ultrasonic energy more efficiently in certain directions. For a respective sensor, a direction at which ultrasonic energy is most efficiently received by the sensor is referred to herein as an "axis of maximum reception" for the sensor. Thus, for a given ultrasonic signal, a sensor will generally measure the greatest amount of ultrasonic energy from the signal if such signal is traveling along the sensor's axis of maximum reception. In general, the greater that the signal's angle of travel deviates from the sensor's axis of maximum reception, the less efficient is the sensor's reception of such signal.

Figure 34:
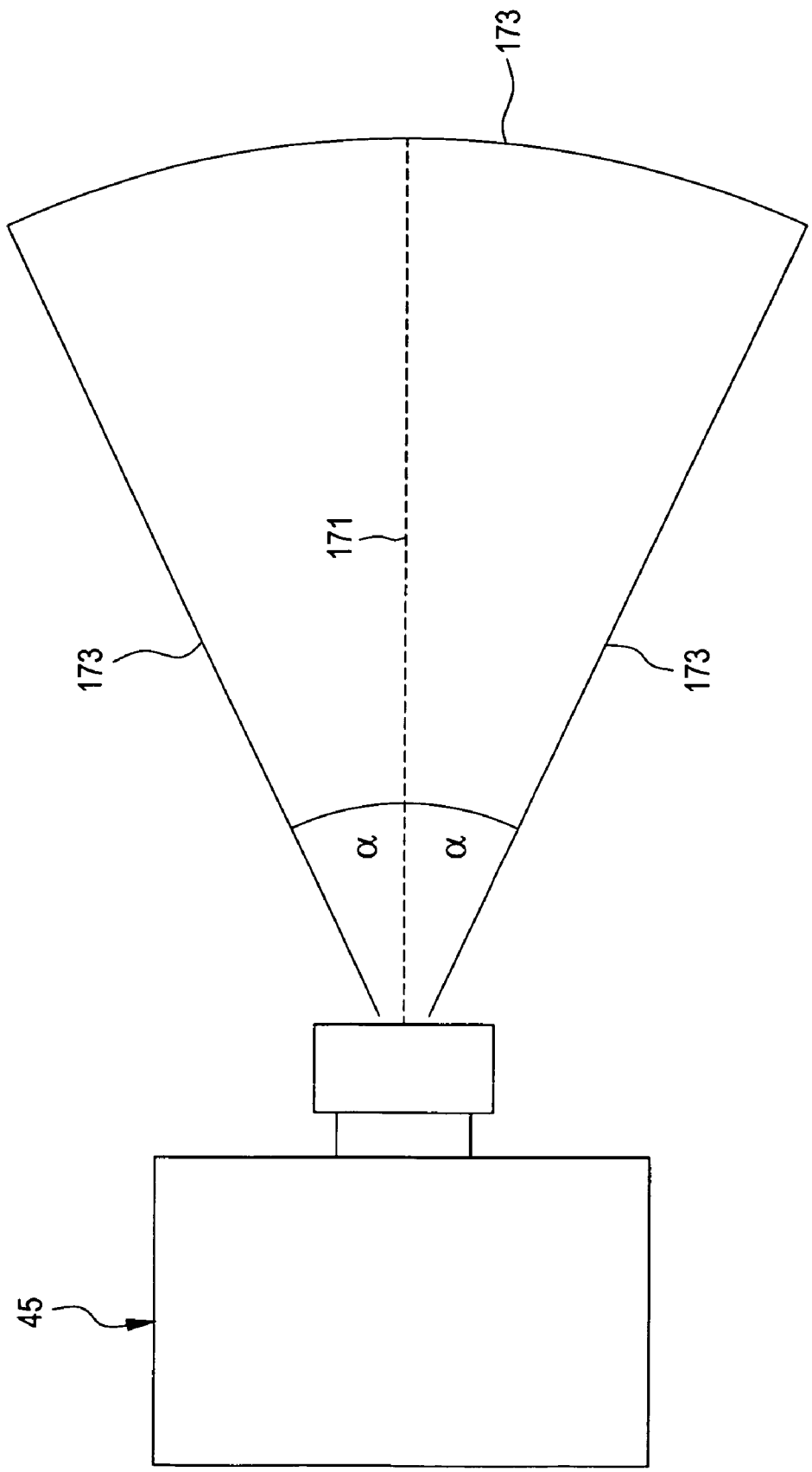
FIG. 34 depicts an exemplary area of reception for a sensor, such as depicted in FIGS. 2 and 25.

As an example, refer to FIG. 34, which depicts an exemplary sensor 45 that may be used to implement any of the sensors 45a-p. As shown by FIG. 34, the sensor 45 has an axis of maximum reception 171. The sensor 45 detects the greatest amount of ultrasonic energy from a signal if the signal is traveling toward the sensor 45 along the axis of maximum reception 171. The received strength of an ultrasonic signal generally decreases as the signal's angular direction of travel moves further from the axis of maximum reception 171 and as the distance of the source of the signal moves further from the sensor.

Moreover, the reference lines 173 generally define the half power point boundary for the sensor 45. A signal at any point within the area, referred to herein as the sensor's "area of reception," defined by the half power point boundary represented by lines 173 experiences less than a 3 decibel loss, as measured by the sensor 45, whereas a signal at any point outside of such area of reception experiences a loss of 3 dB or greater. In other words, the actual signal strength of a signal at any point within the sensor's area of reception is within 3 dB of the value measured by the sensor 45, and the actual signal strength of a signal at any point outside of the sensor's area of reception is greater than 3 dB of the value measured by the sensor 45. For example, the measured signal strength for a signal communicated at an angle greater than an angle, α, from the axis of maximum reception 171 is at least 3 dB less than its actual signal strength. Note that FIG. 34 is a two-dimensional illustration of the half power point boundary, and this boundary is actually three-dimensional (e.g., conical) in shape. The half power point boundary is well-known to those skilled in the art, and the axis of maximum reception 171 usually passes through the center of the cone defined by the half power point boundary.

To increase a sensor's sensitivity to an abnormal leak in the sensor's corresponding region 141a-p of the vehicle 59, the sensor's corresponding region 141a-p of the vehicle 59 for a given sample is preferably located within the sensor's area of reception. However, depending on signal strengths and ambient noise levels, it is possible for a sensor's corresponding region of the vehicle 59 to be located outside of the sensor's area of reception.

If the sensors 45a-p are configured as described above such that each sensor 45a-p has an axis of maximum reception 171, as illustrated by FIG. 34, then the sensors 45a-p are oriented such that the axis of maximum reception 171 of each respective sensor passes through the center of the sensor's corresponding region for a given sample. Thus, for example, the axis of maximum reception 171 of sensor 45b passes through the center of region 141b, the axis of maximum reception 171 of sensor 45c passes through the center of region 141c, and so forth. However, it is possible for the axis of maximum reception 171 for a particular sensor 45a-p to be directed to a location other than the center of the sensor's corresponding region in other embodiments without departing from the principles of the present disclosure.

Moreover, if any ultrasonic energy escapes through an abnormal leak in a given region, then the corresponding sensor 45a-p is oriented such that its measurement will likely be affected the most by such ultrasonic energy relative to those of the other sensors 45a-p. In this regard, the region's corresponding sensor should detect the greatest amount of the ultrasonic energy that is passing through the abnormal leak.

Further, if a leak is present in any of the regions 141a-f, then the thresholds are preferably defined such that at least the corresponding sensor 45a-f will detect an amount of ultrasonic energy exceeding the sensor's associated threshold defined by the data 130. For example, if an abnormal leak is within region 141d, then the corresponding sensor 45d preferably detects an abnormally high amount of ultrasonic energy (e.g., the measured value from sensor 45d exceeds the threshold associated with this sensor 45d). Thus, by comparing the value from sensor 45d indicative of the amount of sensed ultrasonic energy, the test manager 50 can detect the presence of the leak.

Note that an abnormal leak in a particular region 141a-f may cause multiple thresholds to be exceeded. For example, ultrasonic energy passing through the leak described above as being within region 141d may result in significant increases in the ultrasonic energy being detected by, not only the corresponding sensor 45d, but also by the sensors 45c and 45e corresponding to the adjacent regions 141c and 141e, respectively. Thus, due to the leak in such an example, the amount of ultrasonic energy detected by sensor 45c may exceed the threshold associated with sensor 45c even though no leak actually exists in the corresponding region 141c. Further, due to the foregoing exemplary leak in region 141d, the amount of ultrasonic energy detected by sensor 45e may exceed the threshold associated with sensor 45e even though no leak actually exists in the corresponding region 141e.

However, it is likely that the leak will have a greater effect on the sensor 45d corresponding to the region 141d in which the leak is present. Thus, if the thresholds are appropriately set in the instant example, as will be described in more detail hereafter, it is likely that the leak will cause the value from sensor 45d to exceed the threshold associated with this sensor 45d by a greater extent as compared to respective differences between the values from sensors 45c and 45e and the thresholds associated with these sensors 45c and 45e. Accordingly, by analyzing the extent to which the thresholds associated with sensors 45c-45e are exceeded, it is possible for the test manager 50 to correctly determine that the leak is within region 141d.

For example, if the difference between the sample value from sensor 45d and the threshold associated with sensor 45d is significantly greater than the differences between the sample values from sensor 45c and 45e and the associated thresholds for these sensors 45c and 45e, then the test manager 50 can determine that a leak only exists in region 141d.

In one example, the test manager 50 determines the percentage that each threshold is exceeded and bases its analysis on such percentages rather than the absolute differences between sample values and thresholds. There are various ways that measurements for adjacent regions can be analyzed in order to pinpoint the areas of abnormal leaks.

However, it should be noted that, in many instances, a leak will cause only the sensor 45a-p corresponding to the region of the leak to detect a significantly increased amount of ultrasonic energy. In such situations, the region of the leak can be easily identified without comparing the differences between the sample values and thresholds of adjacent regions. Further, it is unnecessary for the test manager 50 to pinpoint leaks. For example, the test manager 50 may simply indicate which sample values exceeded their associated thresholds, and this data may be later analyzed to determine the locations of leaks. In such an example, the test manager 50 may provide an output indicating the difference between each sample value and its associated threshold. Exemplary outputs provided by the system 30 are described in more detail hereafter.

Figure 14:
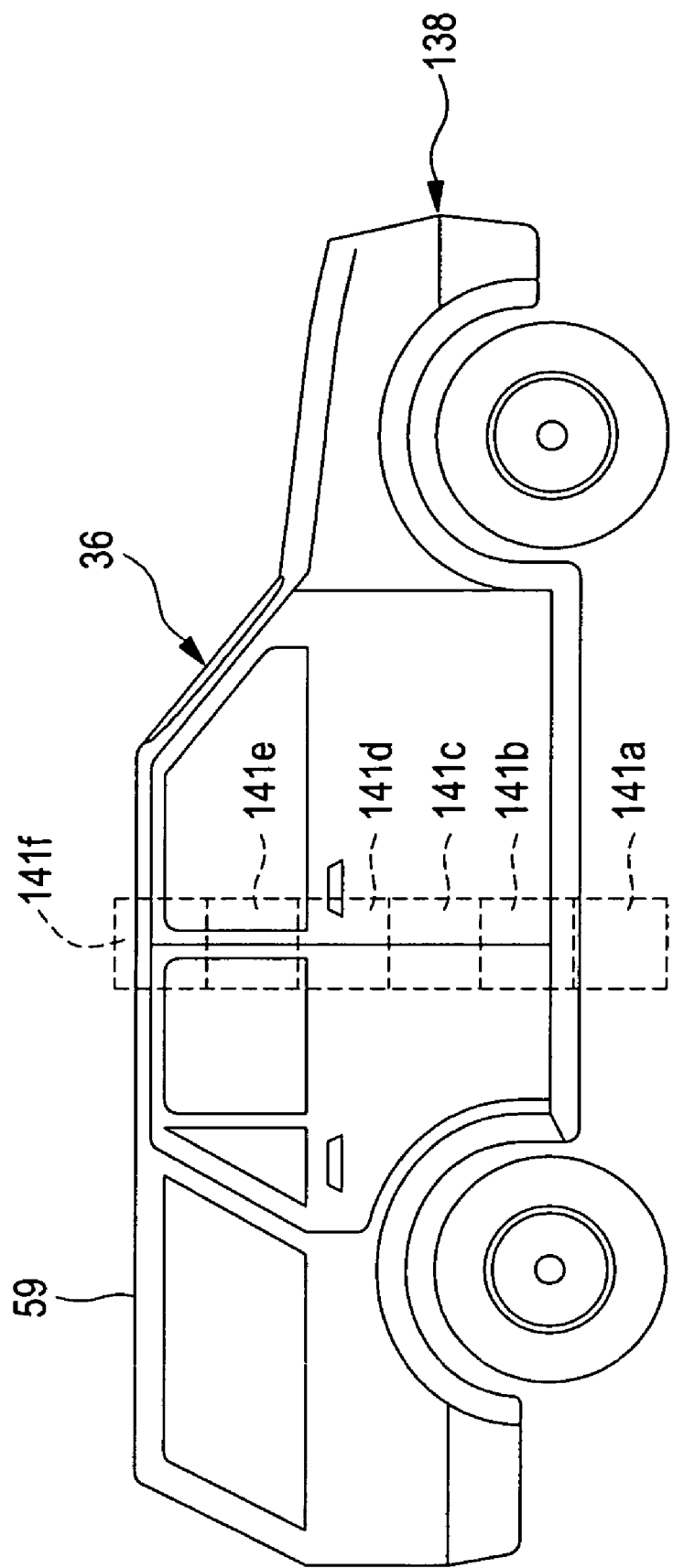
FIG. 14 depicts a side view of a vehicle tested by the leak detection system of FIG. 2 showing different regions corresponding to various ultrasonic sensors for a single sample.

It should be noted that FIG. 14 only shows the regions 141a-f corresponding to sensors 45a-f for a particular sample. Other regions similarly correspond to the other sensors 45g-p for the same sample. For example, sensors 45g-j may correspond to regions on the top surface (i.e., roof) of the vehicle 59, and sensors 45k-p may correspond to regions on the side of the vehicle 59 opposite of that shown by FIG. 14. Thus, if a leak is present on either the driver or passenger side of the vehicle 59 or, alternatively, on top of the vehicle 59, then the leak can be detected by at least one of the sensors 45a-p. Note that region 141a is not substantially aligned with any portion of the vehicle 59 depicted by FIG. 14. Thus, it is unlikely that the sensor 45a corresponding to region 141a will ever detect a significant amount of ultrasonic energy from the transmitter 33 in the vehicle 59 since region 141a is not likely to have a leak. However, for other models of vehicles, particularly ones that sit lower to the ground, the region 141a may be aligned with such a vehicle to a greater extent such that monitoring of the region 141a via the corresponding sensor 45a is more useful to the testing process.

Figure 15:
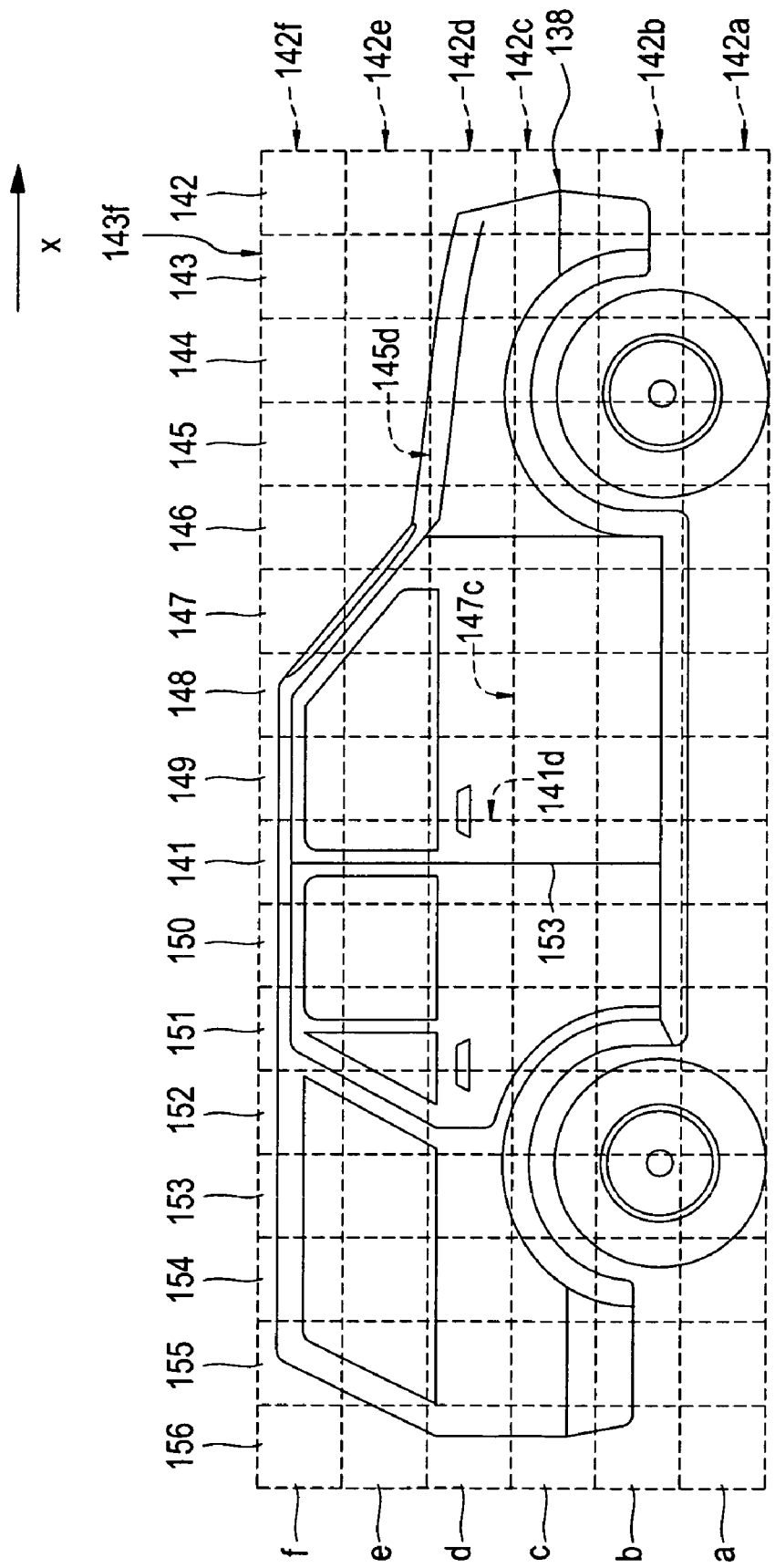
FIG. 15 depicts a side view of the vehicle of FIG. 14 showing different regions corresponding to different ultrasonic sensors for multiple samples.

FIG. 15 depicts exemplary corresponding regions for the sensors 45a-f for each sample taken by the sensors 45a-f as the vehicle 59 is passing through the structure 52. In particular, FIG. 15 depicts regions segmented into different columns 141-156 and rows a-f. Each region within the same column 141-156 corresponds to a respective ultrasonic sensor for the same sample, and each region within the same row a-f corresponds to the same ultrasonic sensor for a respective sample. For example, for the first sample, such as when the vehicle 52 is in the position depicted by FIG. 10, regions 142a-f respectively correspond to sensors 45a-f similar to how regions 141a-f correspond to sensors 45a-f in FIG. 14.

Note that regions within the same row are sampled by the same sensor during different sampling periods. For example, sensor 45f samples region 142f during the first sampling period, and sensor 45f samples region 143f during the second sampling period. Further, the sensor 45f samples other regions of the same row f during other sampling periods. Each of the regions in the same row is sampled when the axis of reception 171 of the corresponding sensor passes through the region. Thus, if an abnormal leak is present in a particular region, then the corresponding sensor would likely be affected the most by ultrasonic energy passing through the leak during the sampling period that the sensor's axis of reception 171 passes through the region. For example, in the exemplary embodiment indicated by FIG. 15, the axis of reception of the sensor 45d passes through region 141d in the ninth sampling period (i.e., for the ninth sample). Thus, if an abnormal leak is present within region 141*d*, such leak should be detected at least in the ninth sampling period when the region 141*d* is being sampled by the sensor 45*d*.

Note that the example shown by FIG. 15 is consistent with the previously described sampling methodology in which a sample is taken along the length of the vehicle 59 every 12 inches or 1 foot. If such a methodology is used to take samples resulting in the segmentation of the regions depicted by FIG. 15, then each region shown by FIG. 15 may be 1 foot in width (in the x-direction) such that the center of each region is (n−1) feet from the leading edge of the vehicle 59, where n is the corresponding sample number. For example the centers of regions 142*a-f* may be at the leading edge 138 of the vehicle 59, and the centers of the regions in column 143 may be one foot from the leading edge 138 of the vehicle 59. Indeed, in the embodiment depicted by FIG. 15, each sensor 45*a-p* is preferably aligned with the center of its corresponding region for a given sample. For example, for sample number 9, sensor 45*d* is aligned with the center of its corresponding region 141*d* and is closest to this region 141*d* as compared to the other ultrasonic sensors.

As described above, vehicle data 130 associates a respective threshold for each of the sensors 45*a-p* on a per sample basis. In this regard, each threshold is preferably defined to approximately equal the expected amount of ultrasonic energy that the threshold's associated sensor 45*a-p* is to detect if the vehicle 59 being tested is free of abnormal leaks (i.e., if the seal of compartment 36 is non-defective). Thus, if a threshold is exceeded by the sample value from the associated sensor 45*a-p*, then it is likely that the vehicle 59 has an abnormal leak. Further, as described above, a detected leak is likely close to or in the sensor's corresponding region. For example, as described above, region 141*d* is associated with sensor 45*d* for sample number 9 (i.e., the ninth sample). Thus, if the value from sensor 45*d* for sample number 9 (i.e., when the sensor 45*d* is aligned with the center of region 141*d*) exceeds the threshold associated with sensor 45*d* for this sample, then there is likely an abnormal leak close to or in the region 141*d*.

FIG. 16 depicts an exemplary table of thresholds that may be defined by the data 130 (FIG. 6) for the sensors 45*a-p* on a per sample basis. As shown by FIG. 16, each sensor 45*a-p* is associated with a different threshold for a different sample. For example, sensor 45*d* is associated with the threshold value of 10.0 for the first sample (i.e., sample 1). Thus, for the first sample, the sample value measured by the sensor 45*d* is compared to the threshold value of 10.0 by the test manager 50. However, for the ninth sample, the sample value measured by the sensor 45*d* is compared to the threshold value of 15.0 by the test manager 50. The result of this comparison likely indicates whether a leak exists in the region 141*d* corresponding to sensor 45*d* for sample 9. Thus, the data 130 effectively associates the threshold 15.0, not only with sensor 45*d* for sample 9, but also with region 141*d*. Indeed, the data 130 indicates that this threshold should be exceeded if an abnormal leak exists in the region 141*d*.

As can be seen by comparing FIG. 16 to FIG. 15, the thresholds indicate an expected amount of ultrasonic energy to be detected by the associated sensors 45*a-p* for a leak-free vehicle 59. For example, threshold values are low if they are associated with a sensor 45*a-p* that is monitoring a region not substantially aligned with the vehicle compartment 36 being tested. As a mere example, the threshold associated with sensor 45*a* for sample 1 is relatively low (i.e., 10.0). Moreover, for this sample, the sensor 45*a* corresponds to region 142*a*, which (as shown by FIG. 13) is not aligned with the vehicle 59. Therefore, for sample 1, the sensor 45*a* should not detect a relatively high amount of ultrasonic energy. Region 145*d* is aligned with the vehicle 59 but not with the passenger compartment 36 being tested. Thus, the threshold associated with the sensor 45*d* corresponding to region 145*d* for sample number 4 is low indicating that sensor 45*d* should not detect a relatively high amount of ultrasonic energy.

Further, the threshold associated with sensor 45*c* for sample 6 is low (i.e., 10.0). For this sample, the sensor 45*c* corresponds to region 147*c*, which (as shown by FIG. 15) is aligned with the compartment 36 but there are no seams in this region 147*c*. Thus, unless a leak exists in or close to this region 147*c*, the sensor 45*c* should not detect a relatively high amount of ultrasonic energy. If a high amount of energy (i.e., an amount above 10.0) is detected by sensor 45*c* for this sample, then the test manager 50 may detect the presence of an abnormal leak close to or within the region 147*c*.

However, the threshold associated with sensor 45*d* for sample 9 is relatively high (i.e., 15.0). For this sample, the sensor 45*d* corresponds to region 141*d*, which (as shown by FIG. 15) is aligned with a portion of the vehicle 59 that has a seam 153. Even without an abnormal leak in region 141*d*, a relatively high amount of ultrasonic energy may escape through this seam 153, and the foregoing threshold may, therefore, be set higher than other thresholds as shown by FIG. 16. Indeed, in the instant example, the sample value determined by the sensor 45*d* for sample 9 can reach as high as 15.0 without the test manager 50 detecting an abnormal leak based on this sample value.

Note that the thresholds defined by the data 130 may be empirically determined. For example, to initialize the thresholds, a vehicle of the same type (e.g., model) to be tested that is known or believed to be free of abnormal leaks may be passed through the structure 52, as described above, while the transmitter 33 in the vehicle is emitting ultrasonic energy and while the sensors 45*a-p* are actively sensing ultrasonic energy. Moreover, the sample values measured by the sensors 45*a-p* for samples 1-16 may then be used to define the thresholds. If desired, the sample values from multiple vehicles of the same or similar type (e.g., model) may be averaged to define the thresholds.

Moreover, to have the thresholds tailored to the type of the vehicle being tested so that more accurate test results are possible, it may be desirable to define multiple sets of thresholds for different vehicle types (e.g., models). In this regard, differences in the designs of different types of vehicles may result in variations in the amount of ultrasonic energy that normally escapes from vehicles free of abnormal leaks. For example, for a given model of a sports utility vehicle (SUV), such as the one depicted in FIG. 15, a certain amount of ultrasonic energy may normally escape from the vehicle 59 along the seam 153 between the front door and the rear door even when there is no abnormal leak along this seam 153. Moreover, as described above, the thresholds associated with regions 141*b-f* along the seam 153 are based on this expected amount of ultrasonic energy escaping along the seam 153. However, the normal amount of ultrasonic energy that escapes from the corresponding seam between the front and rear doors of another vehicle model, such as a model of a car, may be quite different than the amount expected for the SUV. Thus, it may be desirable to define, for the car, different thresholds for the regions along the seam between the front and rear doors as compared to the thresholds for the aforementioned regions of the SUV of FIG. 15 along the seam 153.

Figure 17:
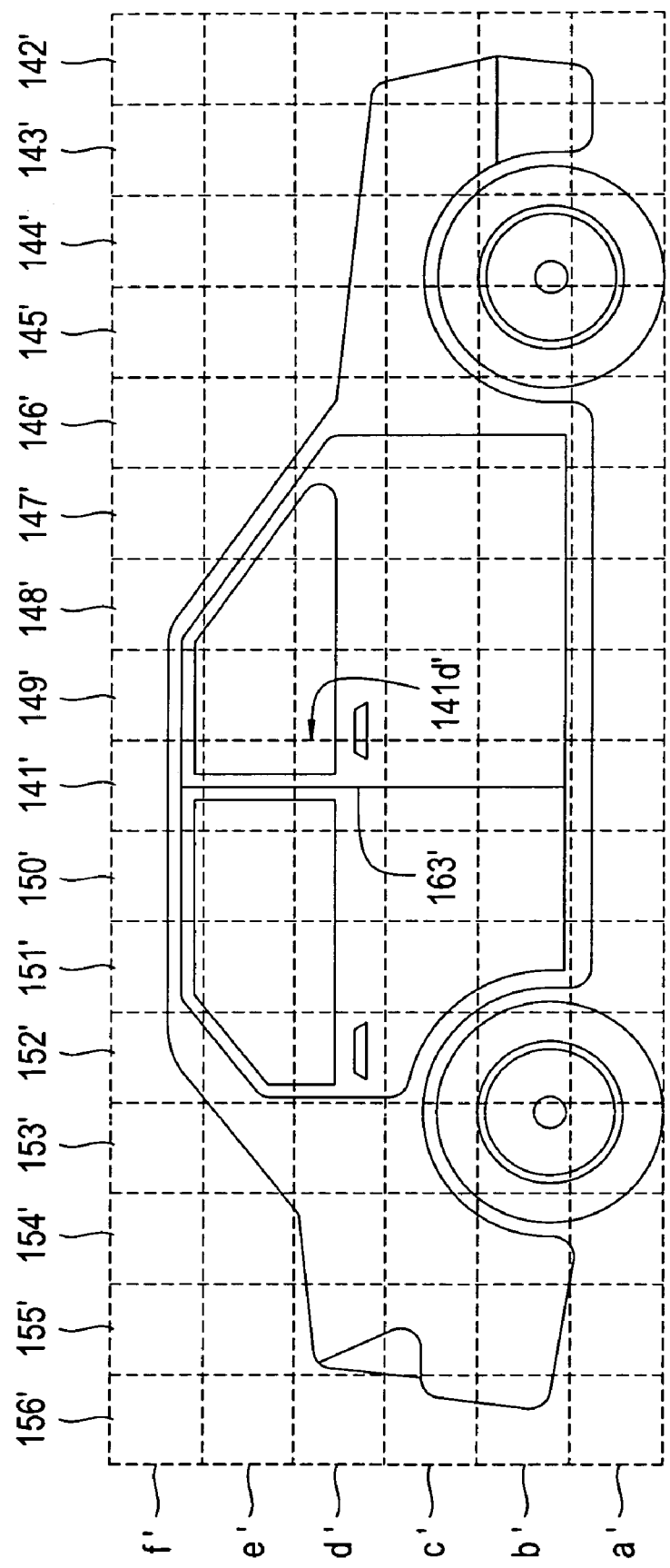
FIG. 17 depicts a side view of another vehicle tested by the leak detection system of FIG. 2 showing different regions corresponding to different ultrasonic sensors for multiple samples.

To better illustrate the foregoing, refer to FIGS. 17 and 18. FIG. 17 depicts exemplary sampling regions for a car 159, similar to the diagram of FIG. 15 for the SUV 59. In this regard, FIG. 17 depicts exemplary corresponding regions for the sensors 45a-f for each sample taken as the car 159 is passing through the structure 52. In particular, FIG. 17 depicts regions segmented into different columns 141'-156' and rows a'-f'. Similar to FIG. 15, each region within the same column 141'-156' corresponds to a respective ultrasonic sensor for the same sample, and each region within the same row a'-f' corresponds to the same ultrasonic sensor for a respective sample.

Further, FIG. 18 depicts, for the car 159, an exemplary table of thresholds that may be defined by the data 130 for the sensors 45a-f on a per sample basis, similar to how FIG. 16 depicts an exemplary table of thresholds for the SUV 59 of FIG. 15. According to the diagram of FIG. 17, the sensor 45d corresponds to the region 141d' aligned with the seam 153'. Thus, if an abnormal leak is located in this region 141d', then such a leak should be detected based on the data output by the sensor 45d for sample 9. As can be seen by comparing FIGS. 17 and 18, the threshold used to compare to this sample value output by the sensor 45d is 13.0. This threshold is different than the one used for the region 141d of the SUV 59 aligned with the seam 153. Indeed, by comparing FIGS. 16 and 18, it can be seen that different threshold profiles can be defined for different vehicle types such that the thresholds used for a particular vehicle are tailored to the vehicle's type to account for the fact that different vehicle model or styles may have different sealing characteristics.

Thus, if the system 30 is being used to test an SUV, similar to the one depicted by FIG. 15, then the test manager 50 can be configured to use the thresholds depicted by FIG. 16. However, if the system 30 is being used to test a car, similar to the one depicted by FIG. 17, then the test manager 50 can be configured to use the thresholds depicted by FIG. 18. Moreover, the vehicle data 130 may store both of the threshold profiles shown by FIGS. 16 and 18, and the test manager 50 may select the appropriate one during testing based on the type of vehicle being tested. To enable the test manager 50 to make the appropriate selection, the test manager 50 may receive an input, such as a vehicle identification number (VIN), from a user or other source indicating the type of vehicle being tested.

Note that different threshold profiles may be defined for various category levels. For example, a different threshold profile may be defined for the categories of "truck," "car," and "SUV." In such an example, a first threshold profile may be used for all trucks, a second threshold profile may be used for all cars, and a third threshold profile may be used for all SUVs. However, in other examples, any of the categories may be further divided or different categories may be used altogether. As a mere example, a different threshold profile may be used for different SUVs depending on the model of SUV being tested. For example, a first threshold profile may be used for a Ford Explorer™, whereas a second threshold profile may be used for a Toyota Pathfinder™. Moreover, the different threshold profiles may be categorized in any desired manner without departing from the principles of the present disclosure.

However, the vehicle identifier received by the test manager 50 for enabling selection of the appropriate threshold profile preferably includes sufficient type information to identify the threshold profile for the vehicle to be tested. For example, if the thresholds are categorized according to just three categories (e.g., truck, car, and SUV), then the vehicle identifier may simply indicate whether the vehicle to be tested is a truck, car, or SUV. However, if the threshold profiles are categorized according to whether the vehicle is a particular type (e.g., model) of truck, car, or SUV, then the vehicle identifier preferably indicates sufficient information to identify the particular type (e.g., model) of truck, car, or SUV being tested. Thus, the vehicle identifier provided to the test manager 50 is preferably of sufficient specificity to enable the test manager 50 to select the appropriate threshold profile for the vehicle being tested.

Note that is it is common for all vehicles to be respectively assigned a vehicle identification number (VIN) that uniquely identifies each vehicle from all other vehicles. In one embodiment, the VIN of the vehicle being tested is used to select the appropriate threshold profile. For example, a user may enter an input indicative of the VIN. Alternatively, the VIN may alternatively be captured (e.g., via optical scanning) by an electronic device (e.g., the scanner 88 of FIG. 6) and transmitted to the test manager 50.

In such an example, the vehicle data 130 preferably includes sufficient information for correlating the VIN with the appropriate threshold profile to be used for the testing, and the test manager 50 uses this information to select the appropriate threshold profile. For example, the data 130 may include a list of VINs, and each VIN may be correlated with the respective threshold profile to be used for testing the vehicle identified by the VIN. Alternatively, the data 130 may correlate vehicle model identifiers with different threshold profiles. In this regard, it is well-known for a portion of a vehicle's VIN to identify the model of the vehicle. Thus, vehicles of the same model have the same model identifier included within their VINs. For each VIN, the test manager 50 may be configured to extract the vehicle's model identifier from the VIN and select the threshold profile correlated with the extracted model identifier. Thus, the same threshold profile is used to test vehicles of the same model, but different threshold profiles may be used to test other models. Various other techniques for selecting the appropriate threshold profile to be used to test a vehicle may be employed in other embodiments.

Figure 19:
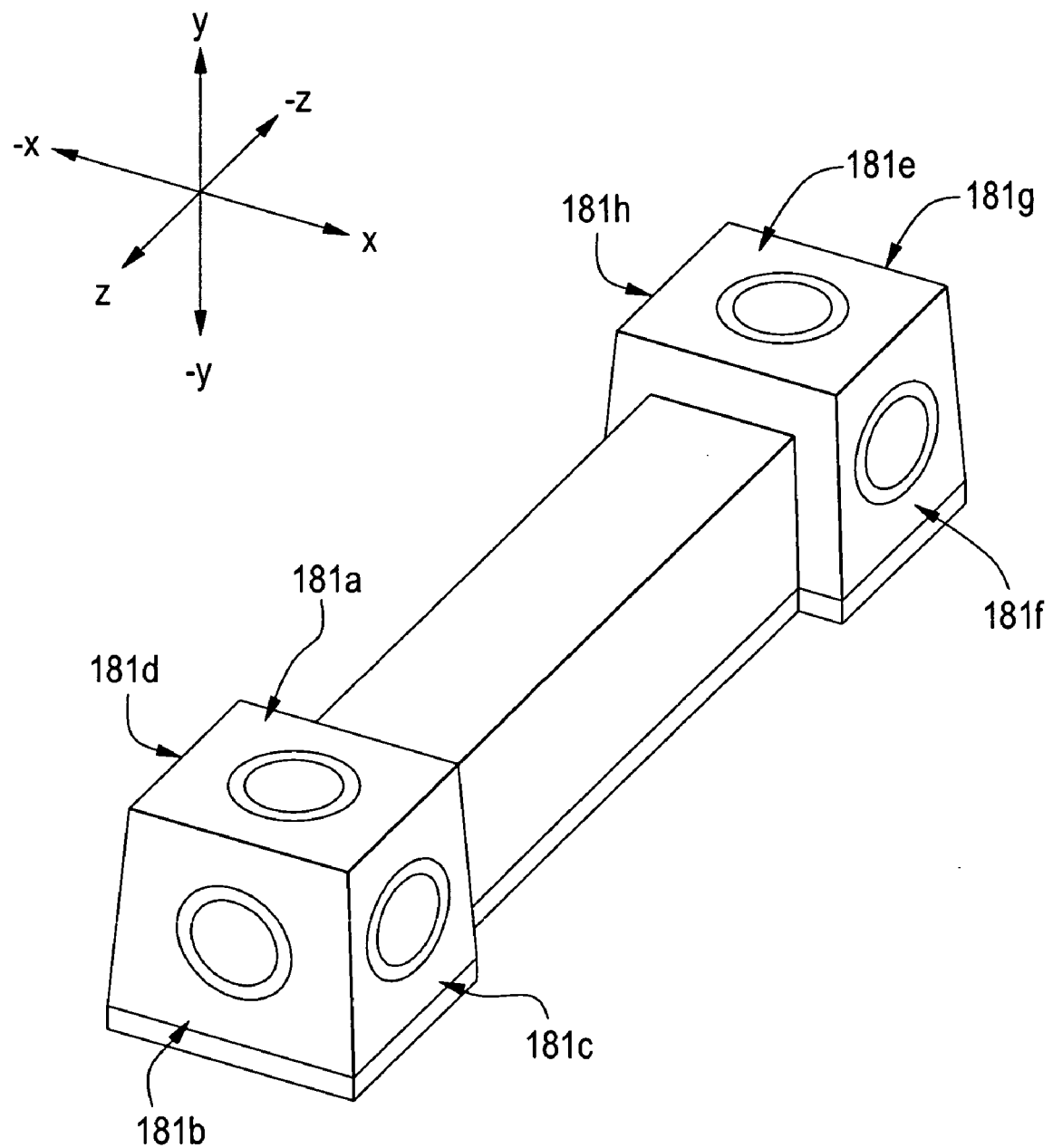
FIG. 19 depicts a three-dimensional view of an exemplary ultrasonic transmitter placed within a passenger compartment of a vehicle depicted in FIG. 2.
Figure 20:
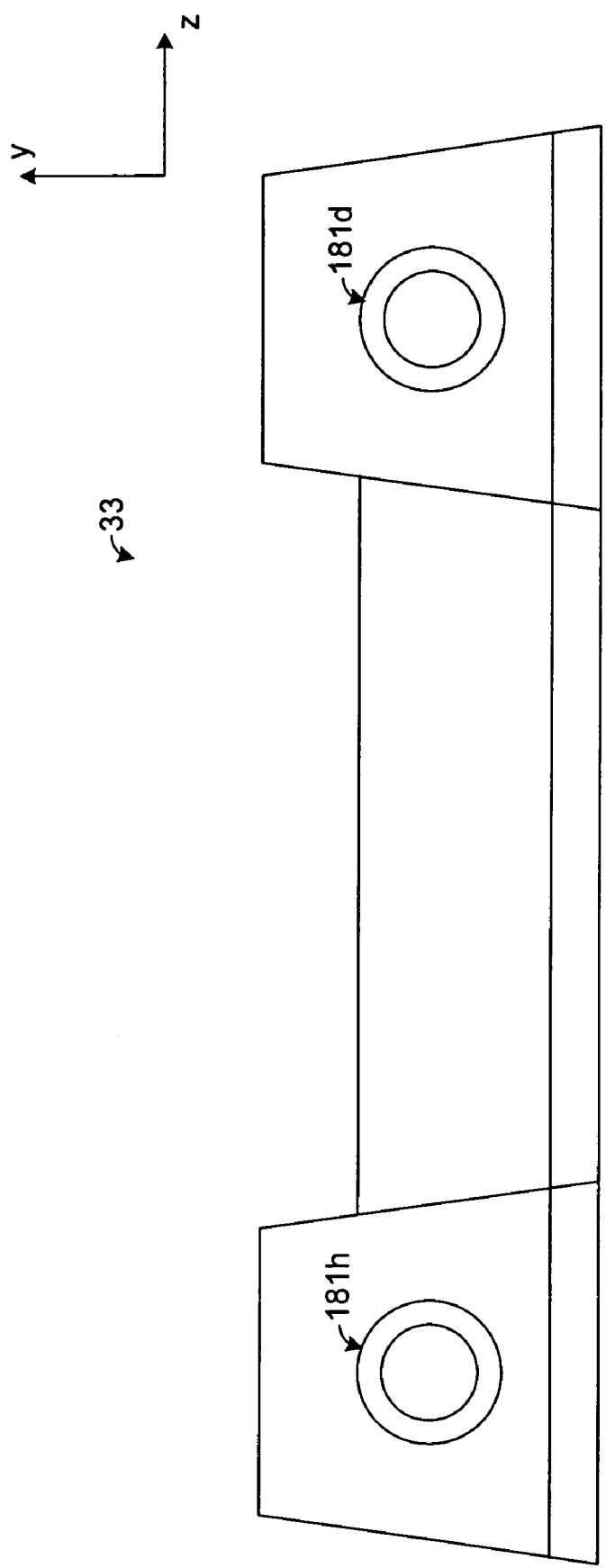
FIG. 20 depicts a back view of the transmitter depicted in FIG. 19.

In addition to tailoring the threshold profile to the type of vehicle being tested, the operation of the transmitter 33 can also be tailored to the type of vehicle being tested, as will be described in more detail hereinbelow, in order to improve test results. In this regard, FIGS. 19 and 20 depict a transmitter 33 in accordance with an exemplary embodiment of the present disclosure. The transmitter 33 has a plurality of transducers 181a-h. Each of the transducers 181a-h converts electrical energy into ultrasonic energy and transmits converted ultrasonic energy in a different direction as compared to the other transducers. In the exemplary embodiment depicted by FIGS. 19 and 20, the transmitter 33 has eight transducers 181a-h, which are respectively pointed in and transmit ultrasonic energy in different directions. In this regard, at least one respective transducer 181a-h is pointed in and transmits ultrasonic energy in each of the x, −x, z, −z, and y-directions. Thus, the direction of transmission for each respective transducer 181a-h is either parallel or orthogonal to the direction of transmission of the other transducers. For example, the direction of transmission of transducers 181d and 181h is in the −x direction, which is orthogonal to the directions of transmission of transducers 181a, 181b, 181e, and 181g (i.e., y, z, and −z directions). Further, the direction of transducers 181d and 181h is opposite to the direction of transmission of transducers 181c and 181f (i.e., x direction). However, other numbers of transducers and other directions of transmission are possible in other embodiments.

In some instances, depending on the acoustic characteristics of the vehicle 59 being tested, all of the transducers 181a-181e may be configured to continuously emit ultrasonic energy at a constant transmission power. As used herein, the "transmission power" refers to the power level of ultrasonic energy as it leaves the transducer that is transmitting it. Transmitting ultrasonic energy continuously in so many different directions can increase the probability that, if there is an abnormal leak, significant ultrasonic energy will be directed toward and pass through the leak, thereby enabling detection of the leak by the test manager 50. Such a mode of operation for the transmitter 33 will be referred to hereafter as the "normal mode" of operation.

However, depending on the acoustic characteristics of the passenger compartment 36 in which the transmitter 33 is placed, it is possible for the ultrasonic energy to be redirected via the interior of the compartment 36 such that at least some of the ultrasonic energy interferes or cancels some of the ultrasonic energy within the compartment 36. Thus, the total amount of ultrasonic energy may be decreased possibly reducing the amount of ultrasonic energy that would otherwise pass through an abnormal leak. Accordingly, detection of the abnormal leak may be more difficult. In such situations, it may be desirable to reduce or eliminate the amount of ultrasonic energy emitted by at least one of the transducers 181*a-h*.

For example, depending on the acoustic characteristics of the interior of vehicle 59, the transmission power of one or more of the transducers 181*a-h* may be adjusted (e.g., increased or decreased) to provide a more optimal testing environment. The adjustment may be permanent for the test being performed on the particular vehicle 59, or it may be temporary. For example, the transmission power of one or more transducers 181*a-h* may be reduced for the duration of the test being performed on the vehicle 59. As a further example, if it is determined that ultrasonic energy from transducer 181*a* interferes with or cancels ultrasonic energy from transducer 181*b*, then transducer 181*a* may be deactivated during the test such that this transducer 181*a* does not emit any ultrasonic energy. In another example, the transmission power of transducer 181*a* can be intermittently reduced according to a predefined algorithm. For example, one or more of the transducers 181*a-h* may be configured to intermittently stop emitting ultrasonic energy such that at any given instant only a specified number (e.g., one) transducers 181*a-h* are emitting ultrasonic energy. There are an infinite number of ways that the emission of ultrasonic energy by the transmitter 33 can be controlled.

Figure 21:
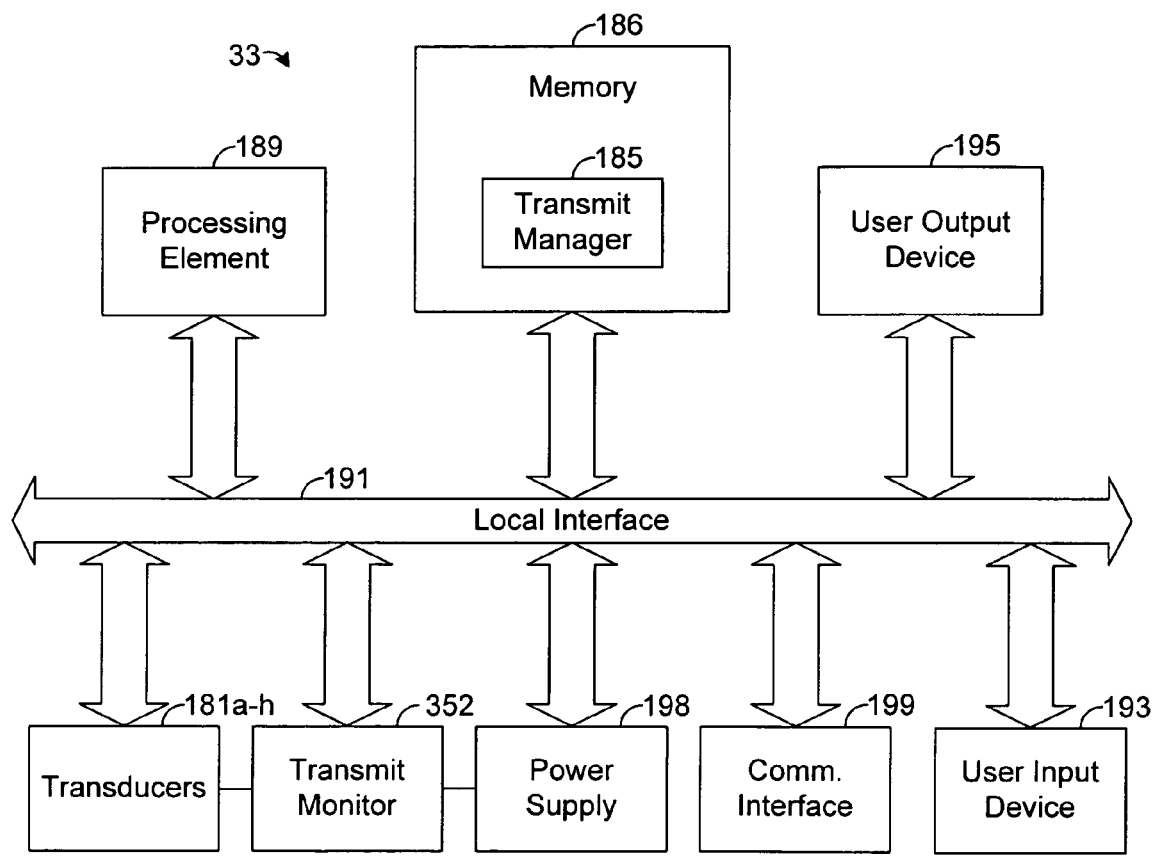
FIG. 21 is a block diagram illustrating the transmitter depicted in FIG. 19.

In one exemplary embodiment, the operation of the transducers 181*a-h* is controlled by a transmit manager 185 (FIG. 21), which can be implemented in software, hardware, or a combination thereof. In one exemplary embodiment, as depicted in FIG. 21, the transmit manager 185, along with its associated methodology, is implemented in software and stored within memory 186 of the transmitter 33. Note that the transmit manager 185, when implemented in software, can be stored and transported on any computer-readable medium for use by or in connection with an instruction execution apparatus, such as a microprocessor, that can fetch and execute instructions.

The exemplary embodiment of the transmitter 33 depicted by FIG. 21 comprises at least one conventional processing element 189, such as a digital signal processor (DSP) or a central processing unit (CPU), that communicates to and drives the other elements within the transmitter 33 via a local interface 191, which can include one or more buses. Furthermore, a user input device 193, such as one or more buttons, for example, can be used to input data from a user of the transmitter 33, and a user output device 195, such as a liquid crystal display (LCD), for example, can be used to output data to the user. The transmitter 33 also comprises a power supply 198, such as a battery, for example, to power the transmitter components. Further, a communication interface 199 enables the transmitter 33 to communicate with the system 63 of FIG. 6. In one embodiment, the communication interface 199 communicates wireless signals with the system 63, although non-wireless signals may be communicated in other embodiments. As shown by FIG. 21, the transducers 181*a-h* may be interfaced with other components of the transmitter 33 via the local interface 191.

To conserve the power supply 198, the transmit manager 185 is configured to place the transmitter 33 in a sleep state until testing of the vehicle 59 begins or is about to begin. Thus, the transmit manager 185 powers down various components, such as the transducers 181*a-h*, for the sleep state. In one embodiment, a command to wake the transmitter 33 to indicate the imminent start of testing is received via communication interface 199, as will be described in more detail hereafter. Thus, the communication interface 199 and components for implementing the test manager 185 are sufficiently powered during the sleep state to enable messages to be received by the test manager 185 via the communication interface 199.

In one embodiment, the test manager 50 (FIG. 6) determines when testing of the vehicle 59 is to begin based on the object sensor 137. In this regard, when the sensor 137 detects the presence of the vehicle 59, the test manager 50 transmits a wake command to the transmitter 33 via interfaces 83 (FIG. 6) and 199 (FIG. 21). In response, the transmit manager 185 wakes the other components of the transmitter 33, such as the transducers 181*a-h* that are to emit ultrasonic energy during testing.

In this regard, the vehicle data 130 stored in the system 63, in addition to storing the threshold profile to be used for the type of vehicle 59 being tested, also stores information indicative of the desired transmit profile to be used for the type of vehicle 59 being tested. The "transmit profile" refers to the desired manner that the transducers 181*a-h* are to be operated during testing. For example, as described above, it may be desirable to adjust the transmission power of one or more of the transducers 181*a-h* such that it transmits ultrasonic energy differently as compared to the normal mode of operation for transmitter 33.

Moreover, based on the vehicle identifier received by the test manager 50, the test manager 50, as described above, selects the appropriate threshold profile for the identified vehicle 59 as indicated by the vehicle data 130 and uses this threshold profile to test the vehicle 59. However, the test manager 50 also uses the vehicle identifier to select the appropriate transmit profile for the transmitter 33 as indicated by the vehicle data 130. The test manager 50 then transmits information indicative of the selected transmit profile to the transmitter 33 via interfaces 83 and 199. Based on this information, the transmit manager 185 controls the transducers 181*a-h* such that they operate according to the selected transmit profile during testing. Accordingly, the manner in which the transducers 181*a-h* operate can be tailored to the type of vehicle 59 being tested. For example, all vehicles of a particular type (e.g., model) can be tested according to the same transmit profile while vehicles of a different type can be tested according to a different transmit profile.

Note that the transmit profile to be used for a particular vehicle 59 may be determined based on empirical data. For example, to determine the appropriate transmit profile for a particular vehicle, a similar styled vehicle may be tested by the system 30 multiple times using different transmit profiles for each of the tests. For example, all of the transducers 181*a-h* may be operated to continuously emit ultrasonic energy at a constant transmit power for one test, and one or more of the transducers 181*a-h* may be operated to at least temporarily reduce its transmit power for another of the tests. The test results for each of the tests may then be analyzed to determine which of the transmit profiles yields the best results. The most preferred transmit profile may then be selected for use with vehicles of the same or similar type. Further, the vehicle data 130 may be updated to reflect this decision such that when a vehicle identifier identifying a vehicle of the foregoing type is received, the preferred transmit profile is used to test the vehicle. Thus, the vehicle data 130 indicates not only the appropriate threshold profile to use for each vehicle, the vehicle data 130 also indicates the appropriate transmit profile to use for each vehicle.

The vehicle data 130 may correlate vehicle identifiers with the appropriate transmit profile information using the same or similar techniques as described above for correlating the appropriate threshold profiles with the vehicle identifiers. For example, the data 130 may store a list of VINs, and the data 130 may correlate each VIN with the respective transmit profile to be used to test the vehicle identified by the VIN. Alternatively, the data 130 may correlate different model identifiers with different transmit profiles, and the test manager 50 may extract the model identifier from a VIN to select the appropriate transmit profile. Various other techniques for selecting the appropriate transmit profile are also possible.

It should be noted, however, that the information indicating the appropriate transmit profile may be stored in other locations in other embodiments. For example, such information may be stored in the transmitter 33 such that communication with the test manager 50 is unnecessary to determine the appropriate transmit profile to be used for a particular vehicle 59. Also, it is possible to use the same transmit profile for each vehicle such that it is unnecessary to determine whether the transmit profile for the transmitter 33 is to be changed from vehicle-to-vehicle as the transmitter 33 is re-used for different vehicles.

Various embodiments of the present disclosure have generally been described above as testing a passenger compartment 36 for abnormal leaks. Note that a vehicle may have more than one compartment to be tested. For example, a car may have a trunk separate from the passenger compartment, and it may be desirable to test the trunk for abnormal leaks in addition to testing the passenger compartment of the car. In such an example, transmitters 33 may be placed in both the passenger compartment and the trunk, and the testing described herein can then be performed to test both compartments. Alternatively, some vehicles have rear seats that, when placed into a folded position, create a passageway between the passenger compartment and trunk. In such a configuration, ultrasonic energy from a single transmitter 33 may flow within both the passenger compartment and the trunk allowing both compartments to be tested via the same transmitter 33.

To better illustrate several of the foregoing concepts, an exemplary methodology for testing a vehicle 59 will be described hereafter.

For the purposes of illustration, assume that the vehicle data 130 defines the tables shown in FIGS. 16 and 18. Assume that the table of FIG. 16, referred to hereafter as the "first SUV profile," is tailored for a first model of an SUV and the table of FIG. 18, referred to hereafter as the "second SUV profile," is tailored for a second model of an SUV. Further assume that the vehicle 59 being tested is an SUV of the first model, which is similar to the SUV shown by FIG. 15, and assume that an abnormal leak exists only within region 141*d*. Also assume that it has been determined that the preferred transmit profile, referred to hereafter as the "chirp profile," for SUVs of the first model is for the transducers 181*a-h* of transmitter 33 to sequentially emit ultrasonic energy such that only one transducer 181*a-h* is emitting ultrasonic energy at any given instant in time. However, it has been determined that the preferred transmit profile, referred to hereafter as the "constant profile," for SUVs of the second model is for all of the transducers 181*a-h* to simultaneously and continuously emit ultrasonic energy at a constant transmit power.

In the current example, it will be further assumed that the vehicle identifier used to identify the vehicle 59 is its VIN, which uniquely identifies the vehicle 59 from all other vehicles. Moreover, the vehicle data 130 correlates the VIN with the first SUV profile depicted in FIG. 16, since this profile is the preferred threshold profile to be used to test the vehicle 59. Thus, by analyzing the vehicle data 130, the test manager 50 is able to select the first SUV profile for the vehicle 59 based on the VIN, as will be described in more detail hereafter. The vehicle data 130 also correlates the VIN with the chirp profile since this profile is the preferred transmit profile to be used to test the vehicle 59. Thus, by analyzing the vehicle data 130, the test manager 50 is able to select the chirp profile for the vehicle 59 based on the VIN, as will be described in more detail hereafter. Note that the vehicle data 130 may similarly correlate other VINs with threshold and transmit profiles defined by the data 130 so that the test manager 50 can similarly select the appropriate threshold and transmit profiles for other vehicles that may be tested by the system 30.

Figure 22:
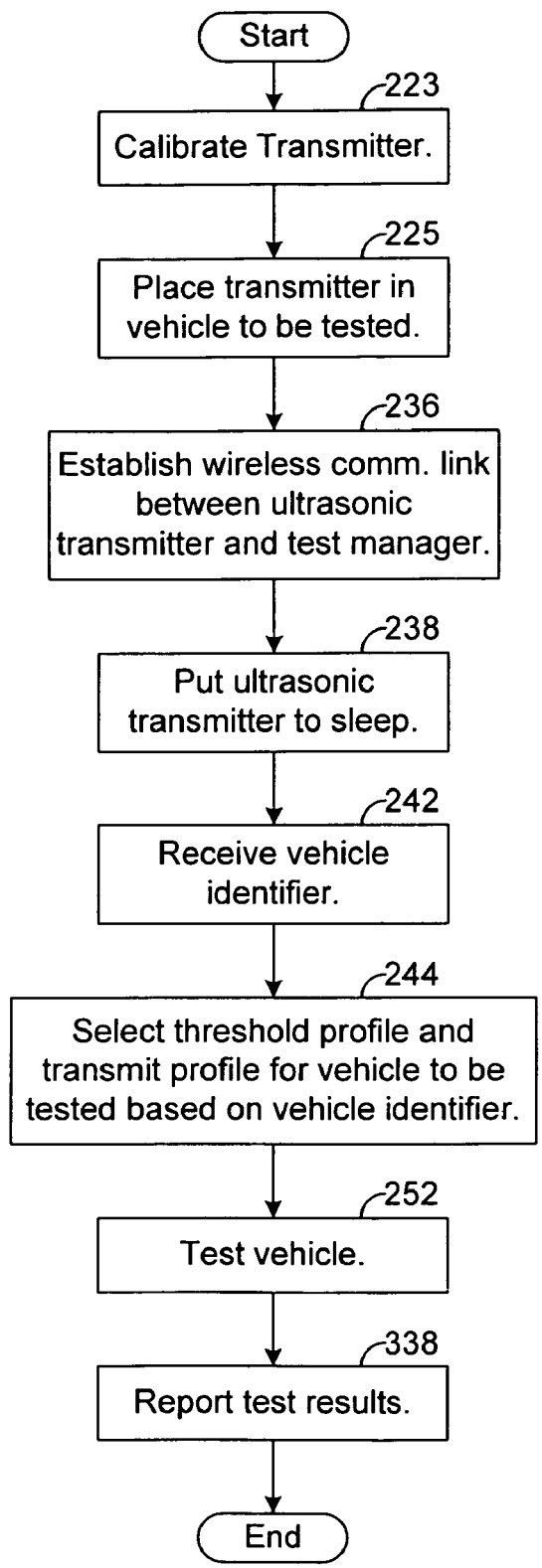
FIGS. 22 and 23 depict flow charts that illustrate an exemplary methodology for testing a vehicle for leaks.

Initially, the transmitter 33 is calibrated and placed within the passenger compartment 36 of the vehicle 59, as shown by blocks 223 and 225 of FIG. 22. Exemplary techniques for calibrating transmitters and sensors are described in U.S. Provisional Application No. 60/730,429, entitled "Sensor Calibrating System and Method," and filed on Oct. 26, 2005, which is incorporated herein by reference. As indicated by block 236 of FIG. 22, the transmit manager 185 of the transmitter 33 establishes a communication link with the test manager 50. In the instant example, this is done by transmitting, via the communication interface 199 of FIG. 21, a message at a frequency (e.g., in the RF range) to enable the message to be received by the communication interface 83 of FIG. 6. The message includes a transmitter identifier, which identifies the communication interface 199 used by the transmitter 33 so that the test manager 50, by including the transmitter identifier in messages destined for the transmitter 33, enables the communication interface 199 to receive such messages. Upon receiving the message from the transmitter 33, the test manager 50, via communication interfaces 83 and 199, transmits a reply message that includes the foregoing transmitter identifier, which enables the communication interface 199 to receive the reply message. The message also includes an identifier that identifies the communication interface 83 (FIG. 6) so that the transmit manager 185, by including this identifier in messages destined for the test manager 50, enables the communication interface 83 to receive such messages. Thereafter, the transmit manager 185 may include, in each message transmitted to the test manager 50, the identifier of communication interface 83, and the test manager 50 may include, in each message transmitted to the transmit manager 185, the identifier of communication interface 199, thereby enabling successful communication between the test manager 50 and the transmit manager 185.

After the communication link between the test manager 50 and the transmit manager 185 has been established, the transmitter 33 is put to sleep, as indicated by block 238. This can be accomplished in response to a command from the test manager 50. Alternatively, the transmit manager 185 can be configured to put the transmitter 33 into a sleep state without such a command from the test manager 50.

As indicated by block 242 of FIG. 22, a vehicle identifier (i.e., the vehicle's VIN in the current example) identifying the vehicle 59 or the type of vehicle 59 is received by the test manager 50. For example, the VIN may be attached to the vehicle 59 as is commonly done in current automotive assembly lines, and the optical scanner 88 (FIG. 6) may be used to scan the VIN into memory 61. Alternatively, the vehicle identifier may be entered into the system 63 via user input device 77 or otherwise.

Based on the VIN, the test manager 50 selects the appropriate threshold profile and transmit profile to be used to test the vehicle 59, as indicated by block 244. In the instant example, the vehicle data 130 correlates the vehicle's model identifier with the first SUV profile and the chirp profile. The test manager 50 extracts the vehicle's model identifier from the vehicle's VIN and consults the vehicle data 130. Based on the vehicle data 130 and the model identifier, the test manager 50 selects the first SUV profile and the chirp profile for the threshold profile and the transmit profile, respectively, for the vehicle 59.

At some point, the vehicle 59 moves toward the structure 52, such as, for example, by the tracks 132 (FIG. 2) moving the vehicle 59 toward and through the structure 52. As the vehicle 59 passes through the structure 52, the system 30 tests the vehicle 59 for abnormal leaks, as indicated by block 252 of FIG. 22.

In this regard, as the vehicle 59 is approaching the structure 52, the test manager 50 monitors data from the object sensor 137 (FIG. 3), which is in communication with the I/O interface 87 of FIG. 6. Once the vehicle 59 reaches the reference line 142 (FIG. 3) and interrupts the optical signal being transmitted by the transmitter 141 to the sensor 137, the sensor 137 reports this event to the test manager 50. In response, as indicated by blocks 263 and 266 of FIG. 23, the test manager 50 begins tracking how far the leading edge 238 of vehicle 59 has moved from this line 142 based on data from the distance sensor 139 (FIG. 2), which is in communication with the I/O interface 87 of FIG. 6.

Also, as indicated by block 269, the test manager 50 wakes the transmitter 33 by transmitting a wake command to the transmit manager 185. In response to this command, the transmit manager 185 powers up the components that are to be used during testing. For example, the transmit manager 185 activates the transducers 181*a-h* that are to be used in testing. In the instant example, the transducers 181*a-h* are to be operated in the chirp profile. In this regard, in addition to the wake command, the test manager 50 transmits, to the transmit manager 185, data indicative of the transmit profile selected in block 244 of FIG. 22 (i.e., the chirp profile in the instant example) so that the transmit manager 185 may control the operation of the transducers 181*a-h* according to the selected transmit profile during testing. Thus, upon awakening the transmitter 33, the transmit manager 185 controls the transducers 181*a-h* such that these transducers 181*a-h* emit ultrasonic energy according to the chirp profile. Therefore, in the instant example, the transducers 181*a-h* successively emit ultrasonic energy one after the other such that only one of the transducers 181*a-h* is emitting ultrasonic energy at any given instant in time. In other examples, the transducers 181*a-h* may be controlled based on other transmit profiles.

In the instant example, assume that the test manager 50 is configured to take a sample every 12 inches or one foot along the length of the vehicle 59 starting with the leading edge 138 of the vehicle 59. In such an example, the test manager 50 initializes a variable, x, to a value of zero, as indicated by block 272 of FIG. 23. In this regard, as indicated above with reference to FIG. 3, the value a represents the distance that the leading edge 138 of the vehicle 59 has progressed past the reference line 142, and the value b represents the distance from the reference line 142 to the reference line 145 along which the sensors 45*a-p* are aligned. As indicated by block 275 of FIG. 23, the test manager 50 waits until the value of x is greater than or equal to the value of (a–b) indicating that the leading edge 138 of the vehicle 59 has arrived at the reference line 145.

Note that while the vehicle 59 is passing through the structure 52, the transmitter 33 is emitting ultrasonic energy according to the selected transmit profile. Further, the ultrasonic sensors 45*a-p* are detecting ultrasonic energy and providing values, referred to herein as "sample values," indicative of the measured energy to the test manager 50. Further, as indicated by block 277, the test manager 50 determines whether x is greater than the total vehicle length. Until the vehicle 59 has completely passed reference line 145 (FIG. 3), x should be less than the total vehicle length. The total vehicle length compared in block 277 may be indicated by the vehicle data 130 and correlated with the vehicle identifier of the vehicle 59 so that the test manager 50 can automatically access this value during testing.

Upon a "yes" determination block 275, the test manager 50 takes the first sample, as indicated by block 278, by retaining and storing, in memory 61 (FIG. 6) as sample data 146, the current sample value from each of the sensors 45*a-p*. Note that the position of the vehicle 59 relative to the structure 52 is depicted by FIG. 10 at the time of this first sample. As indicated by block 281, the test manager 50 compares each sample value of this first sample to the associated threshold of the first SUV profile selected in block 244 (FIG. 22). For example, FIG. 16 indicates that the threshold associated with sensor 45*a* is 10.0. Thus, the test manager 50 compares this threshold with the sample value from sensor 45*a* for the first sample and detects a leak only if this sample value exceeds such threshold. The test manager 50 does the same for the other sample values of the first sample by comparing each sample value to the threshold of the first SUV profile that is associated with the respective sensor 45*a-p* from which the sample value was generated.

As indicated by block 284, the test manager 50 determines whether any leaks have been detected for the current sample (i.e., the first sample in the instant example). If any leaks are detected via performance of block 281 for the current sample, then the test manager 50 indicates that a leak has been detected, as shown by block 287. However, in the instant example, no leaks should be detected for the current sample. Thus, a "no" determination should be made in block 284, and the test manager 50 then increases x by twelve (assuming that a and b are expressed in inches), as indicated by block 291, so that the next sample will be taken twelve inches along the length of the vehicle 59 from the current sample.

After the first sample, the test manager 50 again makes a "yes" determination in block 275 once the leading edge 138 of the vehicle 59 has progressed about twelve inches past reference line 145 (FIG. 3). At this point, the test manager 50 takes the second sample, as indicated by block 278, by retaining and storing, in memory 61 as sample data 146, the current sample value from each of the sensors 45*a-p*. Note that the position of the vehicle 59 relative to the structure 52 is depicted by FIG. 11 at the time of this second sample. As indicated by block 281, the test manager 50 compares each sample value of this second sample to the associated threshold of the first SUV profile selected in block 244 (FIG. 22).

For example, FIG. 16 indicates that the threshold associated with sensor 45a is 10.0. Thus, the test manager 50 compares this threshold with the sample value from sensor 45a for the second sample and detects a leak only if this sample value exceeds such threshold. The test manager 50 does the same for the other sample values of the second sample by comparing each sample value to the threshold of the first SUV profile that is associated with the respective sensor 45a-p from which the sample value was generated.

As indicated by block 284, the test manager 50 determines whether any leaks have been detected for the current sample (i.e., the second sample in the instant example). If any leaks are detected via performance of block 281 for the current sample, then the test manager 50 indicates that a leak has been detected, as shown by block 287. However, in the instant example, no leaks should be detected for the current sample. Thus, a "no" determination should be made in block 284, and the test manager 50 then increases x by twelve, as indicated by block 291, so that the next sample will be taken twelve inches along the length of the vehicle 59 from the current sample.

Moreover, blocks 275, 277, 278, 281, 284, and 291, as well as block 287, if appropriate, are repeated for each sample as the vehicle 59 passes through the structure 52. Note that on the 9th sample, the sample value from sensor 45d should exceed the associated threshold compared to this sample value in block 281 since the corresponding region 141d has an abnormal leak in the instant example. Thus, the test manager 50, in block 287, indicates that a leak has been detected based on the data from this sensor 45d.

For example, the test manager 287 may display a message, via user output device 79 (FIG. 6), identifying the sensor 45d. Alternatively, the test manager 50 may display information indicative of the region corresponding to the sensor 45d that detected the abnormally high amount of ultrasonic energy. As an example, the test manager 50 may display a graphical image similar to FIG. 15. The region 141d corresponding to sensor 45d may be highlighted indicating that this region 141d corresponds to a sensor 45d that detected an abnormally high amount of ultrasonic energy. Thus, a user may know to examine the vehicle 59 within or close to the highlighted region 141d for a possible leak.

In addition, the test manager 50 may provide one or more visual or audio alarms upon the detection of a leak so that workers within the vicinity of the structure 52 will be alerted to the leak. As an example, FIG. 2 depicts a pair of multi-colored lights 322 that emit a color of light based on whether an abnormal leak has been detected. For example, in the absence of a detected leak, the lights 322 may exhibit a particular color, such as green, or may be turned off (i.e., emit no light). Upon the detection of a leak, the test manager 50 may be configured to cause the lights 322 to emit another color of light, such as red, to indicate that a leak has been detected. FIG. 2 depicts another multi-colored light 325 that may be similarly controlled by the test manager 50 to indicate whether a leak has been detected. Also, the system 30 may comprise one or more speakers (not specifically shown), and the test manager 50 may communicate an audible alarm or message via such speakers in response to a detection of a leak.

Once the vehicle 59 has moved completely past the reference line 145, the value of x should exceed the total length (in inches) of the vehicle 59. Once this occurs, the test manager 50 makes a "yes" determination in block 277 and then puts the transmitter 33 to sleep, as indicated by block 333. In this regard, the test manager 50 may transmit, to the transmit manager 145 of the transmitter 33, a command that causes the transmit manager 185 to power down various components, such as transducers 181a-h. Thus, the transducers 181a-h stop emitting ultrasonic energy thereby conserving the transmitter's power supply 198.

Figure 23:
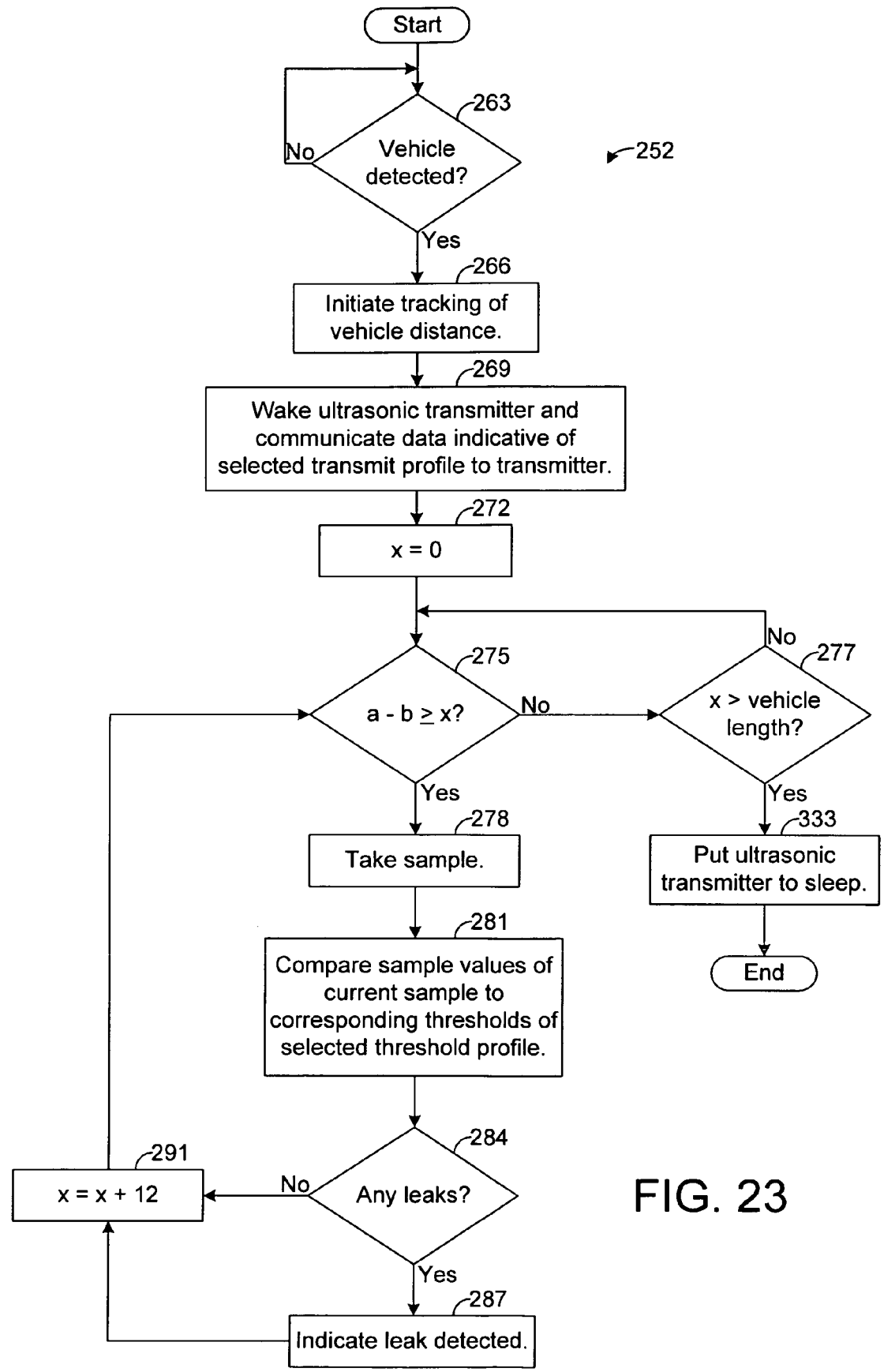

After performing the testing process depicted by FIG. 23, the test manager 50, if desired, may report results of the testing process to a user, as indicated by block 338 of FIG. 22. For example, the test manager 50 may display, via user output device 79 (FIG. 6), the sample values taken by the test manager 50 during the test. Alternatively, these sample values may be stored for future use or analyzed by a data analyzer (not specifically shown). For example, a data analyzer or a user may analyze the sample values in an attempt to precisely identify the locations of detected leaks.

Note that, if the ultrasonic transmitter 33 is not operating properly, then it is possible for a vehicle to falsely pass the test performed by the system 30. For example, if the ultrasonic transmitter 33 fails to sufficiently emit ultrasonic energy during a test, then the sensors 45a-p may not detect sufficient ultrasonic energy to identify an abnormal leak within the vehicle being tested. This issue can be particularly problematic when the system 30 is implemented on an assembly line. In this regard, when the transmitter 33 fails, such as when batteries within the transmitter 33 run down, many vehicles may be tested by the system 30 before the failure in the transmitter 33 is discovered. Re-testing vehicles that have already moved off of the assembly line can be problematic and burdensome. Thus, the system 30 is preferably configured to automatically detect certain failures of the transmitter 33 and to provide a warning when such a failure is detected. Based on this warning, corrective action can be taken to mitigate the effects of the transmitter failure. As an example, the transmitter 33 can be quickly replaced with an operable transmitter, or the problem causing the transmitter failure can be diagnosed and corrected.

In one embodiment, the transmitter 33 comprises a transmit monitor 352 (FIG. 21) that monitors the voltage or current provided by the power supply 198. In one embodiment, the transmit monitor 352 is implemented in hardware, but it is possible for at least portions of the transmit monitor 352 to implemented in software in other embodiments.

If the monitored voltage or current provided by the power supply 198 falls below a predefined threshold, then the transmit monitor 352 notifies the transmit manager 185. In response, the transmit manager 185 provides a warning about the imminent failure of the power supply 198. For example, the transmit manager 185 may communicate an audible or visual alarm indicating imminent failure of the power supply. As a mere example, the user output device 195 may comprise a light source (not specifically shown), such as a light emitting diode (LED), that when lit indicates imminent failure of the power supply 186. The test manager 185 may illuminate such a light source in response to the aforementioned notification from the transmit monitor 352.

In addition, the transmit manager 185 may communicate a message to the test manager 50 via communication interfaces 199 and 83 (FIG. 6). The transmit manager 185 may then report the detection of the imminent transmitter failure to a user via user output device 79. As an example, the transmit manager 185 may illuminate one of the lights 322 or 325 in a particular manner or color to indicate detection of a possible transmitter failure. The transmit manager 185 may also provide an audible alarm to indicate the possible transmitter failure. Moreover, various other techniques for alerting users to the failure or imminent failure of the transmitter 33 are possible.

It should be noted that the transmit monitor 352 may be used to detect other types of transmitter failures. For example, the transmit monitor 352 may monitor the operation of the transducers 181a-h to detect when any of the transducers 181a-h fails. In this regard, for each transducer 181a-h, the transmit monitor 352 monitors the impedance of the transducer 181a-h and determines when this impedance significantly changes thereby indicating possible failure of the transducer 181a-h. Note that the impedance may be monitored by measuring the voltage drop across the transducer 181a-h assuming that the current provided to the transducer 181a-h is constant. Thus, the transmit monitor 352 may be configured to determine the voltage drop (i.e., the difference between the input voltage and the output voltage) across each transducer 181a-h and compare each voltage drop to a specified threshold. If the voltage drop across any transducer 181a-h falls below the specified threshold, then the transmit monitor 352 detects a possible failure for that transducer 181a-h and notifies the transmit manager 185. The transmit manager 185 then provides a warning to a user. Note that the same or similar techniques described above for warning about a possible failure or imminent failure of the power supply 198 may be used to warn of a possible failure or imminent failure of a transducer 181a-h. Other types of failures may be similarly detected and reported by the system 30.

Moreover, by detecting abnormal leaks and identifying locations of the detected leaks as described above, the system 30 provides an effective tool for helping users to identify and remedy leak-related problems in vehicles and/or other products having compartments.

Figure 24:
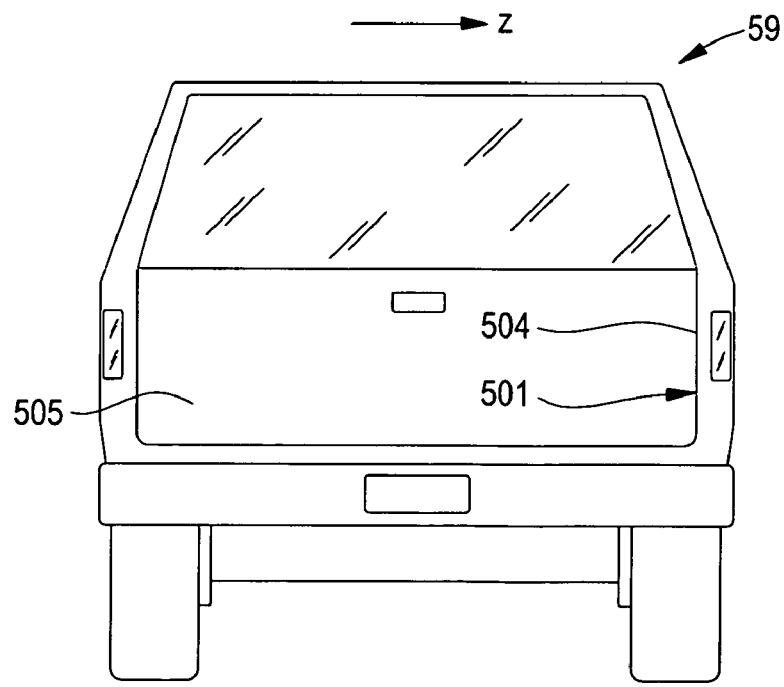
FIG. 24 depicts a back view of the vehicle depicted by FIG. 14.

Some abnormal leaks may exist on the backside of the vehicle 59 being tested. In such a situation, it may be difficult for the sensors 45a-p to detect such leaks, particularly leaks located on surfaces that are substantially vertical (i.e., substantially parallel to the y-direction). In this regard, energy escaping from a leak is often directional in that equal amounts of energy are not transmitted in all directions. For example, FIG. 24 depicts a backside of the exemplary vehicle 59 shown in FIGS. 2-4. Assume that an abnormal leak exists at point 501, which is along a seam 504 of a rear door 505. Thus, the surface in which the leak appears is substantially vertical. In such a situation, much of the ultrasonic energy that escapes through the abnormal leak may not be directed toward any of the sensors 45a-p. In this regard, significantly more energy will likely be directed in directions substantially parallel with the x-direction as compared to directions substantially parallel with the y-direction. Therefore, the abnormal leak may go undetected by the system 30.

To enable better detection of abnormal leaks on the front and/or backside of the vehicle 59, the system 30 may comprise at least one ultrasonic sensor that is positioned to more directly face the front and/or backside of the vehicle 59 during testing as compared to the other sensor 45a-p. As used herein, a sensor "more directly" faces a vehicle surface when its axis of maximum reception 171 has an angle of incidence closer to 90 degrees with respect to the vehicle surface. There are various ways that a sensor may be positioned so that it more directly faces the backside of a vehicle.

Figure 25:
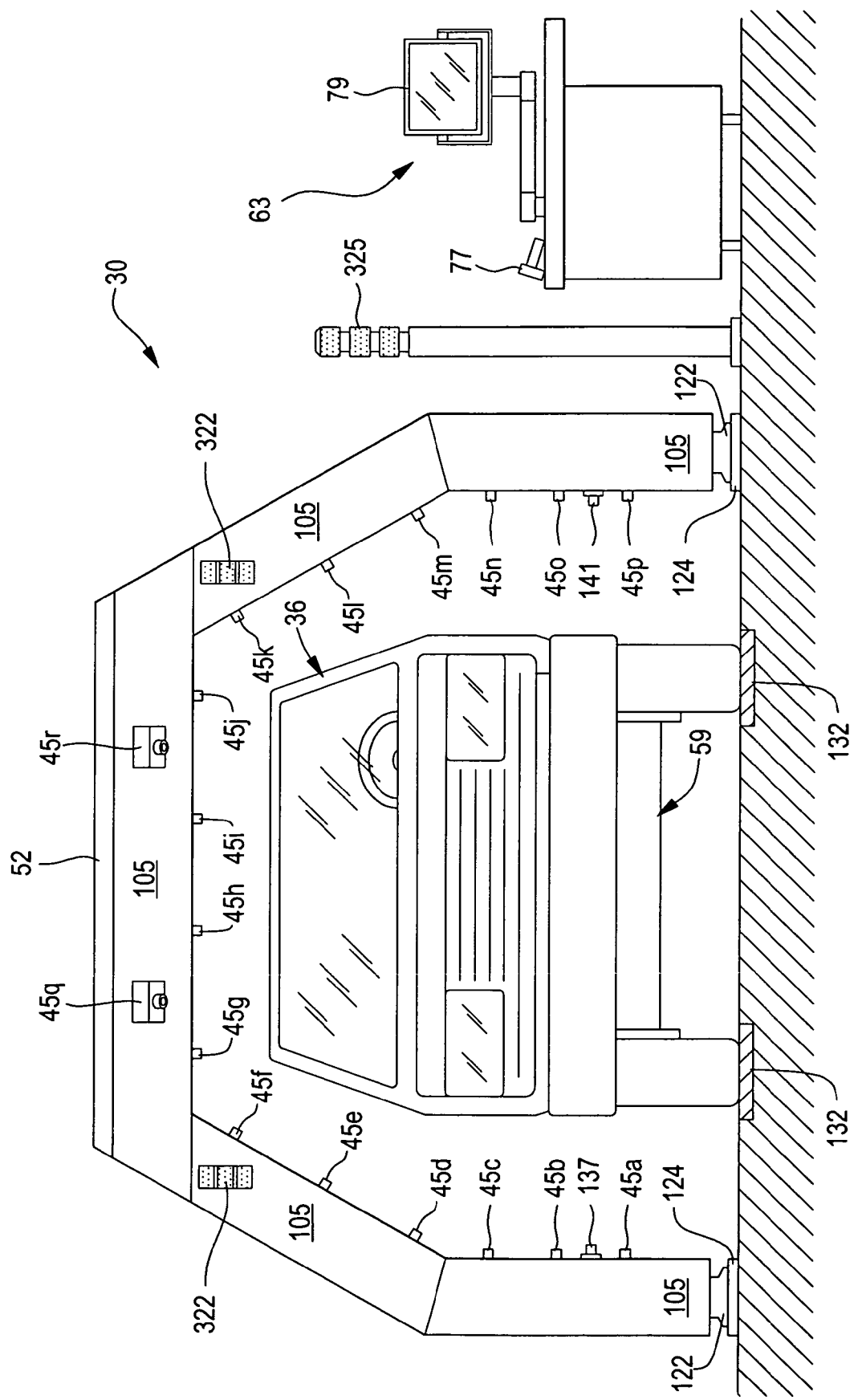
FIG. 25 depicts a front view of an exemplary leak detection system, such as is depicted in FIG. 1.
Figure 26:
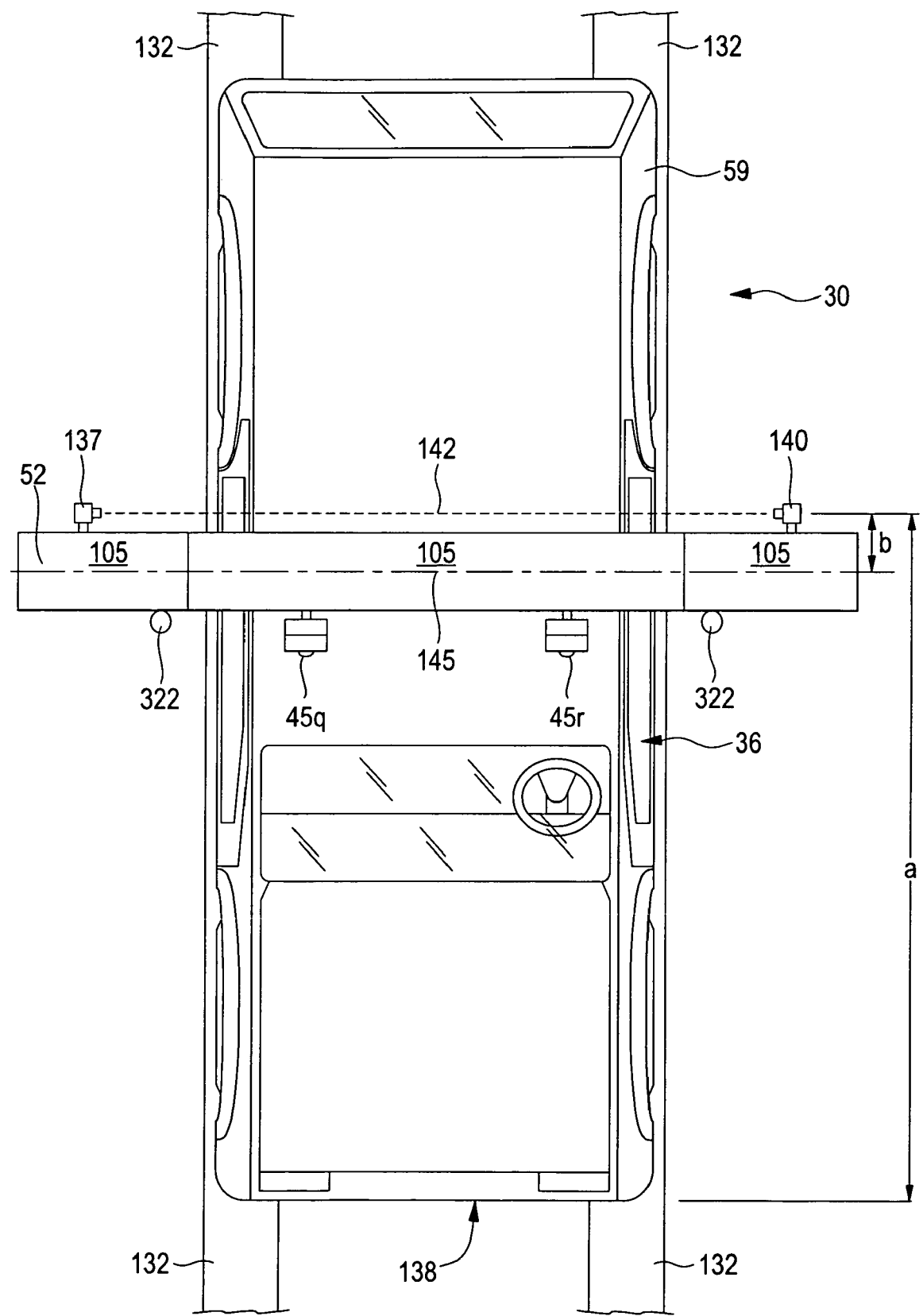
FIG. 26 depicts a top view of the leak detection system depicted in FIG. 25.
Figure 27:
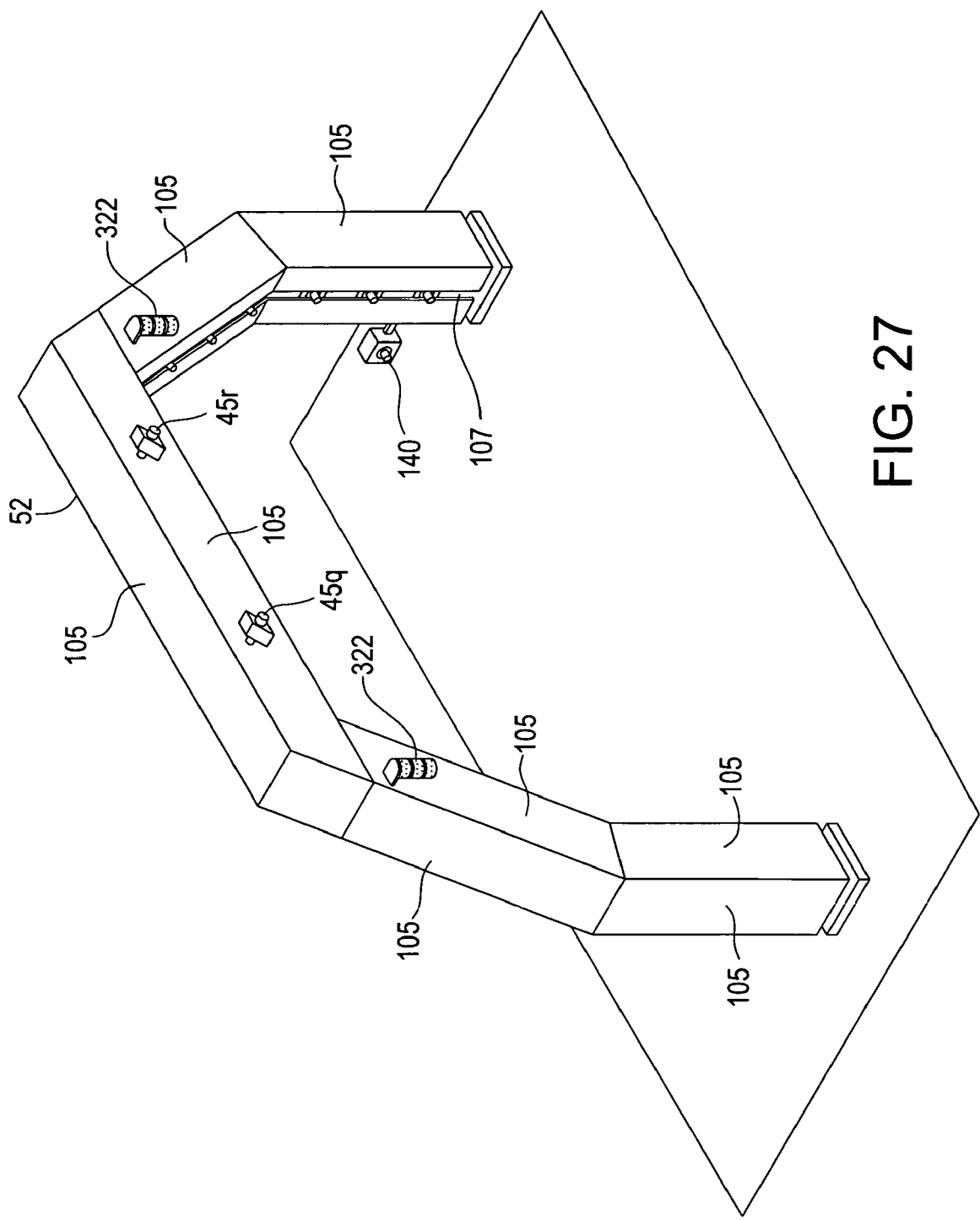
FIG. 27 depicts a three-dimensional view of an exemplary support structure for the leak detection system depicted in FIG. 25.

For example, FIGS. 25-27 show an exemplary embodiment in which two sensors 45q and 45r are mounted on the structure 52 and positioned to more directly face at least a portion of the backside of vehicle 59 during testing as compared to sensors 45a-p. Thus, the sensors 45q and 45r may better detect ultrasonic energy escaping through an abnormal leak in such portion relative to sensors 45a-p. Indeed, as will be described in more detail below, the sensors 45q and 45r may better detect the leak at point 501 (FIG. 24), which is in a vehicle surface that is substantially vertical.

In the instant example, sampling of the vehicle 59 is performed by the sensors 45q and 45r after the vehicle 59 has passed through the structure 52. Such sampling may be based on the distance that the vehicle 59 has traveled past the object sensor 137 (FIG. 3), as described above. Further, the intervals of the sampling periods may remain the same compared to the samples taken by sensors 45a-p or may be different.

Figure 28:
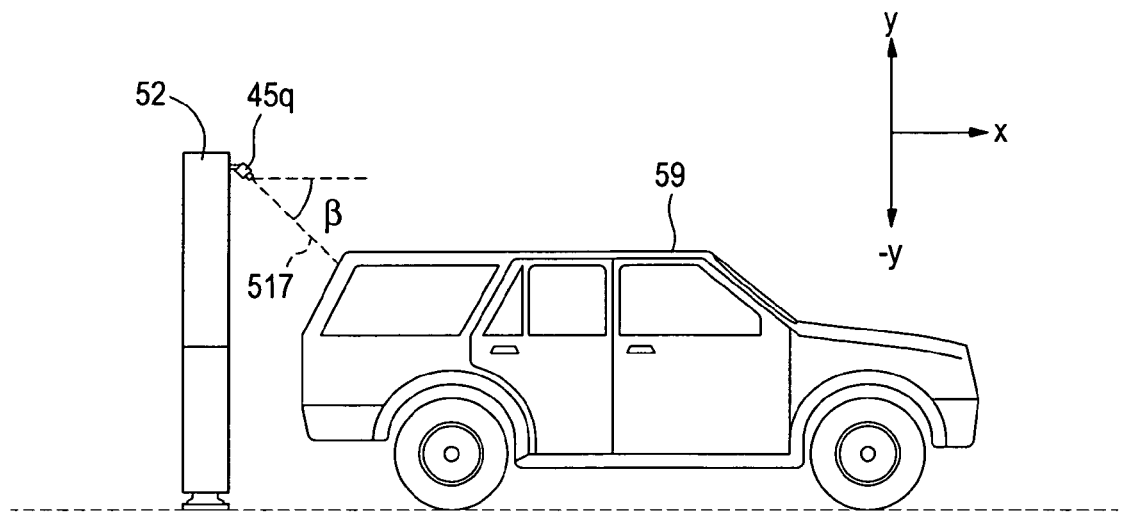
FIG. 28 depicts an exemplary side view of the leak detection system of FIG. 25 for one exemplary sample.
Figure 29:
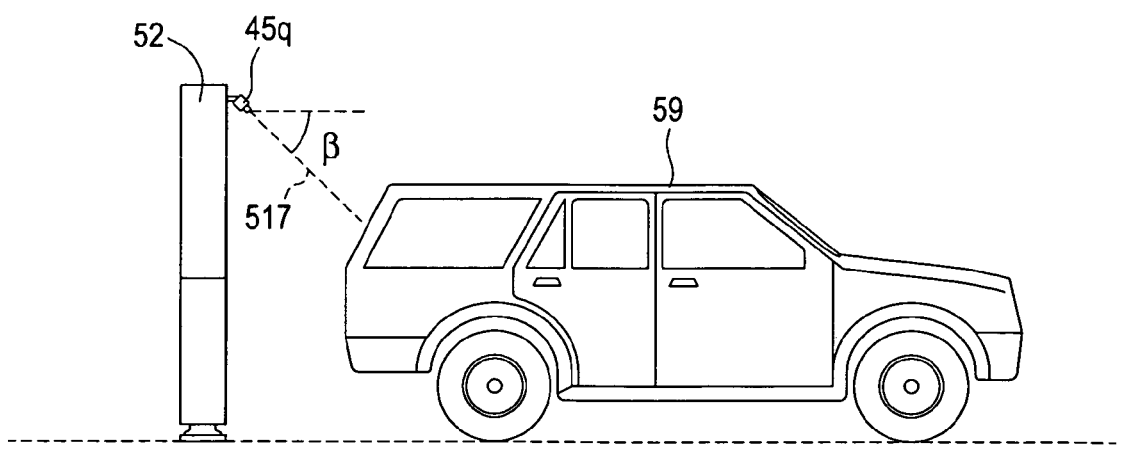
FIG. 29 depicts an exemplary side view of the leak detection system of FIG. 25 for another sample.

FIG. 28 shows an exemplary position of the vehicle 59 when the sensors 45q and 45r take a first sample. FIG. 29 shows an exemplary position of the vehicle 59 when the sensors 45q and 45r take the next sample. Note that, in FIG. 28, the vehicle 59 has moved farther from the structure 52 relative to the position of the vehicle 59 in FIG. 27. Further, FIG. 30 shows another exemplary position of the vehicle 59 when the sensors 45q and 45r take yet another sample after the vehicle 59 has moved even farther from the structure 52, and FIG. 31 shows another exemplary position of the vehicle 59 when the sensors 45q and 45r take another sample.

In this regard, as shown by FIG. 28, the sensor 45q is mounted such that its axis of maximum reception is directed downward with respect to the x-direction, which is the direction of motion of the vehicle 59 in the instant example. In particular, the sensor's axis of maximum reception is directed at an angle $\beta$ from the x-direction. In the example shown by FIG. 28, $\beta$ is about 45 degrees, but other angles are possible in other embodiments.

Figure 32:
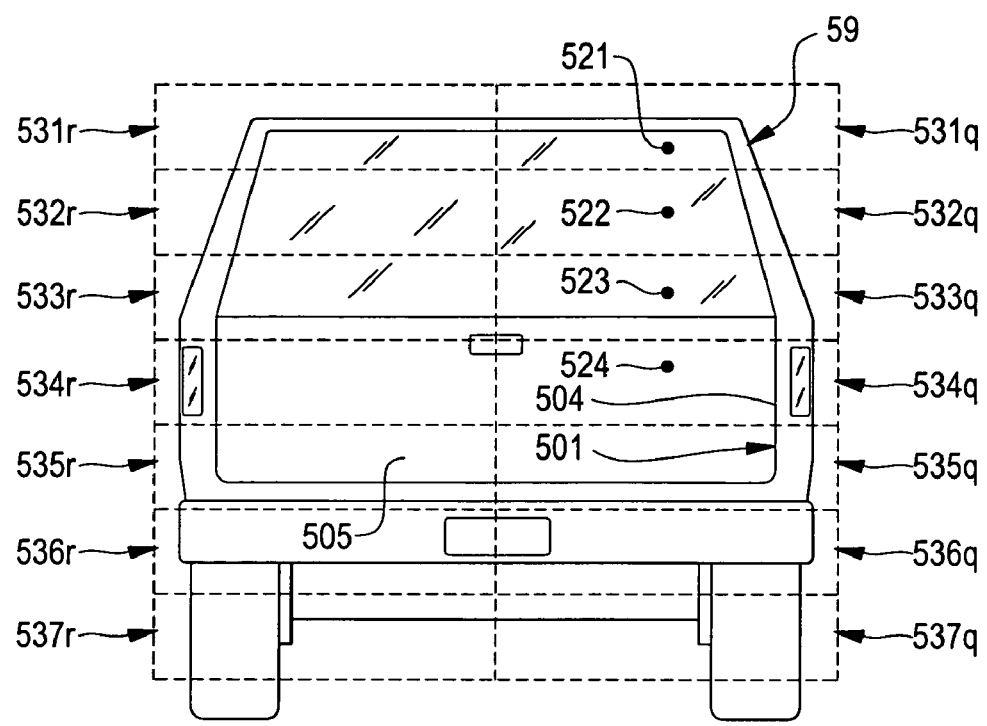
FIG. 32 depicts a rear view of the vehicle of FIG. 24 showing different regions corresponding to various ultrasonic sensors for multiple samples.
Figure 30:
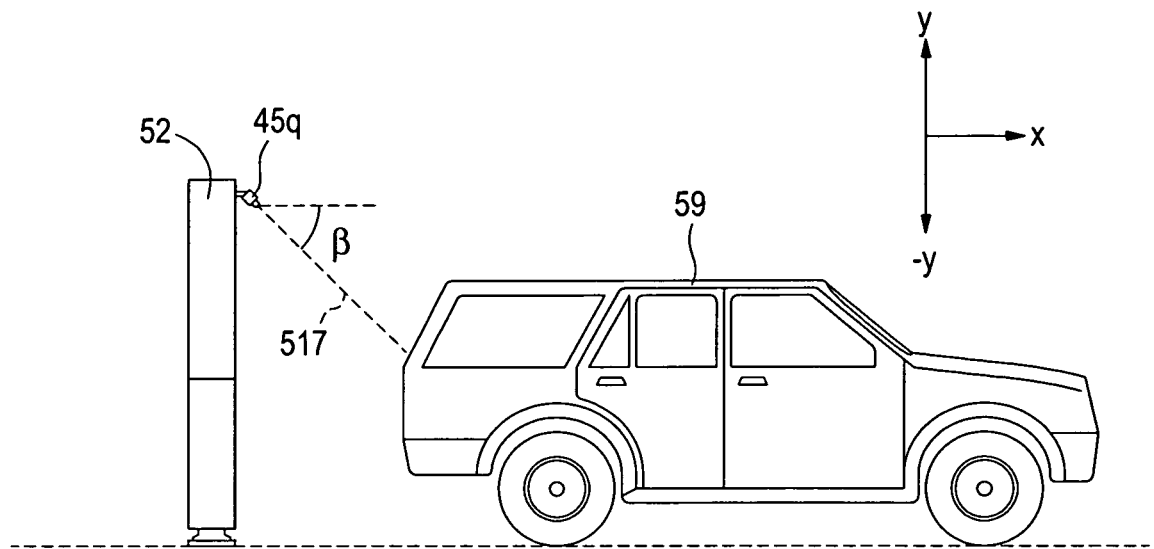
FIG. 30 depicts an exemplary side view of the leak detection system of FIG. 25 for yet another sample.
Figure 31:
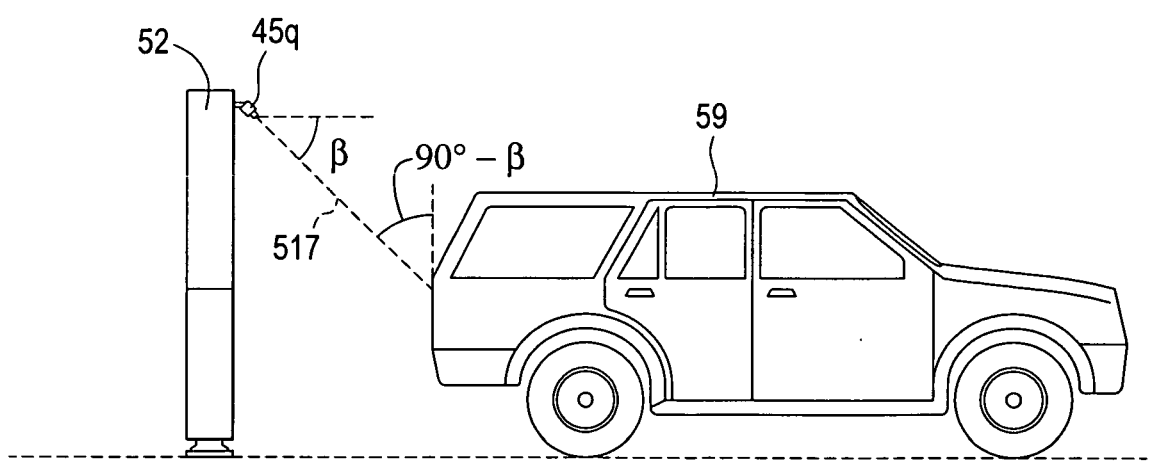
FIG. 31 depicts an exemplary side view of the leak detection system of FIG. 25 for yet another sample.

As can be seen by comparing FIGS. 28-31, movement of the vehicle 59 away from the structure 52 and, therefore, the sensor 45q causes the sensor's axis of maximum reception to pass through a different portion of the vehicle 59. In particular, the sensor's axis of maximum reception moves in the negative (−) y-direction down the backside of the vehicle 59 as it moves away from the sensor 45q. In this regard, FIG. 32 depicts a rear view of the vehicle 59 showing the vehicle's backside. Point 521 in FIG. 32 represents the point through which the axis of maximum reception 517 for sensor 45q passes when the vehicle 59 is positioned relative to the sensor 45q as depicted in FIG. 28. Further, point 522 in FIG. 32 represents the point through which the axis of maximum reception 517 for sensor 45q passes when the vehicle 59 is positioned relative to the sensor 45q as depicted in FIG. 29. In addition, point 523 in FIG. 32 represents the point through which the axis of maximum reception 517 for sensor 45q passes when the vehicle 59 is positioned relative to the sensor 45q as depicted in FIG. 30, and point 524 represents the point through which the axis of maximum reception 517 for sensor 45q passes when the vehicle 59 is positioned relative to the sensor 45q as depicted in FIG. 31.

For each sampling period after the vehicle 59 passes through the structure 52, the sensor 45q corresponds to a different area around the perimeter of the vehicle 59 similar to the manner that sensors 45a-p correspond to different areas as the vehicle 59 is passing through the structure 52. For the first sample taken by the sensor 45q, the sensor 45q corresponds to and samples region 531q through which the sensor's axis of maximum reception 517 passes. For the next sample, the sensor 45q corresponds to and samples region 532q through which the sensor's axis of maximum reception 517 passes. In addition, for the third sample, the sensor 45q corresponds to and samples region 533q through which the sensor's axis of maximum reception 517 passes, and for the fourth sample, the sensor 45q corresponds to and samples the region 534q. Similarly, the sensor 45q corresponds to and samples regions 535q, 546q, and 537q, respectively, during the next three sampling periods.

The sensor 45r is configured similarly to the sensor 45q except that sensor 45r is positioned at a different z-location as compared to sensor 45r. Moreover, the sensor 45r is positioned such that it samples regions 531r, 532r, 533r, 534r, 535r, 536r, and 537r, respectively, during the seven sampling periods that occur after the vehicle 59 passes through the structure 52. Note that the instant embodiment utilizes two sensors 45q and 45r to sample the backside of the vehicle 59, but other numbers of sensors may be so used in other embodiments.

In addition, as illustrated by FIG. 31, the sensor 45q more directly faces the vertical portion of the vehicle backside as compared to sensors 45a-p. In particular, the axes of maximum reception of the sensors 45a-p are all substantially parallel to the surface of the vertical portion, which includes door 505, of the vehicle backside. Thus, the angles of incidence of such axes with respect to the vertical portion are all close to zero. However, as shown by FIG. 31, the angle of incidence of the axis of maximum reception 517 of the sensor 45q is (90−β) relative to the vertical portion of the vehicle backside. Thus, if β is close to 45 degrees, then the angle of incidence of the axis 517 is close to 45 degrees. Moreover, since less ultrasonic energy is normally directed in a direction parallel to a surface of a leak (e.g., in the y-direction in the instant example), then it is likely that more of the ultrasonic energy passing through leak 501 will be directed toward sensor 45q as compared to sensors 45a-p possibly making it easier to detect the leak 501 via sensor 45q. Note that the orientation of sensor 45 may also be more direct for regions of the vehicle backside that are not substantially vertical, such as regions 521 and 522, depending on the slope of such regions.

Note that in selecting the placement and orientation (e.g., β) of the sensor 45q, the distance between the vehicle 59 and the sensor 45q during testing should be considered. Moreover, a smaller β generally makes the orientation of the sensor 45q more direct with respect to at least the vertical portion of the vehicle backside but also undesirably increases the distance that such portion is from the sensor 45q during sampling. A larger β generally makes the orientation of the sensor 45q less direct with respect to the vertical portion of the vehicle backside but also desirably decreases the distance that such portion is from the sensor 45q during sampling. Thus, a trade-off between distance and directivity exists in selecting β in the instant example. In at least one embodiment, β is approximately 45 degrees, but other angles are possible in other embodiments.

In the instant example, the test manager 50 (FIG. 6) is configured to detect abnormal leaks in the backside of the vehicle 59 based on data from sensor 45q and 45r in a similar manner that the test manager 50 detects abnormal leaks in other areas of the vehicle 59 based on data from sensors 45a-p. Thus, vehicle data 130 associates a respective threshold for each of the sensors 45q and 45r on a per sample basis. In this regard, the threshold associated with a sensor 45q or 45r for a given sample indicates the expected sample value from the sensor 45q or 45r assuming that there is no abnormal leak in the corresponding sampling region. Further, for each sampling period occurring after the vehicle 59 has passed through the structure 52, the test manager 50 compares each sample value to the associated threshold. If the sample value exceeds the associated threshold, then the test manager 50 detects an abnormal leak. For example, if it is assumed that an abnormal leak exists at point 501 along seam 504, as described above, then the sample value from the sensor 45q for the fifth sample after the vehicle 59 passes the structure 52 should be higher than the associated threshold for this sensor 45q. As a result, the test manager 50 detects the abnormal leak in response to a determination that such sample value exceeds the associated threshold.

In the instant embodiment that uses sensors 45q and 45r, the sampling of the sensors 45a-45p may stop once the vehicle 59 passes through the structure 52 such that the samples are not being performed by the sensors 45a-p while the sensors 45q and 45r are sampling the backside of the vehicle 59. In such an embodiment, however, the transmitter 33 within the vehicle 59 continues to transmit ultrasonic energy until the sampling of the backside of the vehicle 59 is complete. After this point, the transmitter 33 may be put to sleep, as described above.

If the vehicle 59 has a trunk separate from the vehicle's passenger compartment, one transmitter may be located in the passenger compartment and another transmitter may be located in the trunk. In such an embodiment, the transmitter in the passenger compartment may be put to sleep once the vehicle passes through the structure 52, and the transmitter in the trunk may be put to sleep after sampling of the backside of the vehicle 59 is complete. Various methodologies for controlling the sampling and the activation states of the transmitter or transmitters in the vehicle 59 are possible.

Figure 33:
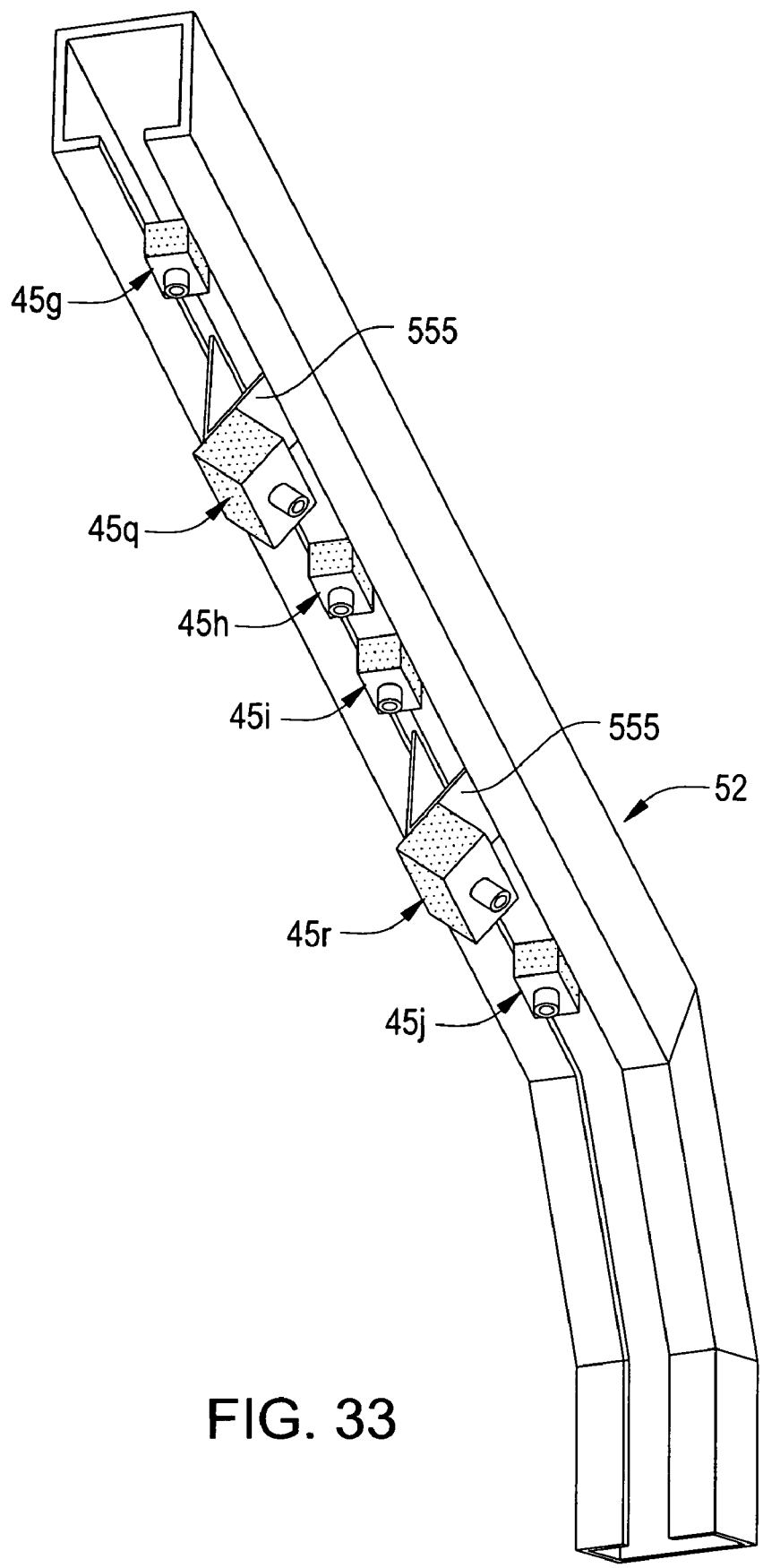
FIG. 33 depicts a three-dimensional view of portions of the support structure depicted in FIG. 25.

FIG. 33 depicts an exemplary mounting arrangement for sensors 45q and 45r. In this regard each sensor 45q and 45r is mounted on a mounting bracket 555 that is attached to the structure 52. Further, each sensor 45q and 45r is positioned between two of the sensors 45a-p used to sample the vehicle 59 as it is passing through the structure 52. In this regard, sensor 45q is positioned between sensors 45g and 45h, and sensor 45r is positioned between sensors 45i and 45j. As described above, each of the sensors 45q and 45r is oriented such that its axis of maximum reception intersects the backside of the vehicle 59 as the vehicle 59 is moving away from the structure 52. Various other mounting arrangements of the sensors 45q and 45r are possible in other embodiments.

In some embodiments, it may be desirable to move some of the sensors 45a-r. For example, to put the sensors 45q and/or 45r in a better position for sampling the backside of the vehicle 59, the sensors 45q and/or 45r may be attached to one or more movable components, such as a movable or robotic arm, that move the sensors 45q and/or 45r to a more desirable location or locations for sampling during testing. For example, once the vehicle 59 passes through the structure 52, the sensors 45q and/or 45r may be moved downward in the negative (−) y-direction. Before the next vehicle is passed through the structure 52, the sensors 45q and/or 45r may be returned to their respective initial positions so that the sensors 45q and/or 45r are not in the path of this next vehicle. It should be apparent to one of ordinary skill in the art, upon reading this disclosure, that various modifications may be made to the system 30 without departing from the principles of the present disclosure.

It is well-known that ambient noise can degrade the performance of an ultrasonic sensor. For a leak detection system 30, ambient noise can cause any one of the sensors 45a-r to falsely detect a leak. In this regard, for any given sample, it is possible for ambient noise to increase the amount of ultrasonic energy sensed by one of the sensors 45a-r such that the sensor's corresponding threshold for the sample is exceeded even though there are no abnormal leaks in the vehicle 59 being tested. Therefore, the test manager 50 may incorrectly determine that an abnormal leak exists in the vehicle 59. In addition, due to ambient noise, the thresholds may be set higher than would otherwise be desired in an effort to prevent at least some false leak detections. However, setting a threshold higher may cause the test manager 50 to miss at least some abnormal leaks. If the effects of ambient noise could be mitigated, then the thresholds could be set lower and/or the sensitivity of the sensors 45a-r could be increased to reduce the likelihood of missing at least some abnormal leaks.

In one embodiment of the present disclosure, the support structure 52 is positioned within a noise reduction chamber that houses the support structure 52 and, therefore, the sensors 45a-r and blocks at least some ambient noise from reaching the sensors 45a-r. Further, in one exemplary embodiment, an interior of the noise reduction chamber is lined with a material having good properties for absorbing acoustic energy. Thus, the amount of acoustic energy reflected by the interior of the chamber is decreased helping to reduce the amount of ambient noise within the chamber. In one embodiment, as will be described in more detail hereafter, the chamber forms a tunnel under which the vehicle 59 being tested may pass. Exemplary chambers are described in U.S. Provisional Application No. 60/838,237, entitled "System and Method for Detecting Leaks in Sealed Compartments," and filed on Aug. 17, 2006, which is incorporated herein by reference.

Figure 35:
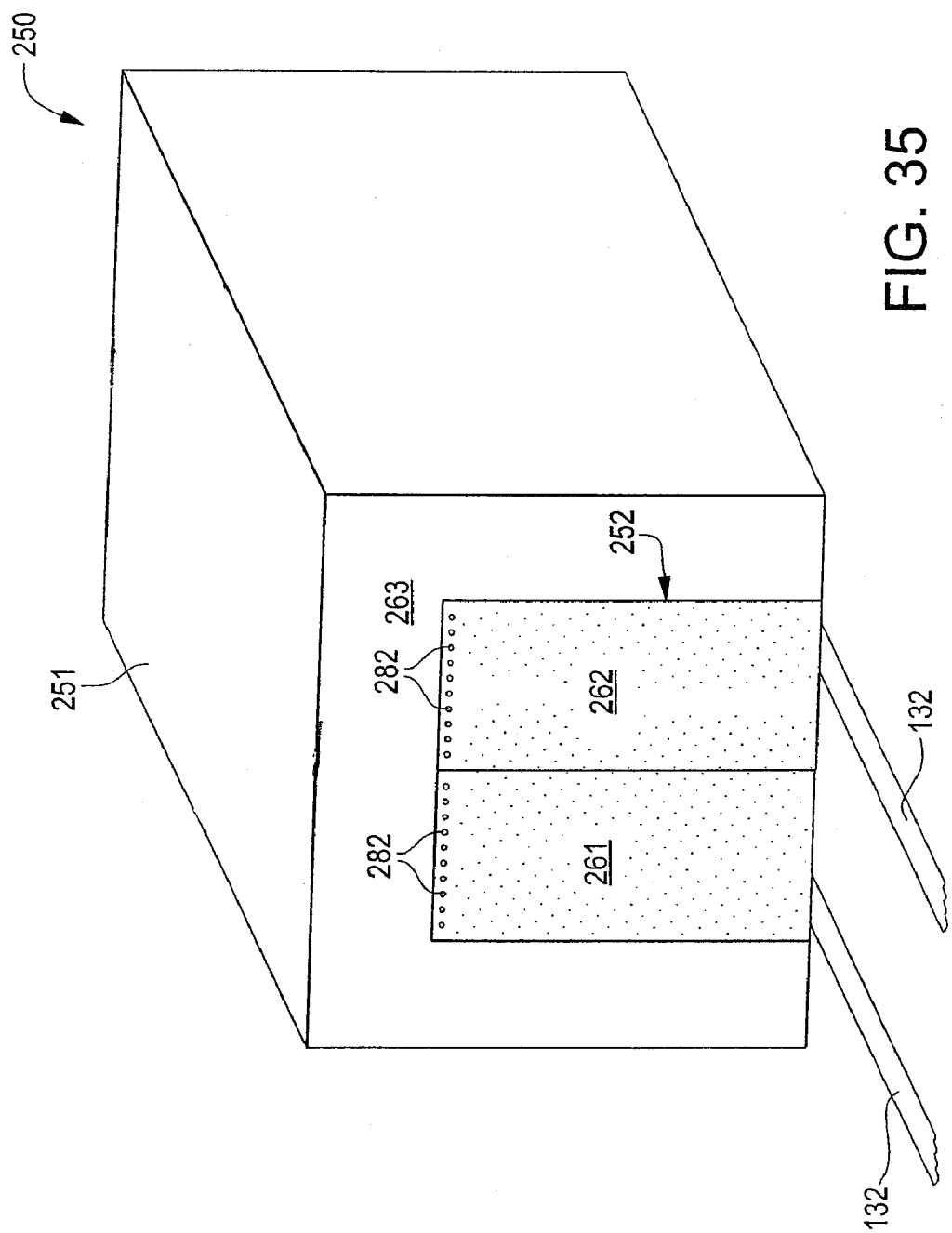
FIG. 35 depicts a front view of a leak detection system that employs an exemplary tunnel in accordance with the present disclosure.

FIG. 35 depicts an exemplary noise reduction tunnel 250 that may be used to house the sensors 45a-r. A frame 251 of the exemplary tunnel 250 of FIG. 35 is a generally rectangular structure, but other shapes for the tunnel 250 are possible in other embodiments. In one exemplary embodiment, the walls of the frame 251 are composed of wood, but other types of materials, such as plastic, aluminum, or steel, for example, may be used.

Figure 36:
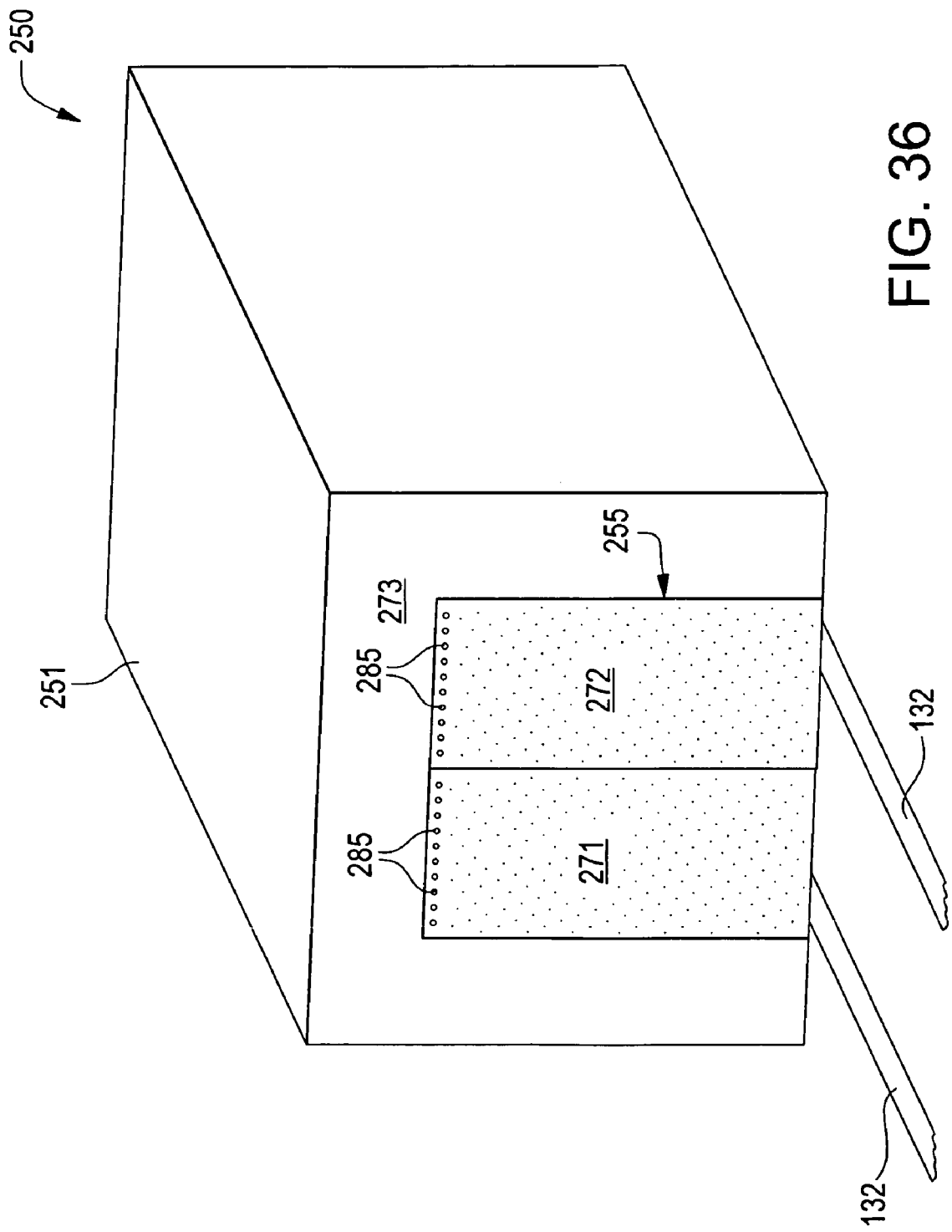
FIG. 36 depicts a back view of the leak detection system depicted in FIG. 37.
Figure 37:
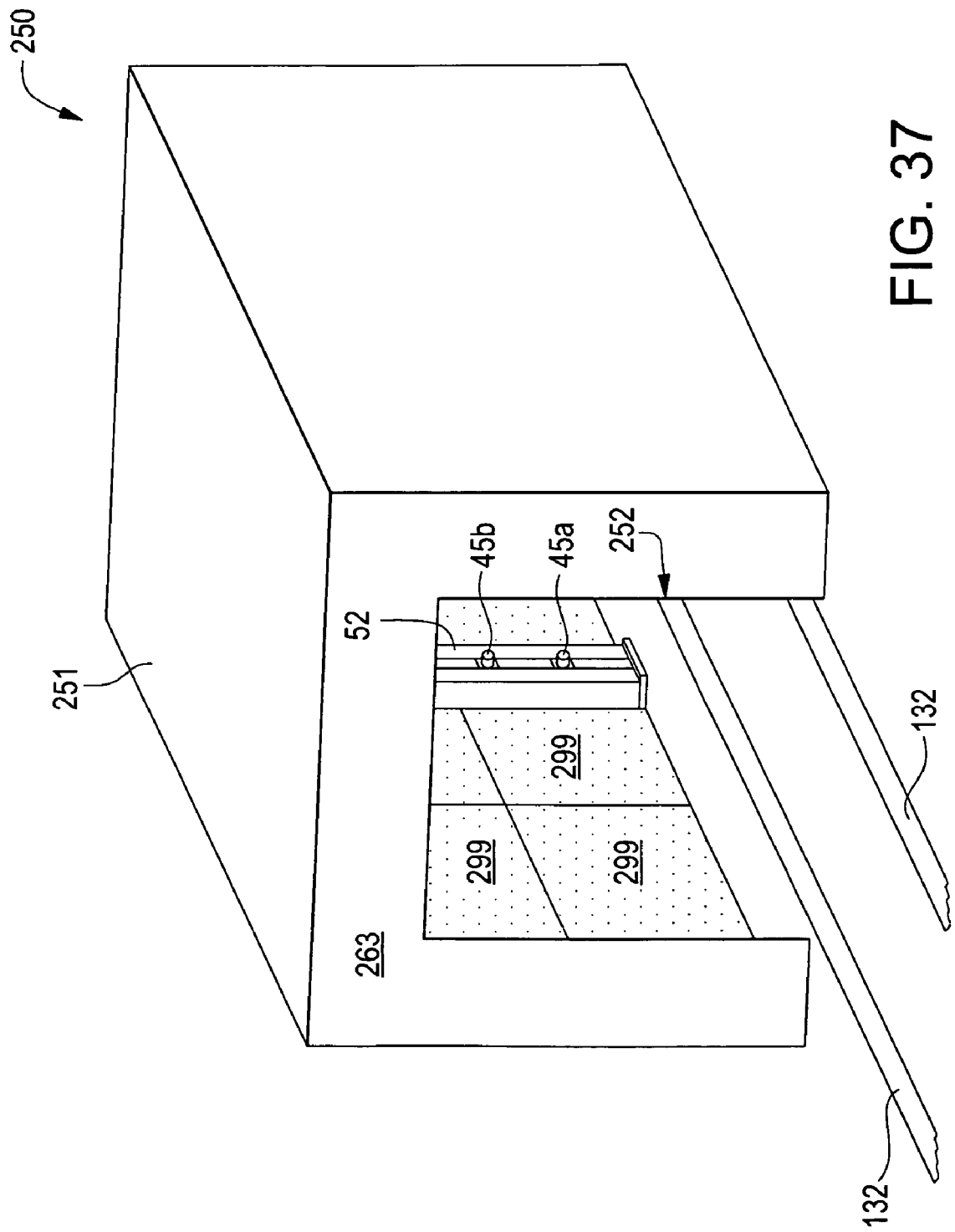
FIG. 37 depicts the leak detection system of FIG. 35 with curtains removed for illustrative purposes.
Figure 38:
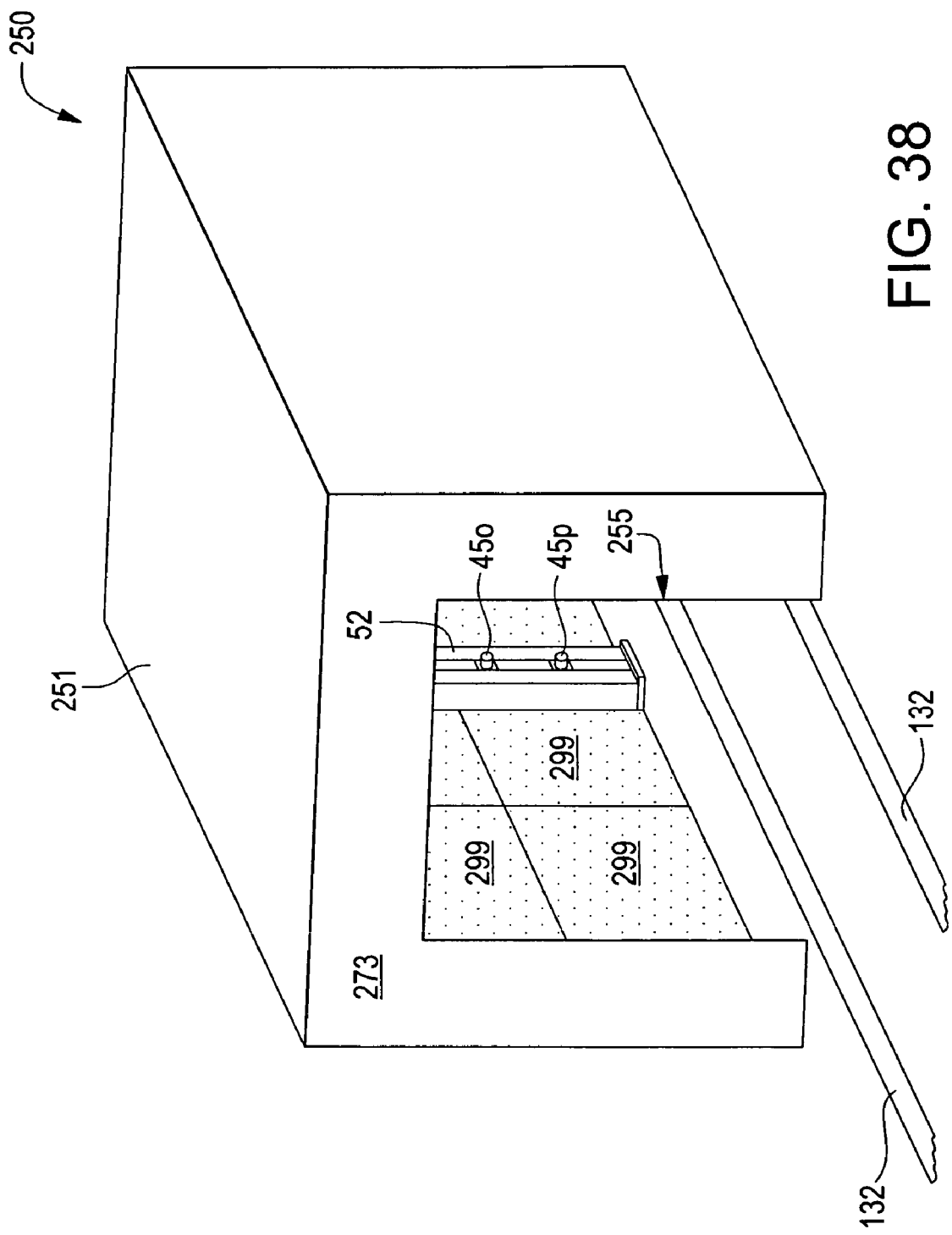
FIG. 38 depicts the leak detection system of FIG. 36 with curtains removed for illustrative purposes.

The tunnel 250 has an opening 252 on one side, referred to herein as the "front," and another opening 255 on an opposite side, referred to herein as the "back," as shown by FIG. 36. In the exemplary embodiment shown by FIGS. 35 and 36, the opening 252 is covered by a pair of curtains 261 and 262 hanging from a wall 263 of the frame 251, and the opening 255 is covered by a pair of curtains 271 and 272 hanging from a wall 273 of the frame 251. For illustrative purposes, FIGS. 37 and 38 depict the front and back of the tunnel 250 with the curtains 261, 262, 271, and 272 removed.

The curtains 261 and 262 are attached to the wall 263 via a plurality of couplers 282, such as bolts, screws, or the like, that pass through the curtains 261 and 262 and into the wall 263 thereby securing the curtains 261 and 262 to the wall 263. Similarly, the curtains 271 and 272 are attached to the wall 273 via a plurality of couplers 285, such as bolts, screws, or the like, that pass through the curtains 271 and 272 and into the wall 273 thereby securing the curtains 271 and 272 to the wall 273. The couplers 282 are inserted into a top end of the curtains 261 and 262, and the couplers 285 are similarly inserted into a top end of the curtains 271 and 272. The other ends, including side ends and a bottom end, of the curtains 261, 262, 271, and 272 are not attached to the walls 263 and 273. Thus, the curtains 261, 262, 271, and 272 do not prevent objects, such as vehicles, from passing through the openings 252 and 255.

Note that the instant embodiment has two curtains per opening 252 and 255. In other embodiments, other numbers of curtains may be used. For example, a single curtain may be used to cover either of the openings 252 or 255. However, using multiple curtains per opening 252 and 255 allows an object to pass, to some extent, between the curtains possibly facilitating movement of the object through the opening. Note that the curtains 261, 262, 271, and 272 help to block at least some ambient noise from entering the openings 252 and 255. However, the curtains 261, 262, 271, and 272 are unnecessary, and at least some embodiments of a tunnel 250 can be implemented without the curtains 261, 262, 271, and 272.

Figure 39:
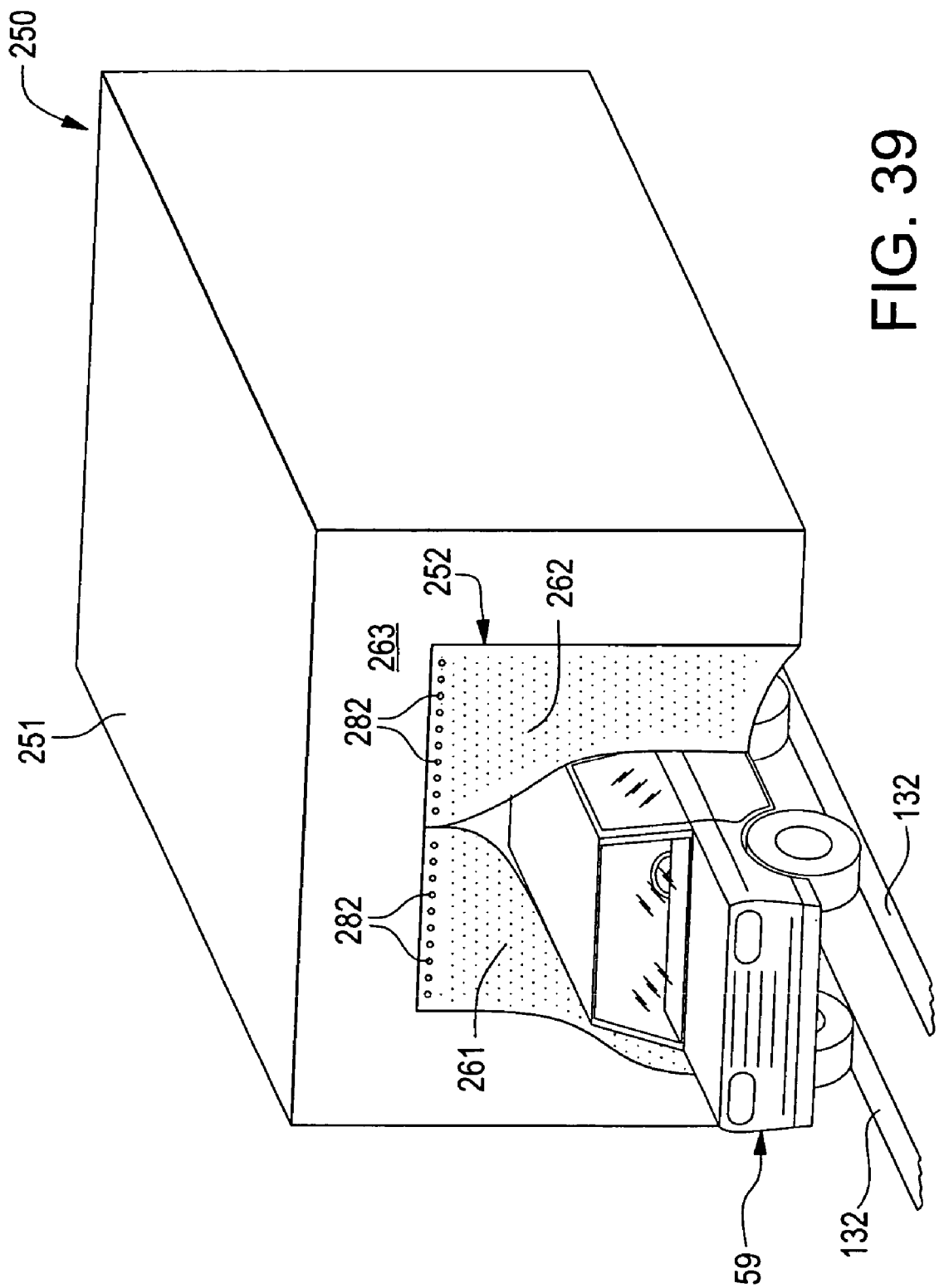
FIG. 39 depicts the leak detection system of FIG. 35 when a vehicle is passing through an exit of the tunnel.

Each of the openings 252 and 255 is dimensioned such that the vehicle 59 being tested by the system 30 can pass through the opening. Further, if tracks 132 are used to move the vehicle 59 during testing, then the tracks 132 are positioned such that the vehicle 59 enters the tunnel 250 through one of the openings 252 or 255 and exits the tunnel 250 through the other opening. FIG. 39 depicts a vehicle 59 as it is exiting through the opening 252 in accordance with one exemplary embodiment.

Figure 40:
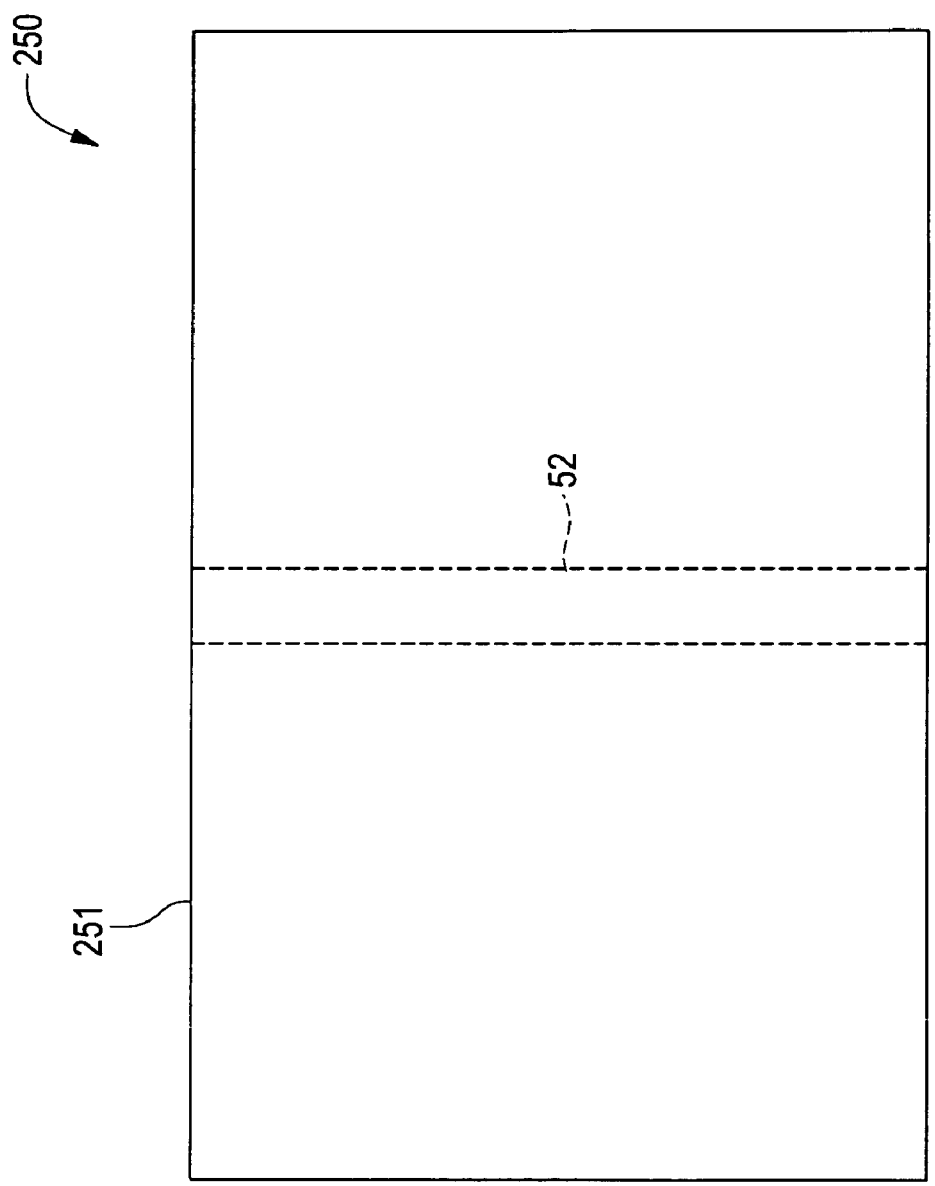
FIG. 40 depicts a top view of the leak detection system of FIG. 35.

In addition, the structure 52 is preferably positioned within and is housed by the tunnel 250, as shown by FIGS. 37, 38, and 40. Thus, while the vehicle 59 is being tested via the sensors 45a-r mounted on the structure 52, the vehicle 59, as well as the sensors 45a-r testing the vehicle 59, are within the tunnel 250. Accordingly, the tunnel 250 shields the sensors 45a-r from at least some ambient noise. In this regard, the walls of tunnel 250 and the curtains 261, 262, 271, and 272 reflect at least some ambient noise and prevents such reflected noise from reaching the sensors 45a-r.

Note that the curtains 261, 262, 271, and 272 help shield the sensors 45a-r during testing by preventing at least some ambient noise from entering through the housing openings 252 and 255. However, the curtains 261, 262, 271, and 272 do not prevent the vehicle 59 from passing thereby allowing each of the openings 252 and 255 to serve as a vehicle entrance or exit. In other embodiments, other types of devices can achieve the foregoing in lieu of the curtains 261, 262, 271, and 272. For example, one or more movable doors (not shown) may be used to cover the openings 252 and/or 255. Such a door could cover at least a portion of one of the openings 252 or 255 and be moved automatically or manually from the opening when a vehicle 59 is to pass through such opening.

Figure 41:
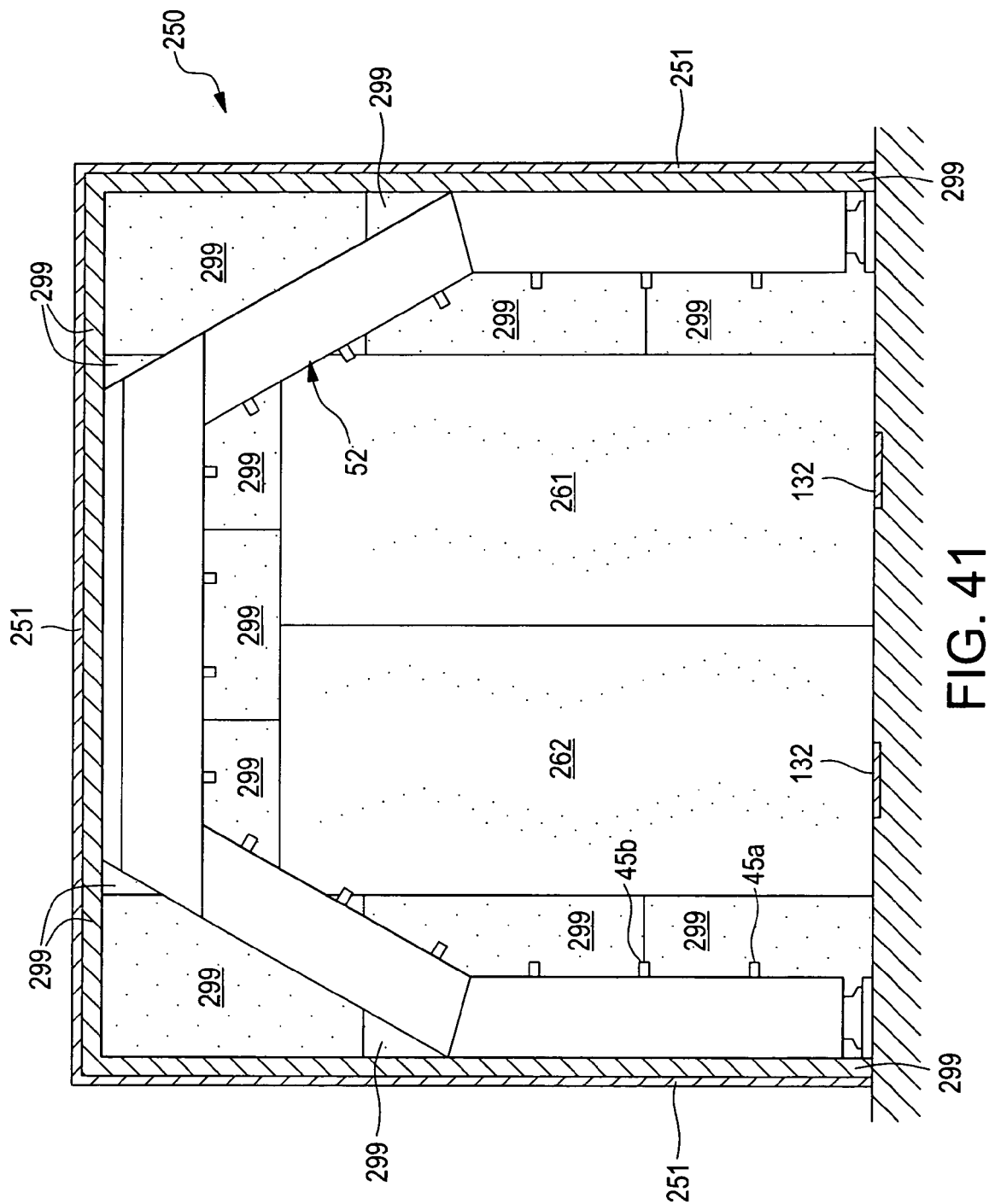
FIG. 41 depicts a cross-sectional view of the leak detection system of FIG. 35.
Figure 42:
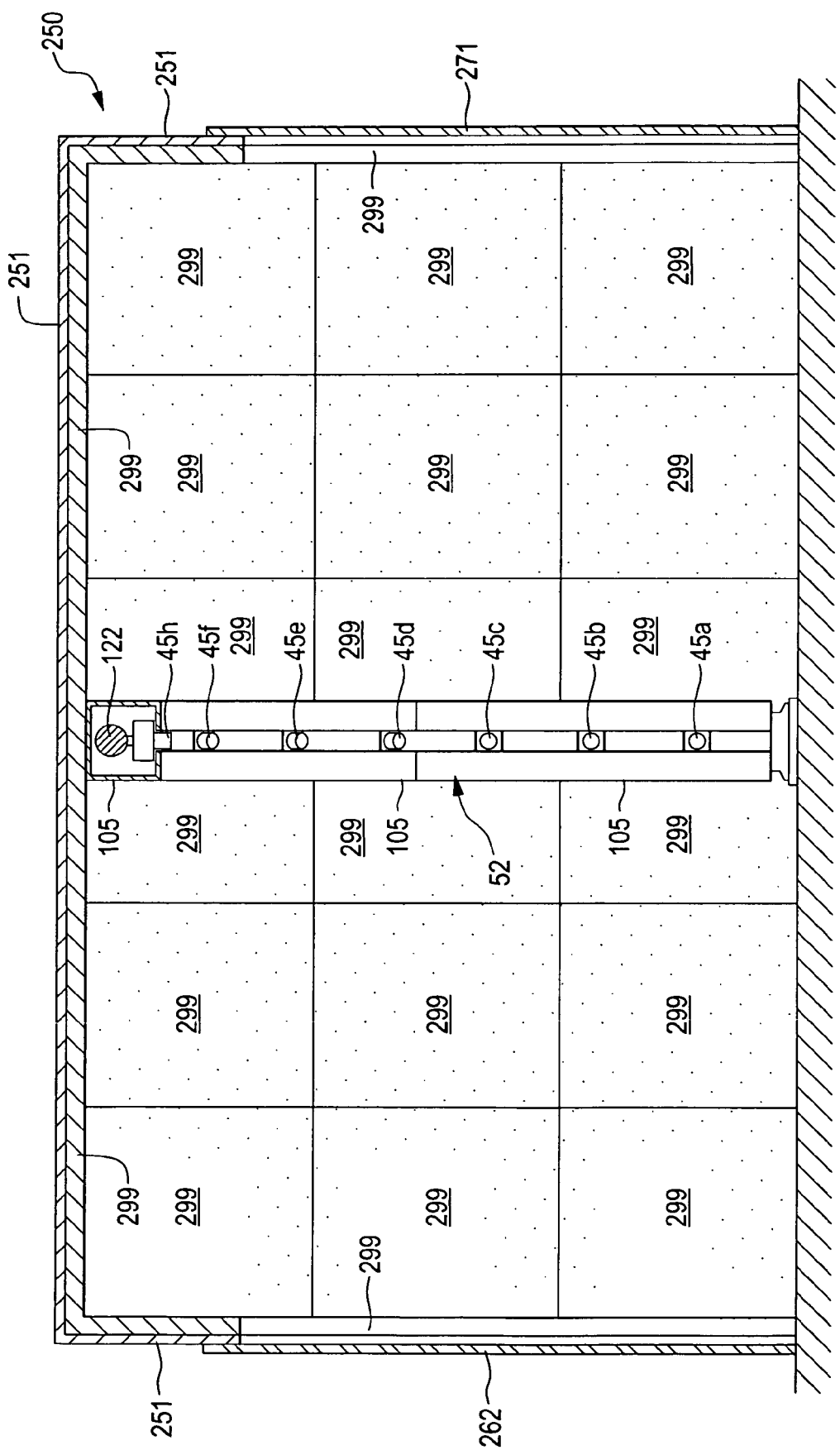
FIG. 42 depicts a cross-sectional view of the leak detection system of FIG. 35.

As shown by FIGS. 37, 38, and 41, a plurality of panels 299, referred to as "acoustic panels," are attached to and cover the inner surfaces of the frame 251. The acoustic panels 299 are composed of a material, such as anechoic foam, with good properties for absorbing acoustic signals. Therefore, ambient noise within the housing 251, to at least some extent, is absorbed by the acoustic panels 299 and prevented from interfering with the measurements performed by the sensors 45a-r. Thus, the frame 251 prevents at least some ambient noise from entering the tunnel 250, and the acoustic panels 299 absorb at least some ambient noise within the interior of the tunnel 250 thereby significantly reducing the amount of ambient noise detected by the sensors 45a-r.

Note that at least some of the ambient noise absorbed by the panels 299 may be emitted from the transmitters 33 within the vehicles 59 being tested. In this regard, energy escaping from a vehicle 59 being tested and directly received by any of the sensors 45a-r can be used to determine whether or not the vehicle 59 has any abnormal leaks, as described above. However, some of the energy escaping from the vehicle 59 can reflect off of the interior walls of the tunnel 250 and be detected by one of the sensors 45a-r. Such reflected energy is generally unwanted and constitutes noise. The acoustic panels 299 help to limit the reflected energy by absorbing at least some of the energy that escapes from the vehicle 59 and is not directly received by one of the sensors 45a-r.

The acoustic panels 299 also increase the tunnel's effectiveness in shielding the sensors 45a-r. In this regard, depending on the acoustic characteristics of the frame 251, at least some acoustic energy can pass through the frame 251 and enter the interior of the tunnel 250. However, the acoustic panels 299 absorb at least some of this energy rather than allowing it to reach the sensors 45a-r.

Moreover, to test a vehicle 59 in accordance with one exemplary embodiment, the tracks 132 move the vehicle 59 through the opening 255 (FIG. 36) and into the interior region of the tunnel 250. While in the tunnel 250, the vehicle 59 is tested for abnormal leaks based on measurements from the sensors 45*a-r*, as described above, while the tracks 132 are moving the vehicle 59 through the tunnel 250. After completion of the samples that are used to test the vehicle 59, the tracks 132 continue to move the vehicle 59 causing it eventually to exit the tunnel 250 through the opening 252 (FIG. 35). During the sampling, the tunnel 250 shields the sensors 45*a-r* from ambient noise that is external to the tunnel 250. The acoustic panels 299 on the interior walls of the tunnel 250 absorb at least some ambient noise within the tunnel 250. Accordingly, better measurements having less noise can be taken by the sensors 45*a-r*.

To further mitigate the effects of ambient noise, each sensor 45*a-r* may be configured to detect noise occurrences and remove at least some of the detected noise. In this regard, a sensor 45*a-r* may be configured to measure the gradient of signal fluctuations and to detect a noise occurrence if the gradient exceeds a specified threshold. Thus, if a noise source causes a spike in the received signal, the spike can be detected and removed. Conventional sliding average filters are known to remove noise from signals in such a manner and may be implemented by the sensors 45*a-r* in an effort to reduce the effects of ambient noise. Moreover, the combination of using a tunnel 250 to limit the amount of ambient noise that reaches the sensors 45*a-r* and a filtering algorithm to remove at least some of the ambient noise that does reach the sensors 45*a-r* may be particularly effective in improving the signal quality and sensitivity of the sensors 45*a-r*.

Figure 43:
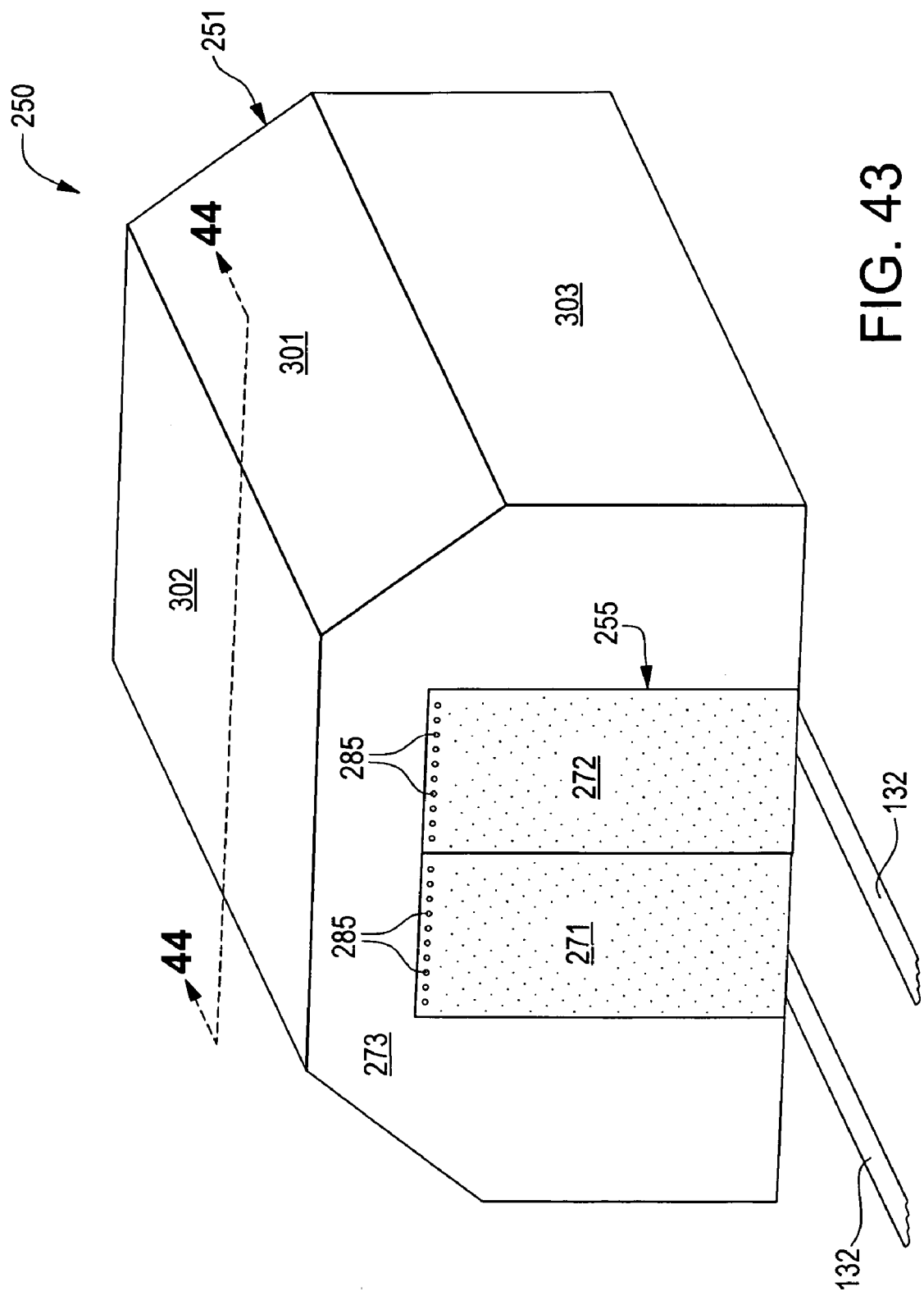
FIG. 43 depicts a front view of a leak detection system that employs an exemplary tunnel in accordance with the present disclosure.

FIG. 43 depicts an embodiment of a tunnel 250 having a different shape as compared to the tunnel 250 depicted by FIG. 35. In this regard, the corners of the rectangular shape in FIG. 35 have been removed such that, as better illustrated in FIG. 44, the outer perimeter of the tunnel 250 has a shape similar to that of the outer perimeter of the structure 52 depicted in FIG. 2. Thus, the tunnel 250 has angled sides 301, each of which extends from a horizontal top 302 to a respective vertical side 303. Further, referring to FIG. 44, the sensors 45*a-r* are attached to the frame 251 in lieu of a separate structure 52 as is depicted in FIG. 41. Thus, the frame 52 is unnecessary in the embodiment depicted in FIG. 44.

In other embodiments, yet other shapes of the tunnel 250 are possible 250. For example, it is possible for the tunnel 250 to have a cross-sectional shape of a semi-circle or some other geometrical shape. In other embodiments, the tunnel 250 may be configured without front and back walls 273 and 263. For example, an embodiment may be similar to that shown FIG. 43 except that there are no walls 263 and 273 or curtains 261, 262, 271, and 273. Thus, the tunnel 250, in such an embodiment would comprise sides 301-303 only with the sensors 45*a-r* mounted on an interior of the sides 301-303.

Figure 44:
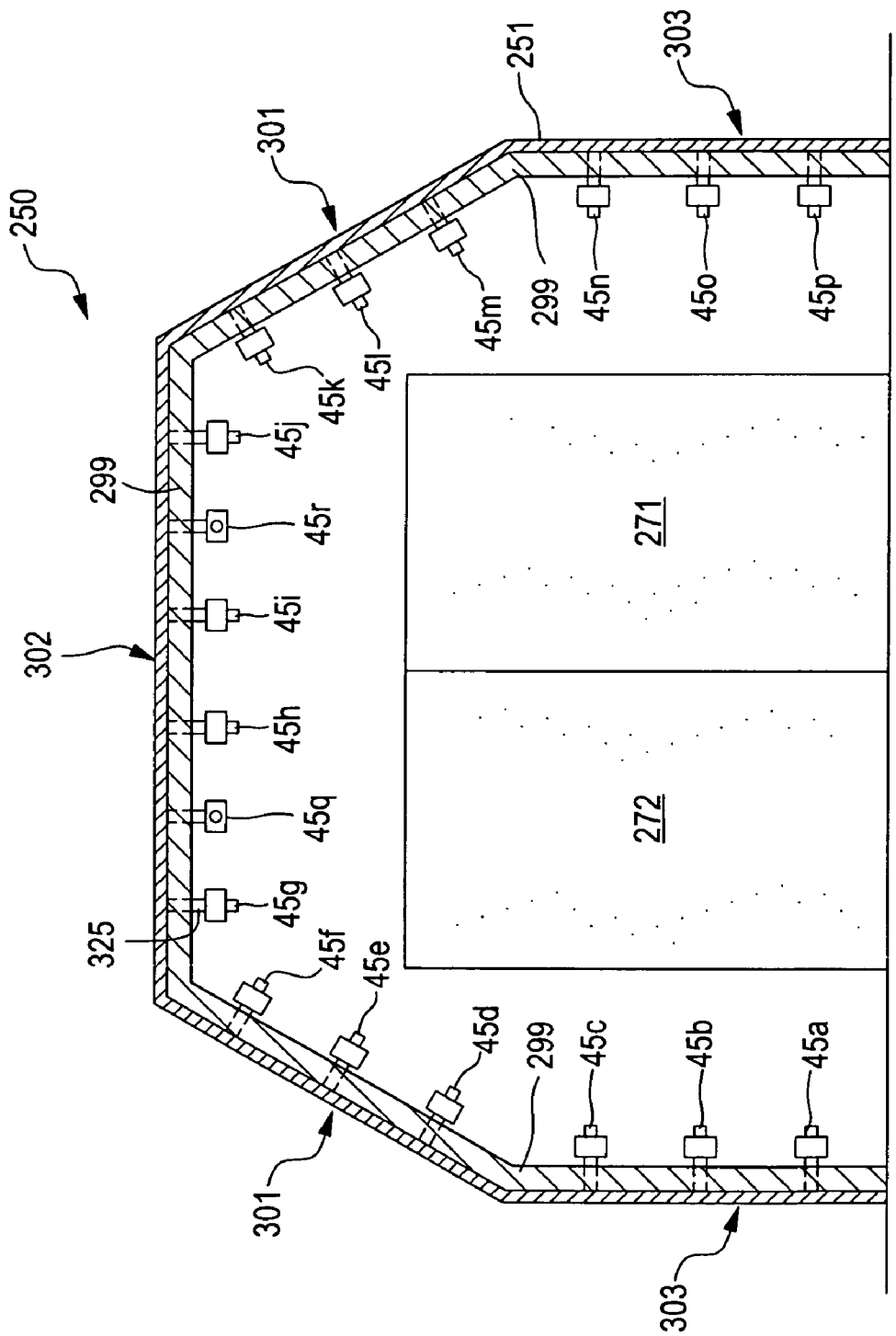
FIG. 44 depicts a cross-sectional view of the leak detection system of FIG. 43.

Moreover, having a shape with rounded corners or with the angled sides 301 instead of the rectangular corners shown by FIG. 41 facilitates positioning of the sensors 45*d-f* and 45*k-m* closer to the vehicle 59 being tested. Indeed, by having a cross-sectional shape similar to that of the structure 52, the sensors 45*a-r* can be positioned in the same positions with respect to the vehicle 59 as in the embodiments in which the sensors 45*a-r* are mounted on the structure 52. In addition, the dimensions of the bars, cords, or other coupling devices that connect the sensors 45*a-r* to the frame 251 can be selected in order to position the sensors 45*a-r* in a desired manner. For example, assume that the sensor 45*g* is connected to the frame 251 via a bar 325, as depicted by FIG. 44. By selecting a longer length of the bar 325, the sensor 45*g* can be positioned closer to the vehicle 59 being tested, and by selecting a shorter length of the bar 325, the sensor 45*g* can be positioned further from the vehicle 59 being tested. The positions of the other sensors 45*a-r* with respect to the vehicle 59 can be similarly established based on the lengths of the bars, cords, or other coupling devices that connect the sensors 45*a-r* to the frame 251.

The present disclosure has been described as employing ultrasonic signals to detect abnormal leaks in sealed compartments. However, using signals of other frequency ranges is also possible. In addition, the sensors 45*a-r* have been described herein as receiving energy emitted by a transmitter 33. However, it is possible for transmitters to be located on the outside of the vehicle 59 being tested and for one or more receivers to be located in the vehicle 59. For example, each of the sensors 45*a-r* described herein could be replaced by a transmitter transmitting ultrasonic energy in a different frequency range. For each sample, one or more receivers within the vehicle 59 could detect the amount of ultrasonic energy within the frequency ranges used by the transmitters. If an abnormally high amount of ultrasonic energy within a frequency range transmitted by a particular transmitter is detected within the vehicle 59, then it could be assumed that an abnormal leak exists in the region corresponding to the particular transmitter. In such an example, the overall testing methodology could be similar to those described above except that ultrasonic energy is directed at the vehicle 59 by devices 45*a-r* rather than being received by the devices 45*a-r*. Various other modifications to the system 30 would be apparent to one of ordinary skill in the art upon reading this disclosure.

Figure 45:
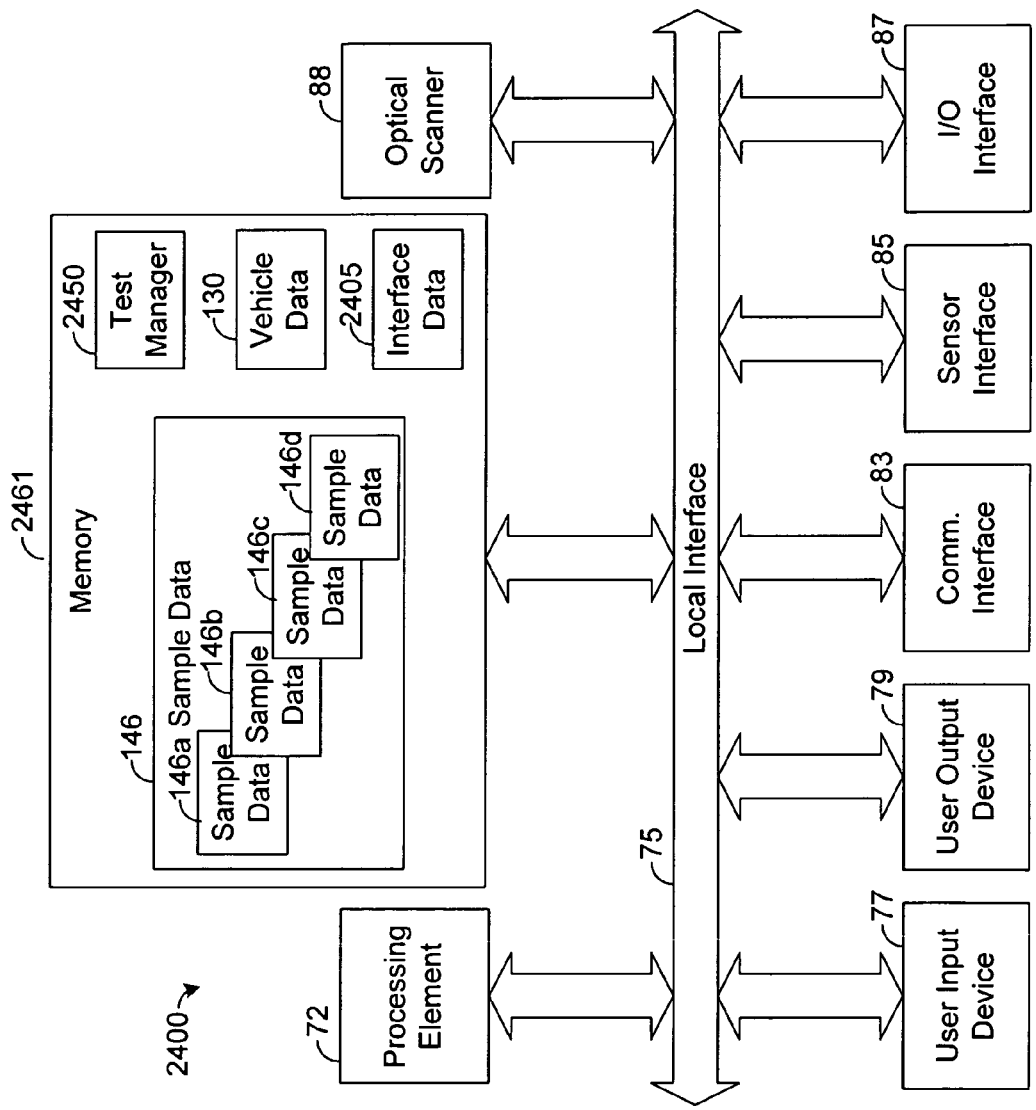
FIG. 45 is a block diagram illustrating an exemplary computer system used in the leak detection system of FIG. 2.

FIG. 45 depicts an exemplary computer system 2400 that can be employed in a leak detection system 30 (FIG. 1). The computer system 2400 comprises a test manager 2450, and substantially similar to the computer system 63 (FIG. 6), the test manager 2450, along with its associated methodology, is implemented in software and stored within memory 2461 of the computer system 2400. In other embodiments, the test manager 2450 can be implemented in hardware or a combination of hardware and software. For brevity, each of the elements of the computer system 2400 operates substantially similar to those elements depicted in FIG. 6 having like reference numerals.

Additionally, the memory 2461 further comprises interface data 2405, and the sample data 146 comprises a plurality of sample data sets 146*a*-146*d*, which are described further herein.

Similar to test manager 50 (FIG. 6), test manager 2450 determines whether the compartment 36 (FIG. 3) has any abnormal leaks and identifies a location of each abnormal leak detected by the leak detection system 30 based upon the ultrasonic energy detected via the sensors 45*a-p* (FIG. 2). As further described herein, the test manager 2450 compares values indicative of the ultrasonic energy detected by each of the sensors 45*a-p* with threshold values of the vehicle's threshold profile.

Figure 46:
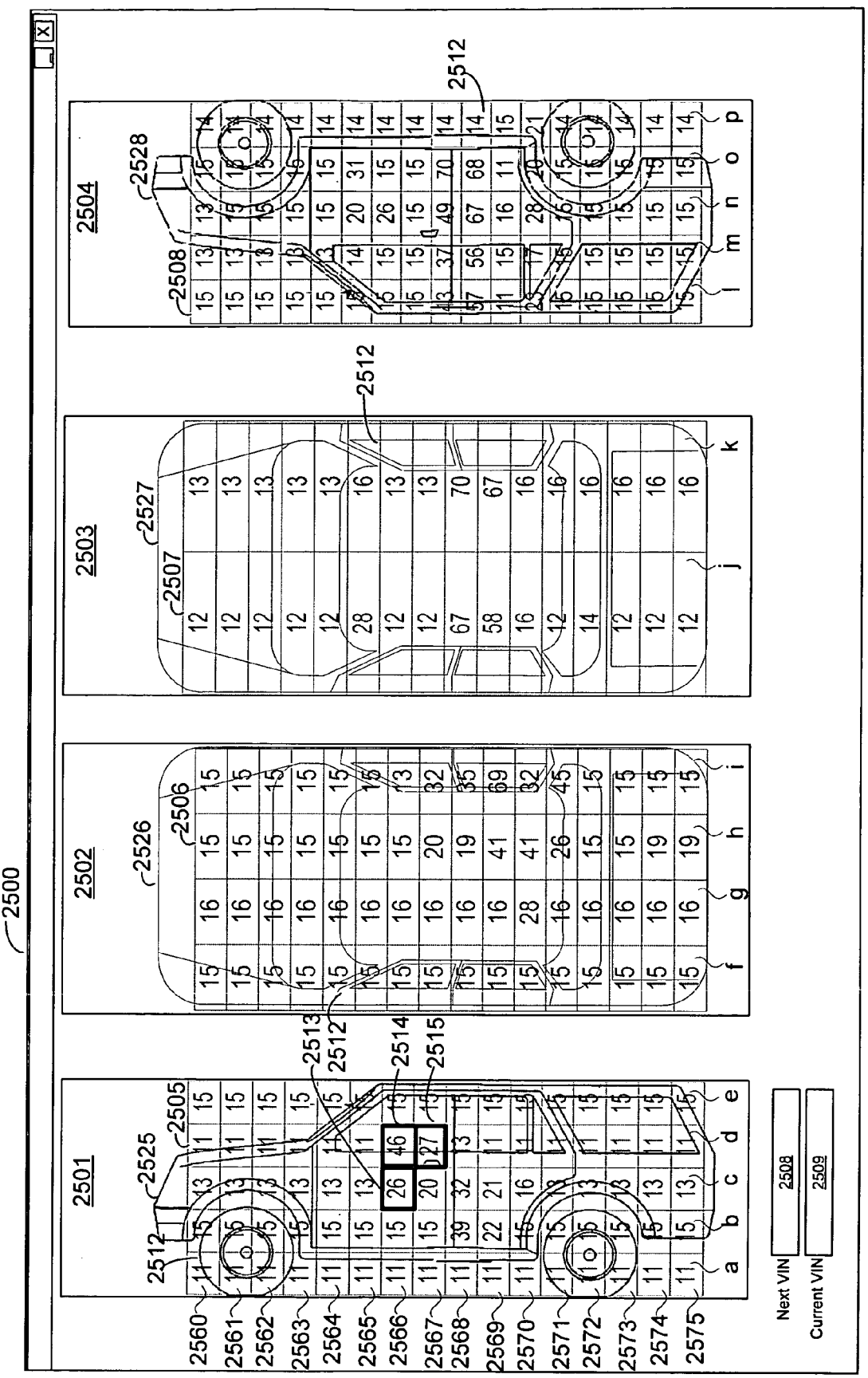
FIG. 46 depicts an exemplary graphical user interface used in the leak detection system of FIG. 2.

In one embodiment of the leak detection system 30, the test manager 2450 is configured to display, via the user output device 79, a graphical user interface (GUI) 2500, such as is depicted in FIG. 46, defined by the interface data 2405. The GUI 2500 is described in more detail with reference to FIG. 46.

In addition, the test manager 2450 is further configured to store a plurality of sample data sets 146*a*-146*d*. In this regard, each sample data set 146*a*-146*d* represents the sample values from each of the sensors 45*a-p* (FIG. 2) stored by the test manager 2450 during the testing process for a single vehicle. Thus, FIG. 45 depicts memory 2461 as storing sample data sets 146*a*-146*d* for four vehicles. Note that storing sample data sets 146*a*-146*d* for four vehicles is for exemplary purposes, and other numbers of sample data sets may be stored in other embodiments of the computer system 2400.

With regard to FIG. 46, GUI 2500 comprises exemplary vehicle representation windows 2501-2504 illustrating various vehicle images 2525-2528 that may be representative of a vehicle that is currently under test by the leak detection system 30 (FIG. 1). Note that images 2525 and 2528 depict exemplary opposing side views of the vehicle under test, and images 2526 and 2527 each depict a top view of the vehicle under test. However, different views of the vehicle exhibited in the windows 2501-2504 may be used in other embodiments, and the views illustrated are for exemplary purposes only.

Note that the representation windows 2501-2504 may display any type of illustration that depicts the various views of the vehicle under test. In this regard, the representations may be digital images of the actual vehicle or line drawings of the vehicle, for example. Further note that the image does not necessarily correspond to the model of the vehicle currently under test. In other embodiments, different GUIs are correlated with the VIN or model number/type of the vehicle being tested.

In one exemplary embodiment, the interface data 2405 defines a plurality of GUIs and each GUI is associated with a different vehicle model. Further, the vehicle images defined by each GUI appear similar to the associated vehicle model. When the results of a test for a vehicle of a particular type are to be displayed, the GUI associated with the model type of the tested vehicle is used to display the test results. As described above, the model type can be determined from the vehicle's VIN. Thus, when the test results of a vehicle are displayed, the displayed vehicle images appear similar to the tested vehicle. As an example, vehicle images 2525-2528 in windows 2501-2504 may be used when the results are being displayed for an SUV. A different set of images may be displayed when the results of tests performed for a different type of vehicle are displayed.

Furthermore, a text box 2509 may display a vehicle identification number (VIN) associated with the vehicle that is currently under test and illustrated via the representation windows 2501-2504. In addition, a text box 2508 may display a VIN associated with a vehicle that is going to be tested via the leak detection system 30 after the vehicle associated with the VIN displayed in text box 2509.

The GUI 2500 further comprises a plurality of graphical tables 2505-2508 having segmented regions 2512 for indicating an ultrasonic sample value from a respective one of the sensors 45a-p. In this regard, each graphical table 2505-2508 comprises a plurality of rows 2560-2575 corresponding to a plurality of respective sequential samples performed by the sensors 45a-p (FIG. 2) as a vehicle 59 (FIG. 2) travels through the structure 52 (FIG. 2). Furthermore, each graphical table 2505-2508 comprises a plurality of columns a-p corresponding to the plurality of sensors 45a-p. Note that each region 2512 is associated with at least one threshold value as depicted in the threshold profile in FIG. 16. In addition, each of the regions 2512 corresponds to a physical location of the vehicle. Each region corresponds to the physical location that the region appears to cover in the vehicle image. For example, region 2514 appears to cover a portion of the depicted vehicle close to the bottom, middle of the front, driver-side window, and region 2514, therefore, corresponds to such region of the vehicle. In addition, each region 2412 includes an indicator, such as a value, indicating the level of ultrasonic energy measured by the corresponding sensor 45a-p.

For example, region 2514 in window 2501 exhibits a "46," which is a value indicative of ultrasonic energy detected by sensor 45d (FIG. 2) as the portion of the vehicle 59 that appears to be covered by the region 2514 passes through the structure 52. The test manager 2450 (FIG. 45) compares such a value, e.g., "46," with a value in the threshold profile, e.g., the profile depicted in FIG. 16, corresponding to the make and/or model of the vehicle 59 being tested.

Therefore, while a vehicle 59 is under test, as described herein, the test manager 2450 determines whether the energy detected by one of the sensors 45a-p (FIG. 2) exceeds an associated threshold defined by a threshold profile selected for the particular vehicle under test. Further, in one embodiment of the GUI 2500, the test manager 2450 may display an indicator (not shown) within one of the regions 2512 indicating whether the corresponding portion of the vehicle under test passed the testing preformed by the leak detection system 30. In this regard, if the vehicle likely contains an abnormal leak (e.g., an associated threshold defined by the threshold profile is exceeded indicating that a leak may exist in or close to such portion), then the test manager 2450 may highlight that particular region 2512 corresponding with the leak. Thus, by simply looking at the display, a user can readily discern which vehicle regions likely contain or are close to leaks.

For example, in window 2501, the vehicle under test may have a leak on a portion of the vehicle corresponding to region 2514 (e.g., close to the bottom, middle of the front, driver-side window). Thus, the test manager 2450 may highlight entry 2514 to indicate to a user (not shown) viewing the windows 2501-2504 that there may be a leak associated with that portion of the vehicle under test corresponding to the highlighted entry 2514. In addition, the test manager 2450 may highlight other entries 2515 and 2516 surrounding the entry 2514 that similarly indicate elevated ultrasonic energy emissions relative to the threshold profile selected for the vehicle under test.

The test manager 2450 may indicate increased ultrasonic energy above the profile thresholds by highlighting regions 2512 in the tables 2505-2508, as described herein. In this regard, the test manager 2450 may fill regions 2512 with a particular color, e.g., red, if the energy detected exceeds a particular first threshold. Furthermore, the test manager 2450 may fill other entries 2512 with a different color, e.g., green, to indicate a particular second threshold or another color; e.g., yellow to indicate a third threshold.

For example, in various embodiments described above, the threshold profile is described as associating a threshold for each sample value. If the sample value exceeds the associated threshold, then a detection of an abnormal leak is made. However, in other embodiments, each sample value may be associated with a plurality of thresholds, and the output provided by the system 30 may indicate whether each of the thresholds is exceeded. As an example, assume that sensor 45d corresponds to region 2514 for a particular sample. The sample value from sensor 45d could be compared to two associated thresholds. If the value exceeds only the lower threshold, then the test manager 2450 may highlight region 2514 of window 2501 by coloring this region 2514 yellow. If both thresholds are exceeded, then the test manager 2450 may highlight region 2514 of window 2501 by coloring this region red. If neither of the thresholds are exceeded, then the test manager 2450 may refrain from highlighting the region 2514 or may highlight the region a different color, such as green. Thus, the region 2514 is color coded to indicate an extent of ultrasonic energy detection for the corresponding physical region of the vehicle being tested. In addition to or in lieu of the color highlighting, a value (e.g., the corresponding sample value or the difference between the corresponding sample value and its associated threshold) indicative of the extent of ultrasonic energy detected for the corresponding physical region may be included in the region 2514. Various other techniques for indicating the extent of ultrasonic energy detection for each sample are possible in other embodiments.

Figure 47:
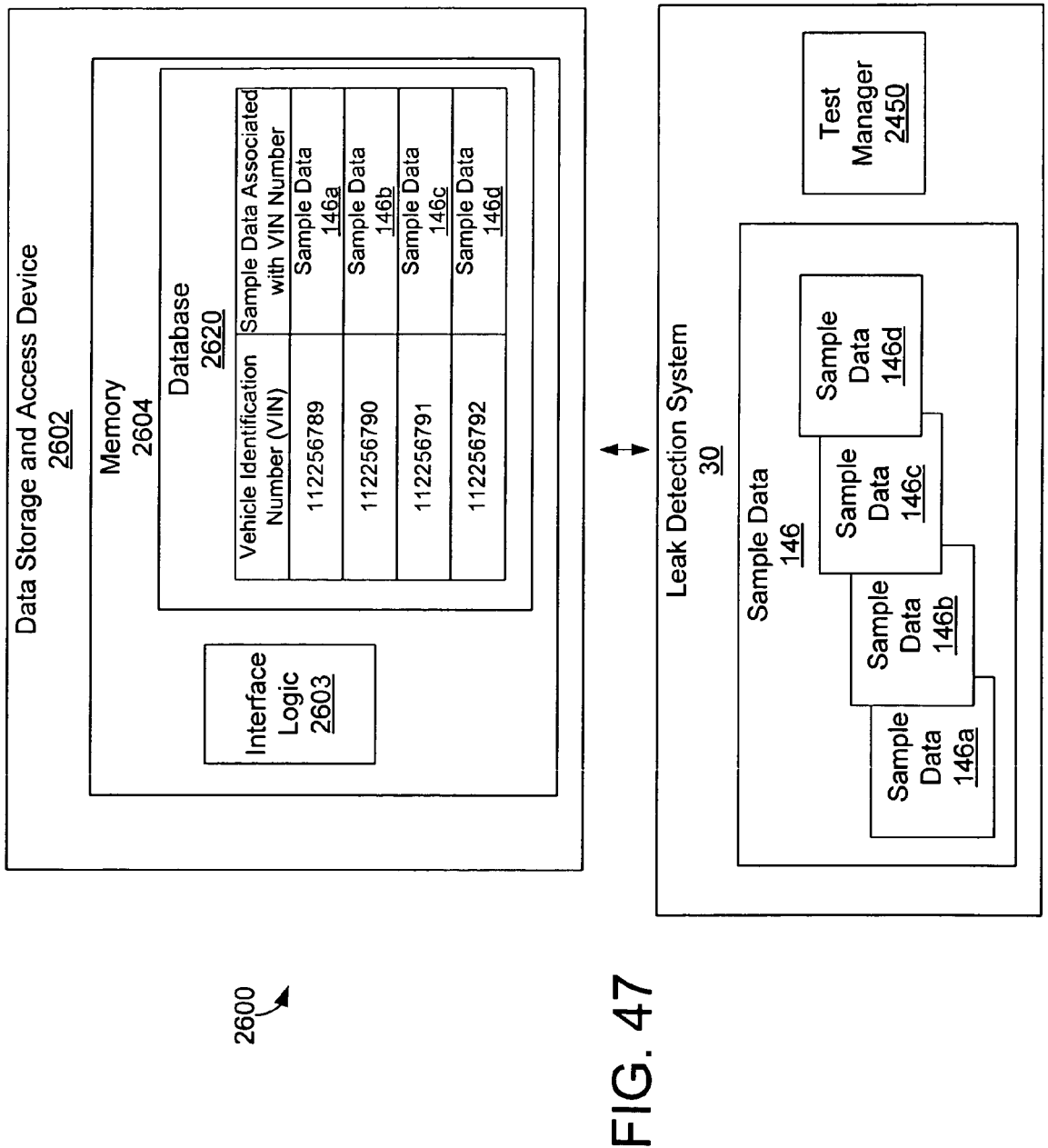
FIG. 47 is a block diagram illustrating a data storage and access device used in the leak detection system of FIG. 2.

As described herein, as a plurality of vehicles are tested, for example on a manufacturing line, the test manager 2450 defines and stores sample data 146 (FIG. 6) associated with each vehicle that is tested by the leak detection system 30. FIG. 47 depicts an exemplary system 2600 comprising the leak detection system 30 (FIG. 1) and a data storage and access system 2602.

In such a system 2600, the sample data 146 comprises the sample data sets 146a-146d, as described with reference to FIG. 45. Each sample data set 146a-146d comprises data resulting from a leak test and corresponding to a particular vehicle that has been tested by the leak detection system 30. Each sample data set 146a-146d comprises, in particular, data (e.g., sample values and/or differences between sample values and associated thresholds of the selected threshold profile) indicative of the ultrasonic energy detected by the leak detection system 30 corresponding to physical locations on the corresponding vehicle that has been tested.

For example, each sample data set 146a-146d may include the vehicle identifier of the corresponding vehicle and the sample values measured by the sensors 45a-p (FIG. 2) for each of the samples during the test of the vehicle. In another embodiment, each sample data set 146a-146d may include the vehicle identifier and the difference between each sample value and the associated threshold used to determine whether the sample value is excessive. Moreover, any sample data set 146a-146d may be analyzed to assess the sealing characteristics of the identified vehicle and, in particular, to estimate the approximate amount of leakage for different portions of the vehicle.

The data storage and access system 2602 further comprises interface logic 2603 and a database 2620, each resident in memory 2604. Note that the interface logic 2603 may be implemented in software, hardware, or a combination thereof. The test manager 2450 transmits sample data sets 146a-146d periodically to the data storage and access system 2602. The test manager 2450 may transmit the data sets 146a-146d over a network (not shown in FIG. 47). In other embodiments, the data sets 146a-146d may be uploaded to the data storage and access device 2602 via other techniques. Upon receipt of the data sets 146a-146d, the interface logic 2603 stores received sample data sets 146a-146d in the database 2620. In this regard, the database 2620 comprises a plurality of VINs corresponding to sample data sets 146a-146d that may be searched via the interface logic 2603. In other embodiments, the data sets 146a-146d may be stored in other types of memory.

Figure 48:
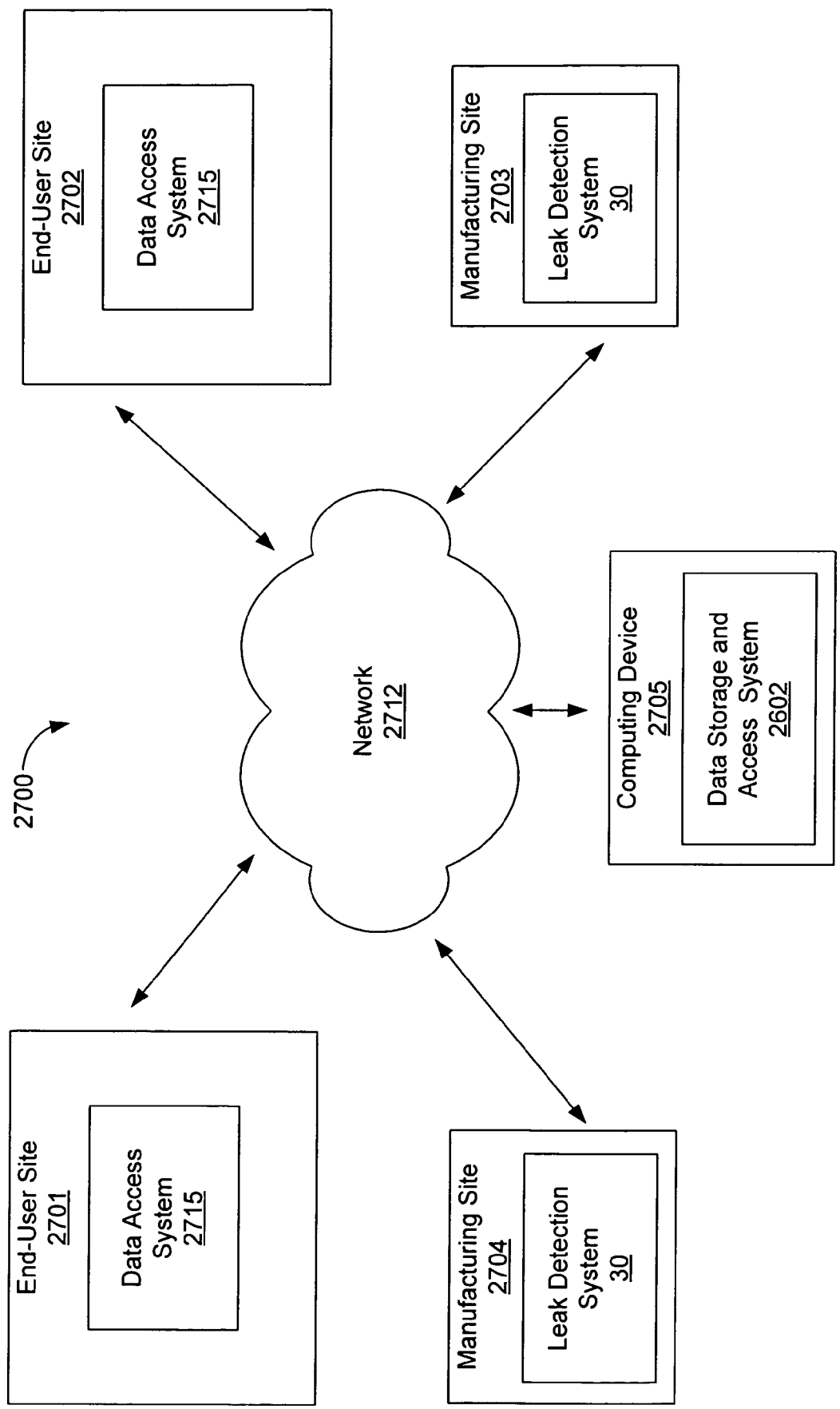
FIG. 48 is a block diagram illustrating an exemplary network of the leak detection system of FIG. 2.

FIG. 48 depicts an exemplary system 2700 comprising a plurality of end-user sites 2701-2702 and a plurality of manufacturing sites 2703-2704. The sites 2701-2704 communicate via the network 2712. In addition, the system 2700 comprises a computing device 2705 that also communicates via the network 2712. The network 2712 can comprise the public switched telephone network (PSTN), the Internet, or some other type of network.

The computing device 2705 comprises the data storage and access system 2602, such as is depicted in FIG. 47. Thus, when vehicles (not shown) are manufactured at the manufacturing sites 2703-2704, sample data sets 146a-146d (FIG. 47) corresponding to each vehicle manufactured are stored at the manufacturing sites 2703-2704. In addition, such sample data sets 146a-146d corresponding to each vehicle manufactured are stored on the data storage and access system 2602. In such an example, the test manager 2450 may store the sample data sets 146a-146d locally and/or transmit the sample data sets 146a-146d to the computing device 2705 via network 2712 or otherwise.

Note that two manufacturing sites 2703-2704 are shown for exemplary purposes. Other numbers of manufacturing sites in other embodiments are possible. Furthermore, each manufacturing site 2703-2704 is preferably communicatively coupled to the network 2712 so that sample data sets 146a-146d may be transferred to the data storage and access device 2602. However, transferring the data sets 146a-146d to the device 2602 via other techniques is also possible.

The computing device 2705 may be, for example, a web server. Such device 2705 may make the contents of the data storage and access system 2602 available via a web site accessible by a web identifier, e.g., an hypertext transfer protocol (HTTP) identifier. As another example, the computing device 2705 may be a secure server, and the data storage and access system 2602 may only provide contents of the database 2620 (FIG. 47) in response to secure transaction requests.

As an example, the end-user sites 2701-2702 may each comprise a data access system 2715. For example, the data access system 2715 may comprise a personal computer (PC) located at the end-user site 2601-2602. The end-user site 2601-2602 may be, for example, an automobile dealership.

In such an example, a customer (not shown) of the automobile dealership may bring a previously purchased vehicle to the dealership. The customer may complain of a leakage problem, e.g., there is wind noise in the compartment of the vehicle or there is a water leak in the compartment of the vehicle.

Figure 49:
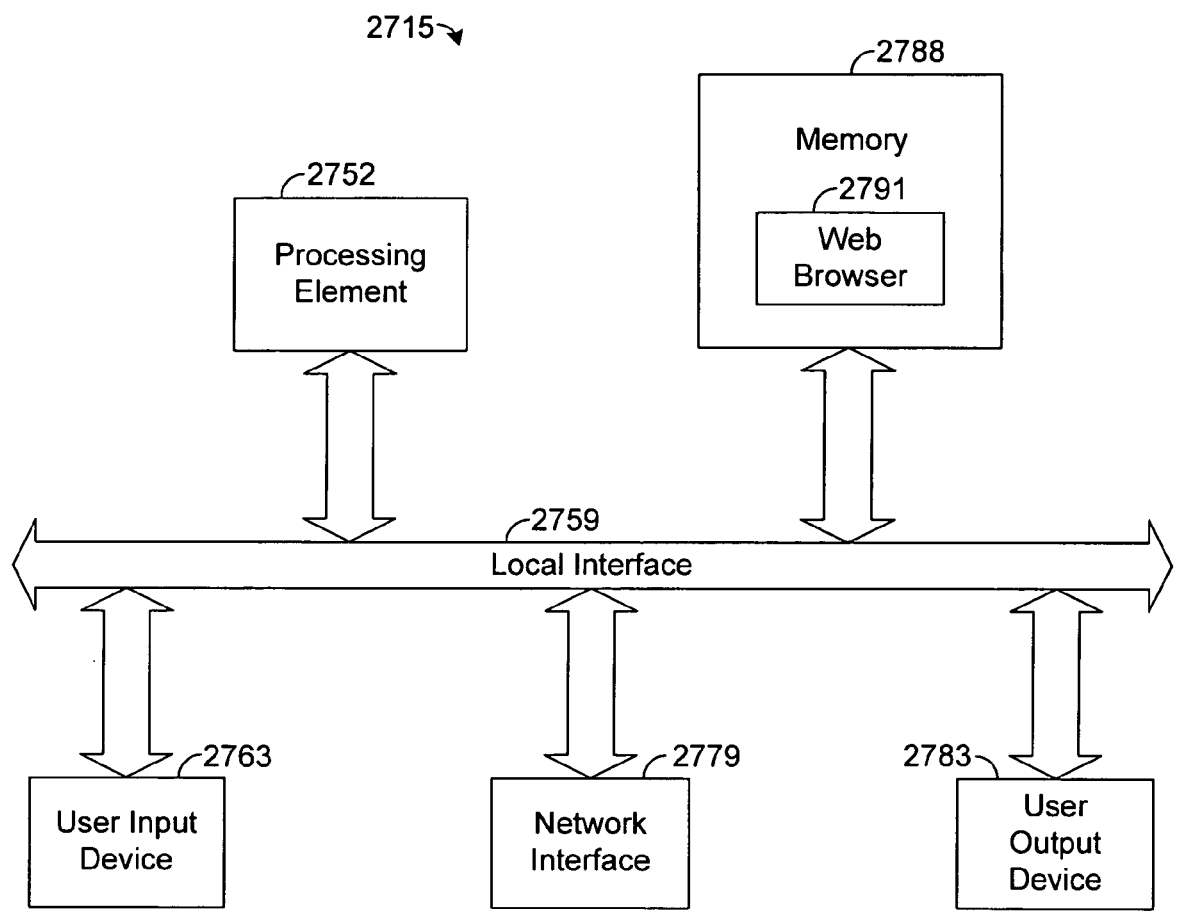
FIG. 49 is a block diagram illustrating an exemplary system for accessing leak detection data generated by a leak detection system, such as is depicted in FIG. 1.

A user of the data access system 2715 may then retrieve data corresponding to the previously purchased vehicle from the data storage and access system 2602. FIG. 49 depicts an exemplary embodiment of the data access system 2715. The exemplary system 2715 depicted by FIG. 49 comprises at least one conventional processing element 2752, such as a digital signal processor (DSP) or a central processing unit (CPU), that communicates to and drives the other elements within the system 2715 via a local interface 2759, which can include one or more buses. Furthermore, a user input device 2763, for example, a keyboard or a mouse, can be used to input data from a user of the system 63, and a user output device 2783, for example, a printer or monitor, can be used to output data to the user. In addition, a network interface 2779 enables communication with the network 2712 (FIG. 48).

The system 2715 also comprises memory 2788 having a web browser 2791 stored therein. Using the web browser 2791, the user may log onto the data storage and access system 2602 through the interface logic 2603. In such an example, the interface logic 2603 may comprise a gateway or other front-end processor that provides a secure interface for controlling access to the database 2620.

In this regard, the user may transmit a username and password to the interface logic 2603, for example. The user may then enter a unique identifier, e.g., a VIN, corresponding to the vehicle for which the user desires to retrieve information corresponding to the vehicle leak test previously performed at the manufacturing sites 2703-2704. The interface logic 2603 may then search the database 2620 using the entered unique identifier, retrieve the sample data set 146a-146d corresponding to the entered unique identifier, and transmit the corresponding sample data set 146a-146d to the end-user site 2702-2703 for viewing by the user. Such data may be used by the user to pinpoint or at least narrow down the location possibilities associated with the leak about which the customer is complaining.

Figure 50:
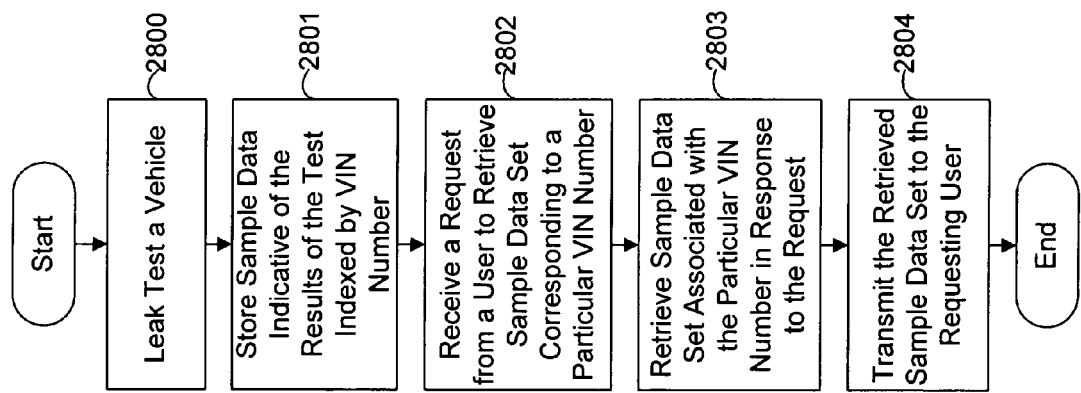
FIG. 50 depicts a flow chart that illustrates an exemplary methodology for testing a vehicle for leaks.

FIG. 50 depicts exemplary architecture and functionality of the system 2600 depicted in FIG. 47.

As indicated by block 2800, the leak detection system 30 (FIG. 1) tests a vehicle to determine whether the vehicle is exhibiting any abnormal leakage. The leak detection system 30 stores sample data sets 146a-146d (FIG. 46) indicative of the results of the testing in block 2801.

As indicated by block 2802, the data storage and access system 2602 (FIG. 47) receives a request from a user to retrieve a sample data set 146a-146d (FIG. 47) corresponding to a particular VIN. Such data may be stored locally with reference to the leak detection system 30, or the sample data set 146a-146d may be stored on a remote device, e.g., the computing device 2705 (FIG. 47).

As indicated by block 2803, the data storage and access system 2602 may retrieve the sample data set 146a-146d associated with the particular VIN number in response to the request. As indicated by block 2804, the data storage and access system 2602 then transmits the retrieved sample data set 146a-146d to the requesting user.

The user may then generate a printed report embodying the retrieved sample data set 146a-146d, including a report exhibiting a graphic substantially similar to the GUI 2500 as depicted in FIG. 46. In this regard, the user may use the generated report to identify the location on the previously purchased vehicle that may have a leak. Alternatively, the user may display a GUI similar to the GUI 2500 (FIG. 46) to aid in the identification of the location of a leak on the recently purchased vehicle.

Now, therefore, the following is claimed:

1. A system for detecting leaks in vehicles, comprising:
   memory for storing a plurality of transmit profiles;
   a plurality of transducers disposed in a vehicle and configured to emit acoustic energy;
   at least one sensor disposed outside of a vehicle and configured to sense the acoustic energy emitted by the transducers;
   an input device configured to receive a vehicle identifier identifying the vehicle; and
   logic configured to make a selection of one of the transmit profiles for the transducers based on the vehicle identifier and to cause the transducers to emit the acoustic energy based on the selection, the logic further configured to detect at least one leak in the vehicle based on sample values indicative of the acoustic energy sensed by the at least one sensor and to provide an indication of the detected leak.

2. The system of claim 1, wherein the input device comprises an optical scanner.

3. The system of claim 1, wherein the vehicle identifier is a vehicle identification number (VIN) associated with the vehicle.

4. The system of claim 1, wherein the logic comprises a test manager residing outside of the vehicle for detecting the at least one leak and a transmit manager residing inside of the vehicle for causing the plurality of transducers to emit the acoustic energy according to the selected transmit profile.

5. The system of claim 1, wherein the selected transmit profiles indicates a respective transmission level for each of the plurality of transducers.

6. A system for detecting leaks in vehicles, comprising:
   at least one transducer disposed in a vehicle and configured to emit acoustic energy;
   at least one sensor disposed outside of a vehicle and configured to sense the acoustic energy emitted by the at least one transducer;
   an input device configured to receive a vehicle identifier identifying the vehicle; and
   logic configured to control, based on the vehicle identifier, an amount of the acoustic energy emitted by the at least one transducer during a test of the vehicle, the logic further configured to detect at least one leak in the vehicle based on sample values indicative of the acoustic energy sensed by the at least one sensor and to provide an indication of the detected leak.

7. The system of claim 6, wherein the input device comprises an optical scanner.

8. The system of claim 6, wherein the vehicle identifier is a vehicle identification number (VIN) associated with the vehicle.

9. A method for detecting leaks in vehicles, comprising the steps of:
   storing a plurality of transmit profiles;
   emitting acoustic energy within a vehicle;
   sensing the acoustic energy via at least one sensor outside of the vehicle;
   receiving a vehicle identifier identifying the vehicle;
   selecting one of the transmit profiles based on the vehicle identifier;
   causing the acoustic energy to be emitted in the emitting step based on the selected transmit profile;
   detecting at least one leak in the vehicle based on the sensing step; and
   providing an indication of the detected leak.

10. The method of claim 9, further comprising the step of scanning the vehicle identifier via an optical scanner.

11. The method of claim 9, wherein the vehicle identifier is a vehicle identification number (VIN) associated with the vehicle.

12. A method for detecting leaks in vehicles, comprising the steps of:
   emitting acoustic energy within a vehicle;
   sensing the acoustic energy via at least one sensor outside of the vehicle;
   receiving a vehicle identifier identifying the vehicle;
   controlling an amount of the acoustic energy emitted in the emitting step based on the vehicle identifier;
   detecting at least one leak in the vehicle based on the sensing step; and
   providing an indication of the detected leak.

13. The method of claim 12, further comprising the step of scanning the vehicle identifier via an optical scanner.

14. The method of claim 12, wherein the vehicle identifier is a vehicle identification number (VIN) associated with the vehicle.

* * * * *